(12) United States Patent
Ashrafi

(10) Patent No.: US 10,334,446 B2
(45) Date of Patent: *Jun. 25, 2019

(54) PRIVATE MULTEFIRE NETWORK WITH SDR-BASED MASSIVE MIMO, MULTEFIRE AND NETWORK SLICING

(71) Applicant: NxGen Partners IP, LLC, Dallas, TX (US)

(72) Inventor: Solyman Ashrafi, Plano, TX (US)

(73) Assignee: NxGen Partners IP, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,252

(22) Filed: Aug. 2, 2018

(65) Prior Publication Data

US 2018/0343567 A1 Nov. 29, 2018

Related U.S. Application Data

(63) Continuation-in-part of application No. 15/954,967, filed on Apr. 17, 2018, which is a continuation of (Continued)

(51) Int. Cl.
*H04L 12/28* (2006.01)
*H04W 16/10* (2009.01)
(Continued)

(52) U.S. Cl.
CPC ......... *H04W 16/10* (2013.01); *H04L 41/0816* (2013.01); *H04L 41/0893* (2013.01); (Continued)

(58) Field of Classification Search
CPC .................................................. H04W 16/10
(Continued)

(56) References Cited

U.S. PATENT DOCUMENTS 9,267,877 B2 2/2016 Ashrafi et al.
9,331,875 B2 5/2016 Ashrafi et al.
(Continued)

OTHER PUBLICATIONS

D. Katz and D. Ward; Bidirectional Forwarding Detection (BFD). RFC 5880 (Proposed Standard); Jun. 2010; Updated by RFC 7419.
(Continued)

*Primary Examiner* — John Pezzlo

(57) ABSTRACT

A private wireless network for providing connections between a public wireless network and wireless devices includes a first interface to the public wireless network and at least one second interface to the wireless devices. A wireless communications network interconnecting the first interface and the second interface implementing a MulteFire wireless communications standard includes a first plurality of control layers. The wireless communications network further comprises a plurality of nodes within a mesh network. A plurality of transceivers is associated with each of the plurality of nodes within the mesh network. Each of the transceivers implement a software defined radio that may be configured within a plurality of transceiving configurations. At least one server implements at least a portion of the wireless communications network within the at least one server. The at least one server is configured to select a first slice portion of the first plurality of control layers of the wireless communications network and a first slice portion of at least a portion of the plurality transceivers in a first transceiving configuration to support operation of a first application or service and to select a second slice portion of the first plurality of control layers of the wireless communications network and a second slice portion of at least the portion of the plurality transceivers in a second transceiving configuration to support operation of a second application or service.

24 Claims, 42 Drawing Sheets

Related U.S. Application Data application No. 15/664,764, filed on Jul. 31, 2017, now Pat. No. 9,949,133, application No. 16/053,252, which is a continuation-in-part of application No. 15/847,353, filed on Dec. 19, 2017.

(60) Provisional application No. 62/540,331, filed on Aug. 2, 2017, provisional application No. 62/371,279, filed on Aug. 5, 2016, provisional application No. 62/443,958, filed on Jan. 9, 2017.

(51) Int. Cl.
| | |
|---|---|
| *H04L 29/08* | (2006.01) |
| *H04L 12/24* | (2006.01) |
| *H04L 12/26* | (2006.01) |
| *H04J 1/16* | (2006.01) |
| *H04B 1/00* | (2006.01) |
| *H04B 7/0452* | (2017.01) |
| *H04L 29/06* | (2006.01) |

(52) U.S. Cl.
CPC ............. *H04L 43/08* (2013.01); *H04L 67/10* (2013.01); *H04B 1/0003* (2013.01); *H04B 7/0452* (2013.01); *H04L 41/0213* (2013.01); *H04L 41/12* (2013.01); *H04L 41/5009* (2013.01); *H04L 63/30* (2013.01)

(58) Field of Classification Search
USPC .................................. 370/252, 329, 386, 401
See application file for complete search history.

(56) References Cited

U.S. PATENT DOCUMENTS

| | | | |
|---|---|---|---|
| 9,662,019 | B2 | 5/2017 | Ashrafi et al. |
| 2009/0279490 | A1* | 11/2009 | Alcorn ............... H04B 7/18506 370/329 |
| 2012/0303835 | A1 | 11/2012 | Kempf |
| 2013/0028073 | A1 | 1/2013 | Tatipamula |
| 2013/0165177 | A1 | 6/2013 | Berg |
| 2013/0332359 | A1 | 12/2013 | Qteishat |
| 2014/0098815 | A1* | 4/2014 | Mishra .................. H04L 45/021 370/390 |
| 2014/0254373 | A1 | 9/2014 | Varma |
| 2015/0055623 | A1 | 2/2015 | Li |
| 2015/0207724 | A1 | 7/2015 | Choudhury |
| 2015/0350077 | A1 | 12/2015 | Durrani |
| 2016/0041523 | A1 | 2/2016 | Ashrafi et al. |
| 2016/0262068 | A1 | 9/2016 | Won |
| 2016/0285750 | A1 | 9/2016 | Saquib |
| 2016/0337937 | A1 | 11/2016 | McCann |
| 2017/0048290 | A1 | 2/2017 | Cui |
| 2017/0229782 | A1* | 8/2017 | Adriazola ............... H01Q 13/28 |

OTHER PUBLICATIONS

N.L.M. van Adrichem, B.J. Van Asten, and F.A. Kuipers; Fast recovery in software-defined networks; Software Defined Networks (EWSDN), 2014 Third European Workshop; pp. 61-66; Sep. 2014.
P. Sun, M. Yu, M. J. Freedman, J. Rexford, and D. Walker; Hone: Joint host-network traffic management in software-defined networks; Journal of Network and Systems Management, vol. 23, No. 2; 2015.
P. Dely, A. Kassler, and N. Bayer; Openflow for wireless mesh networks; Computer Communications and Networks (ICCCN), 2011; Proceedings of 20th International Conference; Jul. 2011.
A. Patro and S. Banerjee; Outsourcing coordination and management of home wireless access points through an open api; Computer Communications (INFOCOM); 2015 IEEE Conference on. IEEE; 2015.
K. Phemius and M. Bouet; Monitoring latency with openflow; Network and Service Management (CNSM), 2013; 9th International Conference on. IEEE; 2013.
S. Ashrafi, et al. "Performance Metrics and Design Considerations for a Free-Space Optical Orbital-Angular-Momentum-Multiplexed Communication Link," Optics Letters vol. 40 (Optical Society of America, 2015).
S. Ashrafi, et al. "Optical communications using orbital angular momentum beams," Advances in Optics and Photonics vol. 7 (Optical Society of America, 2015).
S. Ashrafi, et al. "Enhanced Spectral Efficiency of 2.36 bits/s/Hz using Multiple Layer Overlay Modulation for QPSK over a 14-km Single Mode Fiber Link," OSA Technical Digest (Optical Society of America, 2015).
S. Ashrafi, et al. "400-Gbit/s Free Space Optical Communications Link Over 120-meter Using Multiplexing of 4 Collocated Orbital-Angular-Momentum Beams," OSA Technical Digest (Optical Society of America, 2015).
S. Ashrafi, et al, "Experimental Demonstration of Two-Mode 16-Gbit/s Free-Space mm-Wave Communications Link Using Thin Metamaterial Plates to Generate Orbital Angular Momentum Beams," (The Institute of Electrical and Electronics Engineers, 2015).
S. Ashrafi, et al. "Experimental Measurements of Multipath-Induced Intra- and Inter-Channel Crosstalk Effects in a Millimeter-Wave Communications Link using Orbital-Angular-Momentum Multiplexing," (The Institute of Electrical and Electronics Engineers, 2015).
S. Ashrafi, et al. "Demonstration of an Obstruction-Tolerant Millimeter-Wave Free-Space Communications Link of Two 1-Gbaud 16-QAM Channels using Bessel Beams Containing Orbital Angular Momentum," (Society of Photo-optical Instrumentation Engineers, 2015).
S. Ashrafi, et al. "Acoustically Induced Stresses in Elastic Cylinders and their Visualization," (Acoustical Society of America, 1987).
S. Ashrafi, et al. "Spurious Resonances and Modelling of Composite Resonators," (The Institute of Electrical and Electronics Engineers, 1983).
S. Ashrafi, et al. "Splitting and Contrary Motion of Coherent Bremsstrahlung Peaks in Strained-Layer Superlattices," (Optical Society of America, 1991).
S. Ashrafi, et al. "Channeling Radiation of Electrons in Crystal Lattices," Essays on Classical and Quantum Dynamics, Chap. 12 (1991).
S. Ashrafi, et al. "Splitting of Channeling-Radiation Peaks in Strained-Layer Superlattices," Journal vol. 8 (Optical Society of America, 1991).
S. Ashrafi, et al. "Evidence of Chaotic Pattern in Solar Flux Through a Reproducible Sequence of Period-Doubling-Type Bifurcations," Technical Report (National Aeronautics and Space Administration, 1991).
S. Ashrafi, et al. "Lyapunov Exponent of Solar Flux Time Series," (Proceedings of First Experimental Chaos Conference, 1991).
S. Ashrafi, et al, "Combining Schatten's Solar Activity Prediction Model with a Chaotic Prediction Model," Technical Report (National Aeronautics and Space Administration, 1991).
S. Ashrafi, et al, "Future Mission Studies: Forecasting Solar Flux Directly from its Chaotic Time Series," Technical Report (National Aeronautics and Space Administration, 1991).
S. Ashrafi, et al, "Future Mission Studies: Preliminary Comparisons of Solar Flux Models," Technical Report (National Aeronautics and Space Administration, 1991).
S. Ashrafi, et al, "Nonlinear Techniques for Forecasting Solar Activity Directly From its Time Series," Technical Report (National Aeronautics and Space Administration, 1992).
S. Ashrafi, et al, "Detecting and Disentangling Nonlinear Structure from Solar Flux Time Series," Conference Paper (National Aeronautics and Space Administration, 1993).
S. Ashrafi, et al, "Solar Flux Forecasting Using Mutual Information with an Optimal Delay," Conference Paper (National Aeronautics and Space Administration, 1993).
S. Ashrafi, et al, "PCS System Design Issues in the Presence of Microwave OFS," Electromagnetic Wave Interaction: Series on Stability, Vibration and Control of Systems: vol. 12 (1996).

(56) References Cited

OTHER PUBLICATIONS

S. Ashrafi, et al, "Performance Enhancement of an Orbital-Angular-Momentum-Based Free-Space Optical Communication Link Through Beam Divergence Controlling," OSA Technical Digest (Optical Society of America, 2015).
S. Ashrafi, et al, "Demonstration of Distance Emulation for an Orbital-Angular-Momentum Beam," OSA Technical Digest (Optical Society of America, 2015).
S. Ashrafi, et al, "Free-Space Optical Communications Using Orbital-Angular-Momentum Multiplexing Combined with MIMO-Based Spatial Multiplexing," OSA Technical Digest (Optical Society of America, 2015).
S. Ashrafi, et al, "Experimental Demonstration of a 400-Gbit/s Free Space Optical Link Using Multiple Orbital-Angular-Momentum Beams with Higher Order Radial Indices," OSA Technical Digest (Optical Society of America, 2015).
A. Doria et al.; General switch management protocol (GSMP) V3; Tech. Rep., 2002; doi: http://dx.doi.org/10.17487/RFC3292.
T. Wu, L. Rui, A. Xiong, and S. Guo; An automation PCI allocation method for eNodeB and home eNodeB cell; Proc. IEEE 6th Int. Conf. Wireless Commun. Netw. Mobile Comput. (WiCOM); Sep. 2010, pp. 1-4.
A. Berl, H. de Meer, H. Hlavacs, and T. Treutner; Virtualization in energy-efficient future home environments; IEEE Commun. Mag., vol. 47, No. 12, pp. 62-67, Dec. 2009.
R. Mortier et al.; Control and understanding: Owning your home net-work; Proc. IEEE 4th Int. Conf. Commun. Syst. Netw. (COMSNETS), Jan. 2012, pp. 1-10.
H. Ludwig et al.; Web service level agreement (WSLA) language specification; IBM Corp., New York, NY, USA; Tech. Rep., 2003, pp. 815-824.
F. T. Leighton and D. M. Lewin; Content delivery network using edge-of-network servers for providing content delivery to a set of participating content providers; U.S. Pat. No. 6,553,413, Apr. 22, 2003.
E. D. Zwicky, S. Cooper, and D. B. Chapman; Building Internet Firewalls; Sebastopol, CA, USA: O'Reilly Media, 2000.
H. Hawilo, A. Shami, M. Mirahmadi, and R. Asal; NFV: State of the art, challenges, and implementation in next generation mobile net-works (vEPC); IEEE Netw., vol. 28, No. 6, pp. 18-26, Nov./Dec. 2014.
A. Gember et al. (2013); Stratos: A network-aware orchestration layer for virtual middleboxes in clouds; [Online]. Available: http://arxiv.org/abs/1305.0209.
J. Case, M. Fedor, M. Schoffstall, and J. Davin; A Simple Network Management Protocol (SNMP); document 1157, 1989.
N. Handigol, S. Seetharaman, M. Flajslik, N. McKeown, and R. Johari; Plug-n-serve: Load-balancing Web traffic using OpenFlow; Proc. ACM SIGCOMM Demo, 2009, pp. 1-2.
A. Doria et al.; Forwarding and Control Element Separation (ForCES) Protocol Specification; document 5810; 2010.
B. Raghavan, M. Casado, T. Koponen, S. Ratnasamy, A. Ghodsi, and S. Shenker; Software-defined Internet architecture: Decoupling archi-tecture from infrastructure; Proc. 11th ACM Workshop Hot Topics Netw., 2012, pp. 43-48.
R. Bifulco, R. Canonico, M. Brunner, P. Hasselmeyer, and F. Mir; A practical experience in designing an OpenFlow controller; Proc. IEEE Eur. Workshop Softw. Defined Netw. (EWSDN), Oct. 2012, pp. 61-66.
G. Lu et al.; Serverswitch: A programmable and high performance platform for data center networks; Proc. NSDI, vol. 11. 2011, pp. 1-14.
D. Drutskoy, E. Keller, and J. Rexford; Scalable network virtualization in software-defined networks; IEEE Internet Comput., vol. 17, No. 2, pp. 20-27, Mar./Apr. 2013.
N. McKeown et al.; OpenFlow: Enabling innovation in campus net-works; ACM SIGCOMM Comput. Commun. Rev., vol. 38, No. 2, pp. 69-74, 2008.
A. Dixit, F. Hao, S. Mukherjee, T. V. Lakshman, and R. Kompella; Towards an elastic distributed SDN controller; Proc. 2nd ACM SIGCOMM Workshop Hot Topics Softw. Defined Netw., 2013, pp. 7-12.
D. Joseph and I. Stoica; Modeling middleboxes; IEEE Netw., vol. 22, No. 5, pp. 20-25, Sep./Oct. 2008.
J. Martins et al.; ClickOS and the art of network function virtualization; Proc. 11th USENIX Symp. Netw. Syst. Design Implement. (NSDI), Seattle, WA, USA, 2014, pp. 459-473.
P. Quinn and T. Nadeau; Service Function Chaining Problem Statement; document draft-quinn-sfc-problem-statement-02, 2013.
Y. Li, M. Chen; Software-Defined Network Function Virtualization: A Survey; IEEE 2015, pp. 2169-3536.
A. Hurtado-Borras, J. Pala-Sole, D. Camps-Mur, and S. Sallent-Ribes; sdn wireless backhauling or small cells; Communications (ICC); 2015 IEEE International Conference; pp. 3897-3902; Jun. 2015.
Kari Seppänen, Jorma Kilpi, and Tapio Suihko; Integrating wmn based mobile backhaul with sdn control; Mob.Netw. Appl., 20(1):32-39; Feb. 2015.
Open Networking Foundation; Openflow switch specification; Version 1.1.0 implemented (wire protocol 0×02).

* cited by examiner

PRIVATE MULTEFIRE NETWORK WITH SDR-BASED MASSIVE MIMO, MULTEFIRE AND NETWORK SLICING

CROSS-REFERENCE TO RELATED APPLICATIONS

This application claims the benefit of U.S. Provisional Application No. 62/540,331, filed Aug. 2, 2017 and entitled PRIVATE MULTEFIRE NETWORK WITH SDR-BASED MASSIVE MIMO AND MULTEFIRE AND NETWORK SLICING, the specification of which is incorporated herein by reference in its entirety. This application is also a Continuation-in-Part of U.S. patent application Ser. No. 15/954,967 filed Apr. 17, 2018 and entitled ULTRA-BROADBAND VIRTUALIZED TELECOM AND INTERNET, which is a continuation of U.S. application Ser. No. 15/664,764 filed on Jul. 31, 2017 and entitled ULTRA-BROADBAND VIRTUALIZED TELECOM AND INTERNET, now U.S. Pat. No. 9,949,133 issued Apr. 17, 2018, which claims the benefit of U.S. Provisional Application No. 62/371,279 filed Aug. 5, 2016 and entitled ULTRA-BROADBAND VIRTUALIZED TELECOM AND INTERNET, each of which is incorporated herein by reference in their entirety. This application is also a Continuation-in-Part of U.S. patent application Ser. No. 15/847,353, filed Dec. 19, 2017 and entitled POINT-TO-MULTIPOINT OR MULTIPOINT-TO-MULTIPOINT MESH SELF-ORGANIZED NETWORK OVER WIGIG STANDARDS WITH NEW MAC LAYER, which claims the benefit of U.S. Provisional Application No. 62/443,958, filed Jan. 9, 2017 and entitled POINT-TO-MULTIPOINT OR MULTIPOINT-TO-MULTIPOINT MESH SELF-ORGANIZED NETWORK OVER WIGIG STANDARDS WITH NEW MAC LAYER, each of which is incorporated herein by reference in its entirety.

TECHNICAL FIELD

The present invention relates to private wireless networks, and more particularly to private wireless networks utilizing a combination of SDR-based massive MIMO, MulteFire and network slicing.

BACKGROUND

The increased use of wireless devices such as smart phones, tablets, computers etc. have greatly increased the number of areas connecting to the Internet through wireless networks. As the use of wireless devices becomes more ubiquitous within society, users began to assume that their wireless connection will be available no matter where they are located. However, existing wireless network providers have established networks that cover many areas, but there are locations where wireless network services are either not available or service can be spotty. Additionally, when data intensive applications are being utilized such as video streaming, users often desire to connect to private wireless networks in order to limit the amount of wireless data being utilized within existing data plans.

There is a need for the ability for private entities and individuals to provide private wireless networks that can meet a variety of potential user needs. Existing systems often utilize Wi-Fi technologies for providing this type of private network. However, some limitations exist with Wi-Fi networks that cannot meet the often changing needs of wireless servers' users. Thus, a more flexible and reliable private network configuration for providing variable user service needs would be of great benefit to a private network provider.

SUMMARY

The present invention, as disclosed and described herein, in one aspect thereof comprises a private wireless network for providing connections between a public wireless network and wireless devices includes a first interface to the public wireless network and at least one second interface to the wireless devices. A wireless communications network interconnecting the first interface and the second interface implementing a MulteFire wireless communications standard includes a first plurality of control layers. The wireless communications network further comprises a plurality of nodes within a mesh network. A plurality of transceivers are associated with each of the plurality of nodes within the mesh network. Each of the transceivers implement a software defined radio that may be configured within a plurality of transceiving configurations. At least one server implements at least a portion of the wireless communications network within the at least one server. The at least one server is configured to select a first slice portion of the first plurality of control layers of the wireless communications network and a first slice portion of at least a portion of the plurality transceivers in a first transceiving configuration to support operation of a first application or service and to select a second slice portion of the first plurality of control layers of the wireless communications network and a second slice portion of at least the portion of the plurality transceivers in a second transceiving configuration to support operation of a second application or service.

BRIEF DESCRIPTION OF THE DRAWINGS

For a more complete understanding, reference is now made to the following description taken in conjunction with the accompanying Drawings in which.

DETAILED DESCRIPTION

Figure 1:
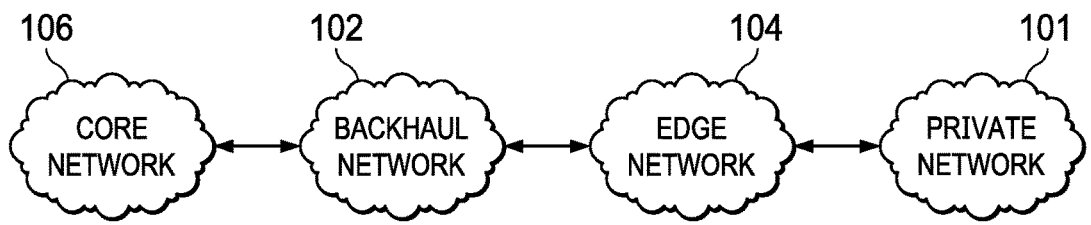
FIG. 1 illustrates the manner in which a private network interconnects with an edge network and a core network.

Referring now to the drawings, wherein like reference numbers are used herein to designate like elements throughout, the various views and embodiments of a private network with SDR-based massive MIMO, MulteFire and network slicing are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated the manner in which a private network 101 may be established at a local indoor or outdoor location. A backhaul network 102 is used for interconnecting an edge network 104 with a core network 106. In a hierarchical network the backhaul network 102 comprises the intermediate link between the core network 106 (backbone network) and the small subnetworks at the edge of the entire hierarchical network. The backhaul network 102 carries packets/data to and from the core network 106. For example, in a telecommunications network cell phones communicating with a cell tower constitute a local subnetwork. The connection between the cell tower and the rest of the world begins with a backhaul links to the core of the Internet service provider network. Backhaul networks 102 may be used to describe the entire wired part of the network, although some networks have wireless instead of wired backhaul, in whole or in part, for example using microwave bands, mesh networks and edge network topologies. The backhaul network 102 may use high-capacity wireless channels to get packets to the microwave or fiber links. The private network 101 may use any number of other types of communications protocol to enable communications between a user and the edge network 104. Existing private networks 101 often comprise WiFi networks. However, the present implementation envisions using a version of a MulteFire network as will be more fully described herein below.

Private networks 101 may use a variety of technologies. The choice of technology must take into account parameters such as capacity, cost, reach and the need for such resources as frequency spectrum, optical fiber, wiring or rights-of-way. Generally, solutions can largely be categorized into wired (copper/fiber) or wireless (point-to-point, point to multipoint over high-capacity radio links). Wired solutions are usually very expensive and often more difficult to deploy. This makes wireless a more suitable and/or viable option. Multihop wireless architecture can overcome the hurdles of wired solutions by creating efficient large coverage areas. Wireless solutions are able to offer carrier grade services which are not easily feasible with wired connectivity. Technologies include free space optics, point-to-point microwave radio relay transmission (terrestrial or by satellite), point to multipoint microwave access technologies, such as LMDS, Wi-Fi, WiMAX, DSL variants such as ADSL and SHDSL, PDH and SDH Lasse Esso and ET interfaces, such as (fractional) E1/T1, E3, T3, STM-1/OC-3, etc. and ethernet. The system such as that more fully herein below may also be used within the systems such as that describe in U.S. patent application Ser. No. 14/882,085 entitled APPLICATION OF ORBITAL ANGULAR MOMENTUM TO FIBER, FSO AND RF filed on Oct. 15, 2015, which published as U.S. Patent Publication No. US 2016-0127073 on May 5, 2016, which is incorporated herein by reference in its entirety to transmit information.

In addition to the plane wave embodiments that are disclosed in the described system for SDN-based channel estimation for multiplexing between LOS mmWaves, NLOS sub-6 GHz and FSO described herein, a system for implementing the twisted waves generated by the application of orthogonal functions to a plane wave may also be utilized. For example, the various embodiments disclosed in U.S. patent application Ser. No. 15/216,474 entitled SYSTEM AND METHOD FOR COMBINING MIMO AND MODE-DIVISION MULTIPLEXING filed on Jul. 21, 2016, now U.S. Pat. No. 9,998,187 issued Jun. 12, 2018, and U.S. patent application Ser. No. 15/144,297 entitled SYSTEM AND METHOD FOR COMMUNICATION USING ORBITAL ANGULAR MOMENTUM WITH MULTIPLE LAYER OVERLAY MODULATION filed on May 2, 2016, now U.S. Pat. No. 9,503,258 issued Nov. 22, 2016, each of which is incorporated herein by reference in their entirety, may be used.

Hybrid (Heterogeneous) networks consist of networks including devices wherein in the components providing the transmission of data are all the same but may each be configured using the included operating software to provide different types of transmissions including but not limited to point-to-point (P2P); point-to-multipoint (P2MP); multipoint-to-multipoint (MP2MP); etc. The described system supports complex heterogeneous networks (HetNet) incorporating multiple services, standards and sites.

Architecture relates to the various system layers and their application to the system from the application layer to the hardware layer such as that described in U.S. patent application Ser. No. 15/664,764, filed on Jul. 31, 2017 and entitled ULTRA-BROADBAND VIRTUALIZED TELECOM AND INTERNET, now U.S. Pat. No. 9,949,133 issued Apr. 17, 2018.

Topology for systems implementing the described components may configure the nodes in a tree topology or a ring topology. The tree topology comprises a number of nodes interconnected in a tree structure beginning with a single node that expands to multiple second nodes and each of the second nodes expanding to further multiple third nodes or the single node interconnected to each of the other nodes of a network. Each of the other nodes communicates through the single central node. A ring topology includes a ring connection of all nodes with each node connected only to two adjacent nodes.

A multilayer private network provides for communications using each of copper wire, fiber and RF transmissions. RF may use line of sight and non-line of sight transmissions. Copper may comprise vector bundled (VDSL2) and other types of transmissions. Fiber may use GPON or other types of transmissions.

When providing a variety of services over a private network the private network can become overburden causing it to become clogged with traffic and have greatly increased latency. Existing mobile and data networks can provide business-to-client (B2C) services such as commerce, music downloads, video streaming, gaming or social media access. The networks can also provide business-to-business (B2B) services such as IT services, finance, compliance, sales and marketing and customer services. These services are provided over fronthaul and backhaul networks using wired and wireless connections. If a large volume of voice or data services are being used at any particular time, the private network can be overburdened and provide unacceptable services to the customers due to increased latency and delay.

Operators of the private network face a number of challenges. These include increased demand for video and cloud services creating an explosion of carried traffic. Additionally, reductions in core equipment cost do not follow Moore's law. Network heterogeneity requires multiple specialized solutions/teams. Automation for configuration and provisioning of network resources increase the network costs. Additional network problems for network providers arise from the low return on investment due to the fact that networks are built for peak usage times and are over provisioned most of the time. Additionally, the current mode of operation for network providers results in slow service innovations due to the lack of network automation and service integration that results in long provisioning delays. The infrastructure is built using closed proprietary boxes. This results in inefficient utilization of radio resources, the inability to provide customization, a slowing in the creation of innovative services and the inability to support industry specific Internet of things scenarios. Thus, there is a need for an architecture for providing a private network that provides more flexibility and enables better use of new protocols such as 5G.

Figure 2:
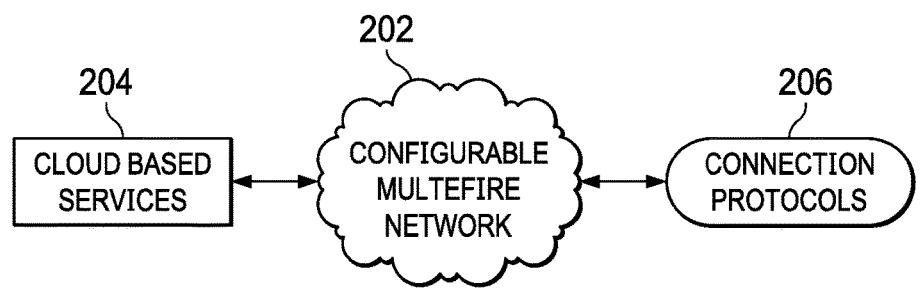
FIG. 2 illustrates a network set up as a configurable private network.

In order to provide a more flexible network, a private network may be set up as a configurable wide area network 202 as illustrated in FIG. 2. The configurable wide area network 202 provides a bridge between cloud-based services 204 and various connection protocols 206. The configurable wide area network 202 provides a number of benefits including economies of scale that provides an infrastructure built with a few commodity building blocks using Open-Source SDN/NFV software and white boxes and providing agility through software platforms that enable the rapid creation of new services. This provides a UltraBroadband on demand network on both RF and fiber that uses virtual radio access network (VRAN), mobile edge computing (MEC), caching of content at the edge of the network and APIs. The system would also use CORD since it is cloud native. The system will provide SDR based massive MIMO that is used in combination with SDN based network slicing and SDN based fronthaul and backhaul networks on the network architecture.

Figure 3:
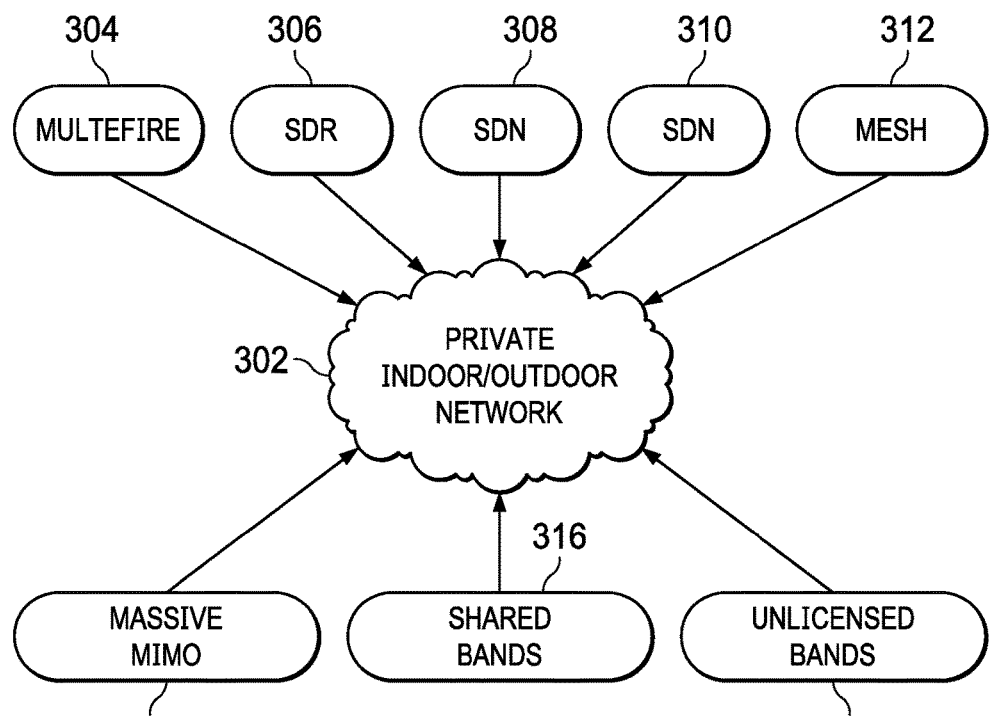
FIG. 3 illustrates a private network and its various implementational functionalities.

The private network 101 may be implemented in one embodiment as shown in FIG. 3. The private network 101 may comprise any private indoor/outdoor network 302 may be located in an area not currently served by a public wireless network or that has sporadic or spotty public wireless network coverage. The private indoor/outdoor network 302 will include a number of components enabling provision of wireless services. These include multi-fire network coverage 304, software defined radios (SDR) 306, software optimize network of (SON) 308, software defined network (SDN) 310, mesh network 312 coverage, massive MIMO 314, and the use of shared bands 316 in unlicensed bands 318.

Future enterprises (in all industries) will need their own indoor and outdoor private MulteFire SDR-based, SON-based, SDN-based, mesh-based, and coordinated multipoint (COMP) Massive MIMO-based systems over shared and unlicensed bands (i.e. 3.5 GHz shared and 5 GHz unlicensed) while leveraging network slicing for different applications as well as the other technologies from both standardized telco industry and Internet industry. SDR-based systems use analytics, automation and machine communications to improve productivity. These private networks 302 have scalable control and reliability in very dense, machine-oriented environments. From industry factory-floor automation, to control of autonomous trucks in open mines, to electricity distribution grids, to logistics and warehousing, to oil & gas operations, to venue services, and many more applications and industries.

Since LTE is now a proven, preferred and mature technology with huge eco-system, it can easily be built for a private network 302 in many different verticals. Enterprises that control their own network can modify the technology and optimize it for their own use and objectives. For example, they can build a network with fast recovery from failure, extended coverage, or specific set prioritization and reliability approaches. The availability of open access spectrum (i.e. shared 3.5 GHz access and 5 GHz unlicensed band globally) now make it possible for almost any enterprise to deploy and operate a private MulteFire network. There are many opportunities to deploy private networks 302 in licensed spectrum, to offer private LTE as a managed service, or to extend private Local Area Networks across the wide-area public network to create enterprise-specific VPNs.

There are many applications for enterprises that have specific benefits from their private network 302 which may not simply be supported on public networks. The reasons to deploy a private network 302 include improved coverage, capability and control. Enterprises can guarantee coverage at their facility or location by deploying their own private network 302. This is necessary where public networks do not exist or are not robust, but can also apply to indoor and campus locations, factories, warehouses, power plants, etc. Enterprises can deploy a private indoor and outdoor MulteFire network for better capacity that can configure uplink and downlink, set usage policy and engineer their RAN network based on their specific capacity demands (i.e. support HD video streaming and analysis for, say, a security application) and performance and latency requirements. A private indoor and outdoor MulteFire network 302 provides better control over which users connect, how network resources are used and how traffic is prioritized. If needed, parameters in the LTE radio can be customized to optimize reliability and latency in challenging physical environments (e.g., warehouse or oil/gas facilities). This is unthinkable on the public network. Companies can also control their own security to ensure that sensitive information doesn't leave the premises. This is an essential application for many types of high-tech businesses.

A private network on LTE, such as a MulteFire network 304, provides a number of advantages. Most private wireless networks today use WiFi. WiFi is fast and easy to deploy. There is a competitive market for equipment, and a feature-rich roadmap. In many cases, WiFi will remain a good solution. Private LTE is based on technologies developed for wide-area mobility and scaled down to be deployable by private organizations. This background gives LTE some advantages over WiFi, particularly as relates to radio performance and mobility. This can help meet more demanding use cases. The advantages of LTE include range/link budget; spectral efficiency/capacity; configurable QoS; mobility; ecosystem and interoperability; high to low rate scaling; spectrum options; security and provides a roadmap to 5G.

With respect to range/link budgets LTE systems are generally developed and deployed using RF equipment with more robust specification, which extends the link budget considerably. As LTE is a cellular technology, it has been designed to operate well under fading channel conditions, providing good cell edge performance. As a very approximate rule of thumb, one LTE small cell will cover about the same area as two to three WiFi access points at more or less equivalent power output. If CBRS (Citizens Broadband Radio Service) 3.5 GHz spectrum and Category-B small cells are used, range can even be significantly greater. Thus, a private indoor and outdoor full dimension COMP (Coordinated Multi-point transmission/reception) massive MIMO network may be built using the CBRS band with increased throughput. COMP is a technology that sends and receives signals from multiple sectors or cells to a given UE. By coordinating transmission among multiple cells, interference from other cells can be reduced and the power of the desired signal can be increased. MIMO is a signal transmission technology that uses multiple antennas at both the transmitter and the receiver to perform spatial multiplexing and improve communication quality and spectral efficiency.

Many of the concepts that improve range and reliability also increase spectral efficiency and system capacity. LTE is more spectrally efficient than WiFi (perhaps more than double) because of higher efficiencies at both link and MAC levels. These efficiencies of LTE (versus WiFi) come from concepts such as hybrid automatic repeat request (HARQ), channel state information, more advanced modulation, more advanced coding, more advanced schedulers, more advanced security, more advanced mobility and handoff, more advanced method to combat channel fading, more advanced method to combat channel interference, and more advanced method to combat delay spread using cyclic prefix insertion.

Figure 4A:
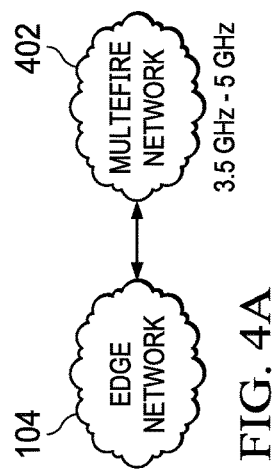
FIG. 4A more particularly illustrates the interconnection between an edge network and a private network.

MulteFire network 304 is a form of LTE deployment in unlicensed frequency bands. MulteFire is an extension of the ideas in LAA/LTE-U. LAA/LTE-U leverage both licensed and unlicensed spectrum. MulteFire exclusively uses the unlicensed spectrum. This allows MulteFire to be deployed by anyone in a variety of locations similar to Wi-Fi hotspots. As shown in FIG. 4, the MulteFire network 402 comprises a private network that interacts with the edge network 104 to provide wireless data communications capability within a predetermined location. The MulteFire network 402 operates within the 3.5 GHz-5 GHz unlicensed spectrum. MulteFire allows the standalone use of LTE within unlicensed spectrum. MulteFire can be used to deploy mobile broadband data services and support voice over LTE. MulteFire supports handovers among cells in a small cell deployment and is capable of interworking with external mobile networks for service continuity. MulteFire provides an LTE based technology for small cells operating solely within the unlicensed spectrum. This enables the provision of enhanced data and voice services to local area deployments. MulteFire is suitable for any band that needs over the air contention for fair sharing.

Private MulteFire networks 402 can also be designed with machine communications as an application using LTE protocol to support a multiservice capability with low-bit-rate Internet of Things (IoT), control signaling and human smartphone users on a unified common infrastructure with proper reliability and performance. Examples of use cases of MulteFire networks 402 include the automation and industry, mission critical services, primary industries and venue services.

Automation and industry applications include factory-floor robotics wherein wireless robots currently used on factory floors may be used to reconfigure production lines, logistics and warehousing using pick-and-pack machines. The automation and industry applications typically focus on very dense deployments with low latency requirements. Mission critical services include the ability to monitor and control critical infrastructure such and electricity distribution grids, power plants, etc.; public safety agencies who need to create closed user groups or ad hoc networks at the scene of an emergency; and government & military agencies want dedicated, highly available networks at their facilities.

Primary industries include locations often not covered by public wireless infrastructure, very diverse sectors from mining to agriculture, using automated machinery and hardened equipment with good link budget for low-density long-range coverage. Venue services comprises public venues such as airports, stadiums, hospitals, ports, venues that have many users (internal, contractor, public), some further having requirements for fast, highly secure access and private network that can be "sliced" (configured) for different user groups.

Software defined radio (SDR) 306 comprises a radio in which some or all of the physical layer functions are software defined. A basic SDR system may consist of a processor, an analog to digital converter proceeded by some form of RF front end. Significant amounts of signal processing are handled over to the general-purpose processor rather than being done in a special purpose hard (electronic circuits). This provides a radio system which can receive and transmit widely different radio protocols based solely upon the software used for providing a great deal of flexibility.

Figure 4B:
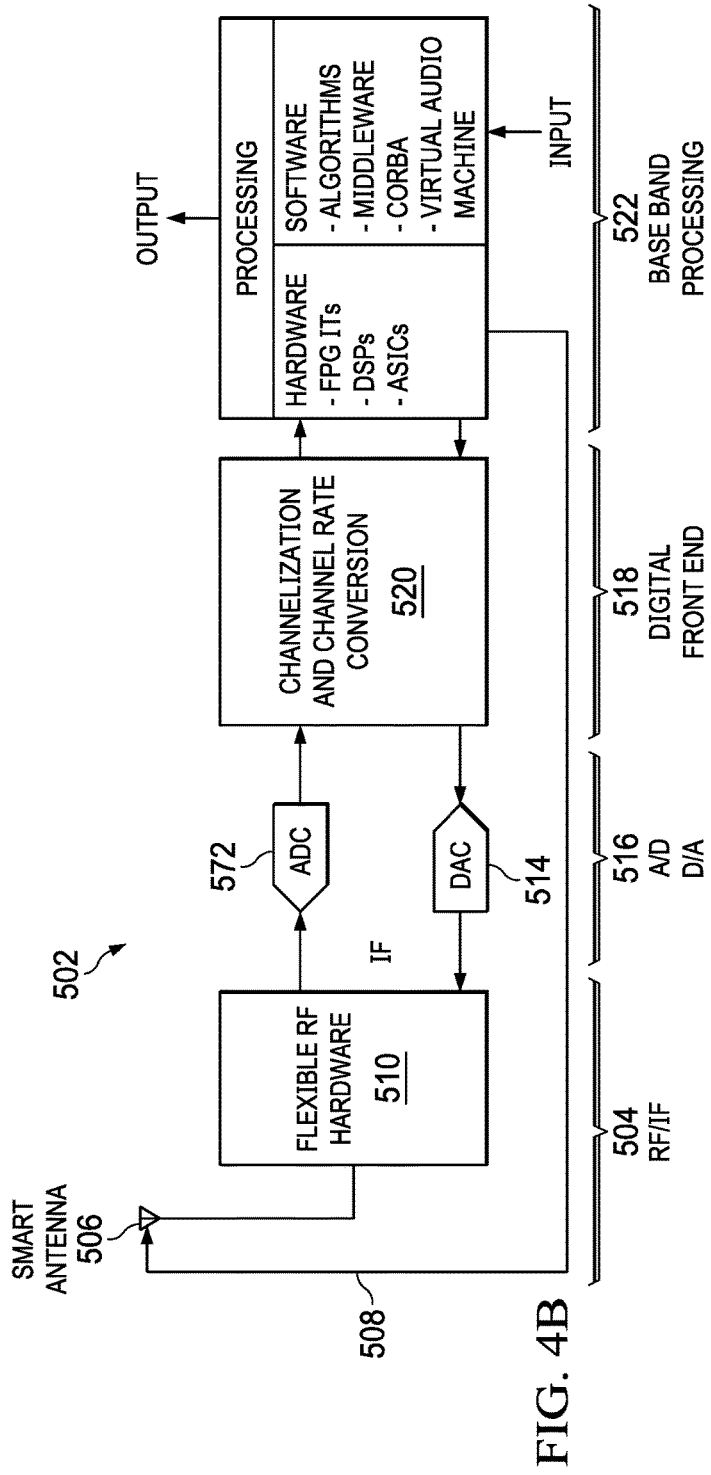
FIG. 4B illustrates a general functional block diagram of a software defined radio.

Referring now to FIG. 4B, there is illustrated a functional block diagram of one example of a software defined radio 401. The RF/IF portion 403 for converting between RF and IF have signals comprises a smart antenna 406 for transmitting and receiving signals responsive to a control input 408 and flexible RF hardware 410 for converting between RF and IF signals. Most transceivers use a variable-frequency oscillator, mixer and filter to tune a desired signal to a common intermediate frequency or baseband signal. However, in some applications it is not necessary to tune the signal to an intermediate frequency and the radiofrequency signal may be directly sampled by the analog-to-digital converter 416. The flexible RF hardware 410 provides an IF output to an analog to digital converter 412 and receives IF inputs from a digital to analog converter 414. The ADC 412 and DAC 414 comprise the C A/D, D/A conversion portion 416.

The digital front end 418 consist of a channelization and channel rate conversion functionality 420. Baseband processing 422 is performed by processing components 423 comprising hardware components including, for example, a field programmable gate arrays (FPGAs), digital signal processors (DSPs) and application-specific integrated circuits (ASICs). These processing components would implement software algorithms, middleware, CORBA (common object request broker architecture) and a virtual radio machine. The channelization and sample rate conversion functionality 420 and baseband processing 422 comprise software implemented components that are implemented within software within the SDR for performing functions such as network routing GUI, encryption, modem error correction and portions of the A/D and D/A conversions. The SDR radio provides a great deal of flexibility in dealing with different in changing transmission conditions and can change transmitting and receiving of signals on the fly based upon its programming.

Figure 5:
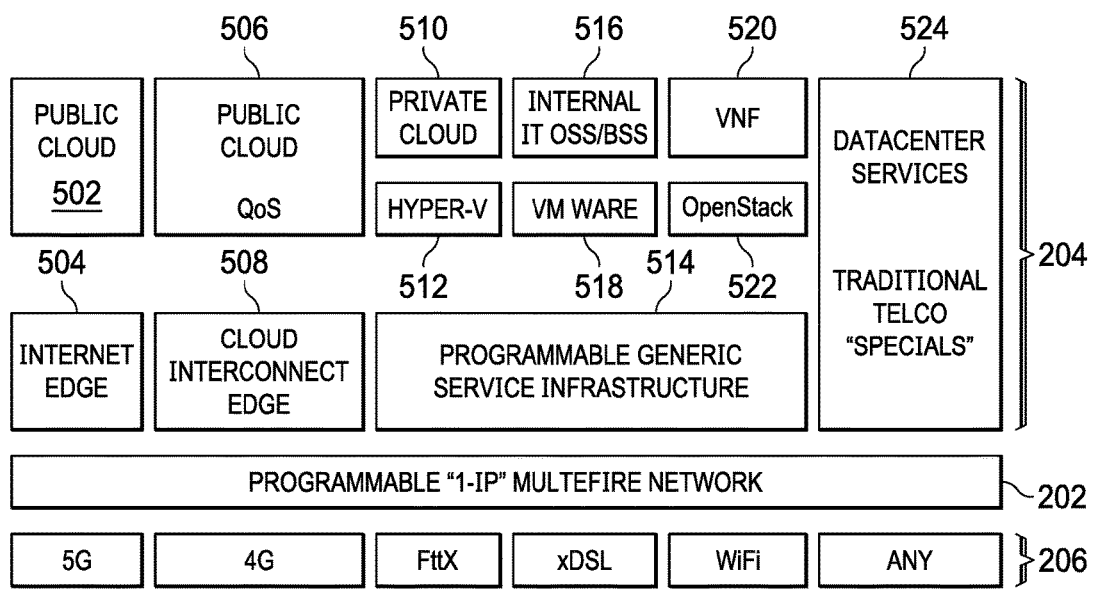
FIG. 5 illustrates a configurable wide area network interconnecting various resources through the cloud.

This is more particularly illustrated in FIG. 5. The configurable/programmable wide area network 202 varies its utilized resources based upon the particular applications or services that are being utilized. A private network may be configured in a similar manner. The various cloud-based services 204 include the public cloud 502 which interconnects to the wide area network through an Internet Edge 504. Internet Edge 504 is a data network to cell phones. A public cloud 506 requiring a particular quality of service may utilize the cloud interconnect edge 508. The cloud interconnect edge 508 is an optimized network that ensures accelerated access to applications hosted in public, private and hybrid clouds.

A private cloud 510 may connect to the wide area network through Hyper-V 312 and a programmable generic service infrastructure 514. Hyper-V 312 is a native hypervisor that creates virtual machines on systems running Windows. It acts as a hardware virtualization component for the client editions of Windows NT server computer running Hyper-V 312 can be configured to expose individual virtual machines to one or more networks. The programmable generic service infrastructure 514 comprises a generic hardware component program to provide a particular service infrastructure. An Internet IT OSS/BSS 516 communicates through VM hardware 518 and the programmable generic service infrastructure 514 with the programmable wide area network 202. The VMware 518 comprises virtualization and cloud computing software. Virtual network functions (VNF) 520 interact with the network through OpenStack 522 and the programmable generic service infrastructure 514. OpenStack 522 is a set of software tools for building and managing a cloud computing platform for public and private clouds. Finally, data center services 524 may provide data services through the wide area network using traditional Telco "specials."

Figure 6:
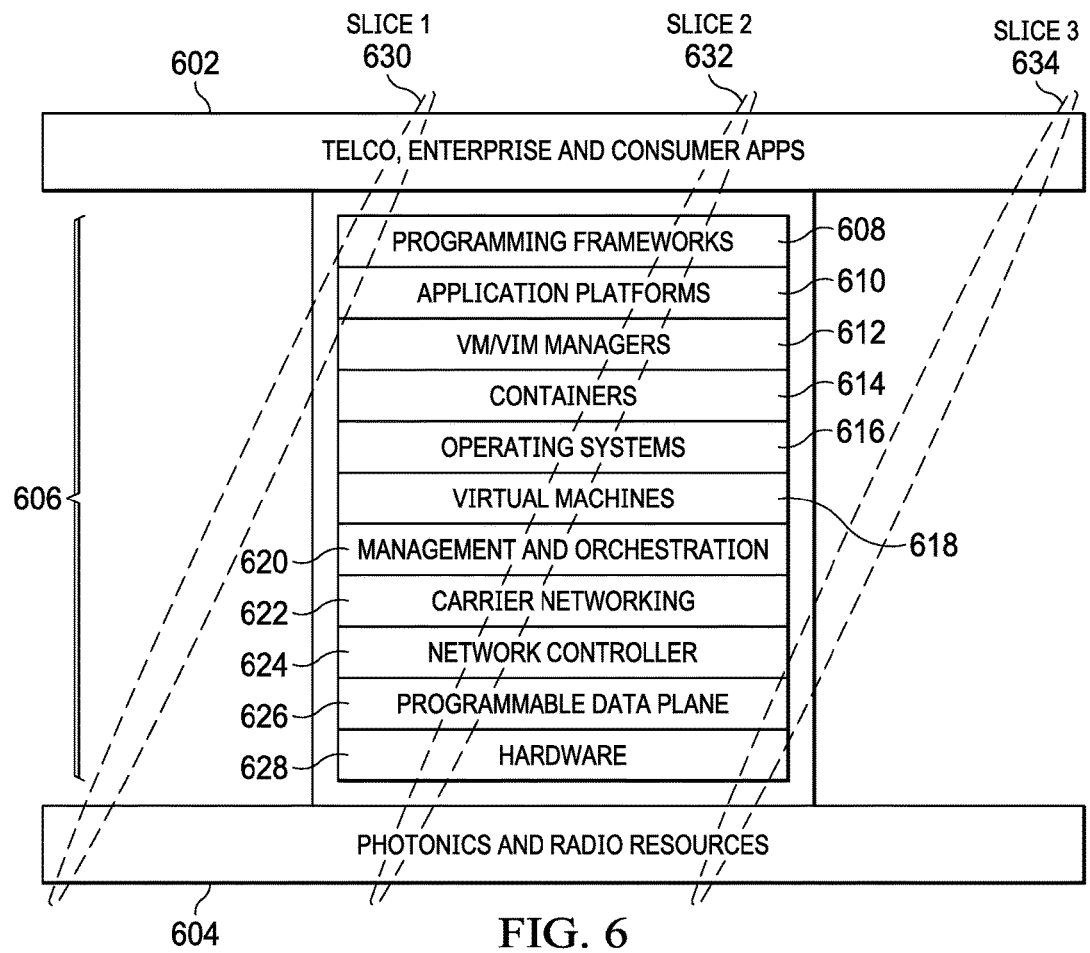
FIG. 6 illustrates one manner for implementation of the configurable network.

Referring now to FIG. 6, there is illustrated one manner in which the configurable network (such as a 3.5-5 GHz private network) may be implemented in order to provide flexible network resources based upon an application's or service's particular needs using network slicing. Various telco, enterprise and consumer applications 602 utilize various photonic and radio resources 604 through a number of control layers 606. The control layers 606 include the programming frameworks layer 608; application platforms layer 610; VM/VIM managers layer 612; containers layer 614; operating systems layer 616; virtual machines layer 618; management and orchestration layer 620; carrier network layer 622; network controller layer 724; programmable data plane layer 726 and hardware layer 628. Various portions of each of the layers 606 are needed to provide interconnection between the telco, enterprise and consumer applications 602 and the photonic and radio resources 604.

As described previously, current network topologies configure the layers to support peak periods. This requires the network to be over configured for all but a small percentage of its operating time. Each of the control layers 606 provide differing amounts of control depending upon the applications 602 and network resources 604 that are being utilized by the system. Thus, various slices of the control layers 606 are utilized when providing particular applications 602 using particular resources 604. Thus, slice 630, slice 632 and slice 634 each utilize various, differing and adaptable portions of the control layers 606 in order to operate a particular application using particular resources. These slices 630-634 can be dynamically adjusted within the system applications and resources depending upon changing system needs. Thus, a slice 630, 632, 634 can be uniquely and adaptively configured to utilize only those network control layers 606 and only those portions of the network control layers that are necessary in order to have the application function in a desired fashion. Thus, the availability of the network control layers 606 can vary depending upon the particular slices 630, 632, 634 that are being currently utilized by the network.

Figure 7:
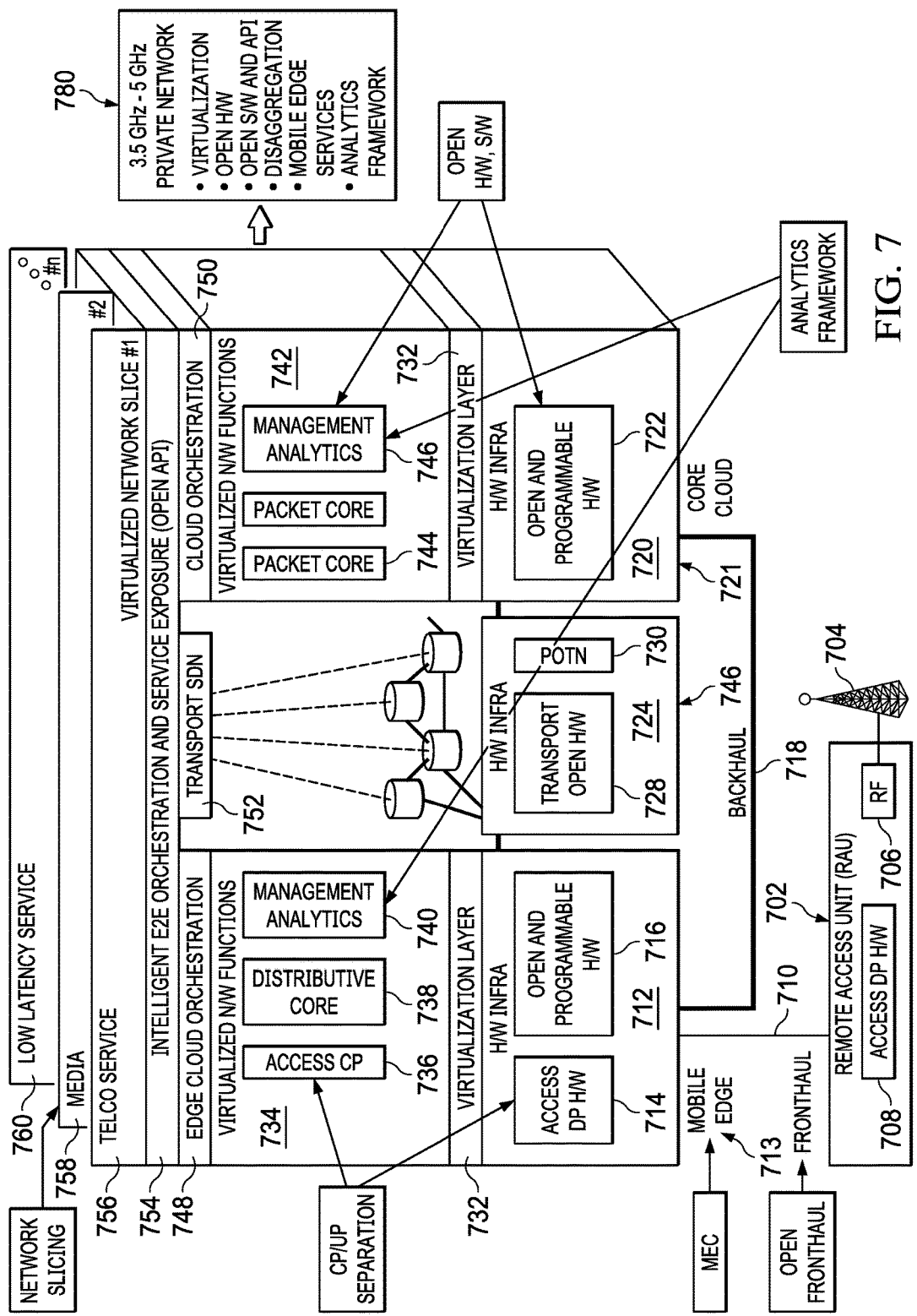
FIG. 7 illustrates a functional block diagram of a system implementing a configurable private network.

Referring now to FIG. 7, there is illustrated a functional block diagram of a system implementing the configurable network (such as a 3.5-5 GHz private network) operating in the manner described hereinabove. A remote access unit (RAU) 702 communicates with a radio antenna 704. The radio access unit 702 includes RF circuitry 706 for communicating with the radio tower and access DP hardware 708 for communicating over the fronthaul 710. A hardware infrastructure 712 associated with the mobile edge 713 includes access DP hardware 714 for communicating with the radio access unit 702. The hardware infrastructure 712 further includes open and programmable hardware 716 for providing a backhaul communications link 718 with additional hardware infrastructure 720 associated with the network core 721. The hardware infrastructure 720 associated with the network core 721 includes open and programmable hardware 722 enabling communications over the backhaul 718. Additional hardware infrastructure 724 is utilize for a transport layer 726. The hardware infrastructure 724 includes transport open hardware 728 and a POTN (packet optical transport network) 730.

Each of the mobile edge network 713 and core cloud network 721 include a virtualization layer 732 on top of the hardware infrastructures 712, 720, respectively. On top of the virtualization layer 732 associated with the mobile edge network 713, a number of virtualized network functions 734 reside. These virtualized network functions 734 include access CP functions 736, distributive core functions 738 and management analytics 740. Another group of virtualized network functions 742 exist upon the virtualization layer 732 within the core cloud network 721. These functions include packet core functions 744 and management analytics 746.

On top of the virtualized network functions 734, edge cloud orchestration functionalities 748 are implemented within the core cloud network 721. Cloud orchestration functionalities 750 are implemented on top of the virtualized network functions 742. Additionally, within the transport layer 726, a transport software defined network 752 enables control of transport between the mobile edge 713 and core cloud 721. The use of software defined networks will be more fully discussed herein below.

On top of each of the orchestration and SDN layers is an intelligent E2E orchestration and service exposure (open API) 754. Through this open API 754, the virtualized network slices 756-760 may be utilized to implement only those network functionalities that are necessary to carry out particular applications using specific hardware resources. Examples of these type of network slices include Telco (telecommunication) services 756; media services 758, such as various types of video streaming; and various types of low latency services 760 that do not require a high latency level in order to perform their functionalities. Each of the slices 756-760 would only utilize as much of the network services within the mobile edge 713, core cloud 721 and transport layer 726 in order to achieve the operations virtualized by each network slice.

As shown generally at 780, the system can provide a 3.5 Hz private network providing a number of functionalities. These functionalities include virtualization 782, open hardware 784, open software and API 786, disaggregation 788, mobile edge services 790 and an analytical framework 792. Each of these functionalities provide for a robust private network providing greater benefits than those in existing private network such as Wi-Fi.

Figure 8:
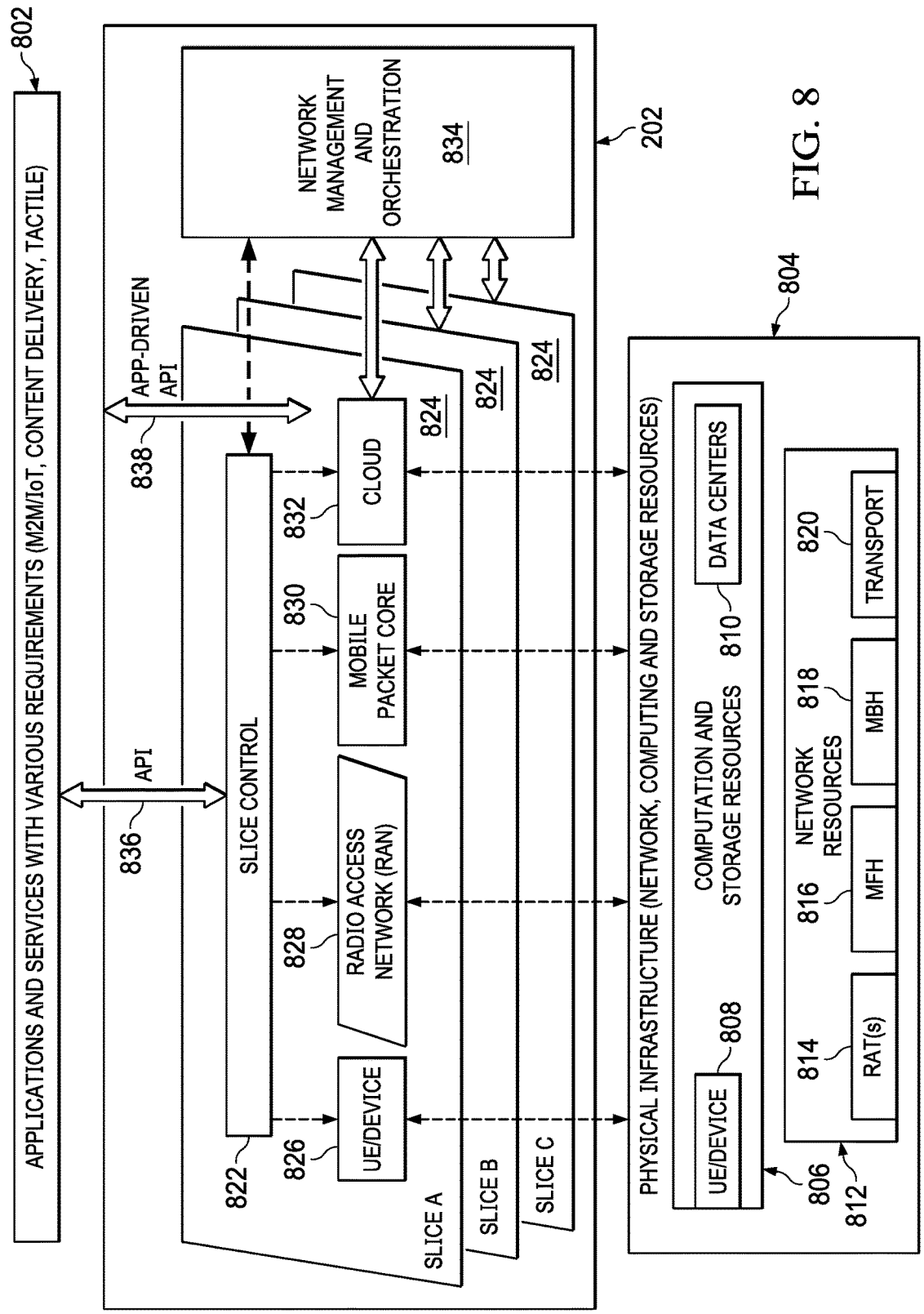
FIG. 8 illustrates a manner in which a configurable private network controls interactions between applications and infrastructure.

Referring now to FIG. 8, there is illustrated the manner in which the configurable wide area network 202 controls interactions between applications and services 802 and the physical infrastructure 804. The applications and services 802 are located within an application layer and have various requirements that differ depending upon the bandwidth needs of the application or service. The physical infrastructure 804 is included within the physical layer hardware and comprises computation and storage resources 806 including items such as user equipment and devices 808 and data centers 810 storing information and accessible resources. The user equipment and devices 808 represent handsets, mobile terminals, sensors, actuators, etc. The physical infrastructure 804 further includes network resources 812 such as radio access towers 814, the mobile fronthaul 816, the mobile backhaul 818 and the transport network 820.

The configurable wide area network 202 comprises the network layer where network functions are implemented in software and includes slice control 822 for selecting the network resources that are required in order to implement a particular application or service that is currently being utilized. The slice control 822 utilizes a number of factors and domain specific orchestration controls in order to establish a particular slice 824. These include user equipment/ device control 826, radio access network control 828, mobile packet core control 830 and cloud control 832. The domain specific orchestration controls may exist individually and for each network provider. The slice control 822 communicates with the various applications and services through an application program interface 836. The network resource controllers 826-832 communicate with the applications and services through an app driven API. Network management and orchestration 834 works with the slice control 822 and the various network resource controls 826-832 in order to establish the various slices 824. Network management and orchestration 834 consolidates management of inter-slice, slice lifecycle and resource management over multiple network domains in end-to-end connections. Within individual slices 824, virtual network functionalities (VNFs) and virtual transport paths are mapped on the sliced network topologies. The slices 824 encompass capabilities of transport control and network functionalities.

Figure 9:
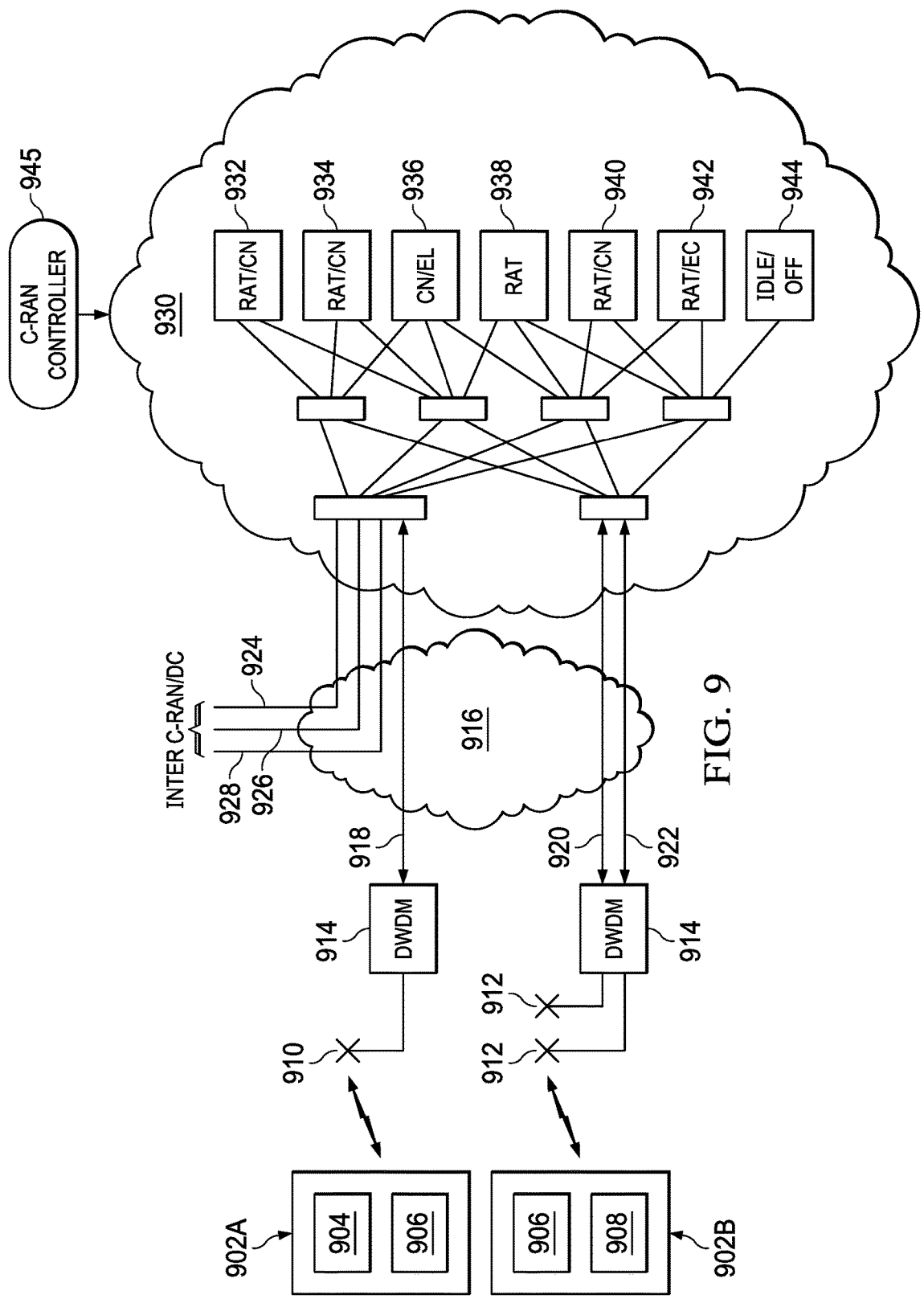
FIG. 9 illustrates a virtualization and slicing process under software control within a cloud radio access network.

Referring now to FIG. 9, there is illustrated a virtualization and slicing process under software control within a cloud radio access network (C-RAN). First and second user devices 902 each implement first and second applications 904, 906 in the case of device 902A and second and third applications 906, 908 in the case of device 902B. The user devices 902 are in wireless communication with antennas 910 and 912. Antenna 910 is associated with the digital radio network while antennas 912 are associated with an analog, digital or packet radio network. Each of the antennas 910, 912 are connected to a dense wavelength division multiplexer 914. The multiplexer 914 implements an optical multiplexing technology that combines and transmits multiple signals simultaneously on different links over the same fiber. The multiplexer 914 establishes a connection through a TSDN hybrid slice fronthaul IDC backhaul 916 link 918 is associated with application 906. Link 920 is associated with application 904, and link 922 is associated with application 908.

A number of GE 400 links 924-928 are provided from an Inter C-RAN/DC network to a CORE/vEPC network through the TSDN hybrid slice fronthaul IDC backhaul 916 to the C-RANs 930. Link 924 is associated with application 906. Link 926 is associated with application 904, and link 928 is associated with application 908.

The cloud radio access network 930 consist of a number of resources including radio access terminals (RATs), CORE network (CN), mobile edge computing (MEC) and other types of server/core functions. In the example of FIG. 9, a number of RAT/CN servers 932, 934 and 940 are used along with CN/EC (edge computing) server 936, RAT server 938, RAT/EC server 942 and an idol/off server 944. The cloud radio access network 930 is controlled through a C-RAN controller 945.

Any resource may be part of any slice. In the example of FIG. 9, a first slice is associated with application 904 and consists of links 920, 926 and resources 938 and 940. The first slice provides ultra-reliable, low bandwidth, long rang and high mobility connection. A second slice is associated with application 906 and consist of links 918, 924 and resources 932, 934 and 936. The second slice provides the highest bandwidth for short range connections. A final slice is associated with application 908 and consist of links 922, 928 and resources 940 and 942. The final slice provides the lowest delay to be used for low signaling connections. Idle resources such as resource 944 may be moved from one slice to another depending upon the needs of the particular slice. Additionally, presently assigned links and resources may be dynamically adjusted depending upon the needs of a particular slice. Resources include virtual machine servers, intra/inter C-RAN B/W, C-RAN to radio configurations of base station and UE devices.

Figure 10:
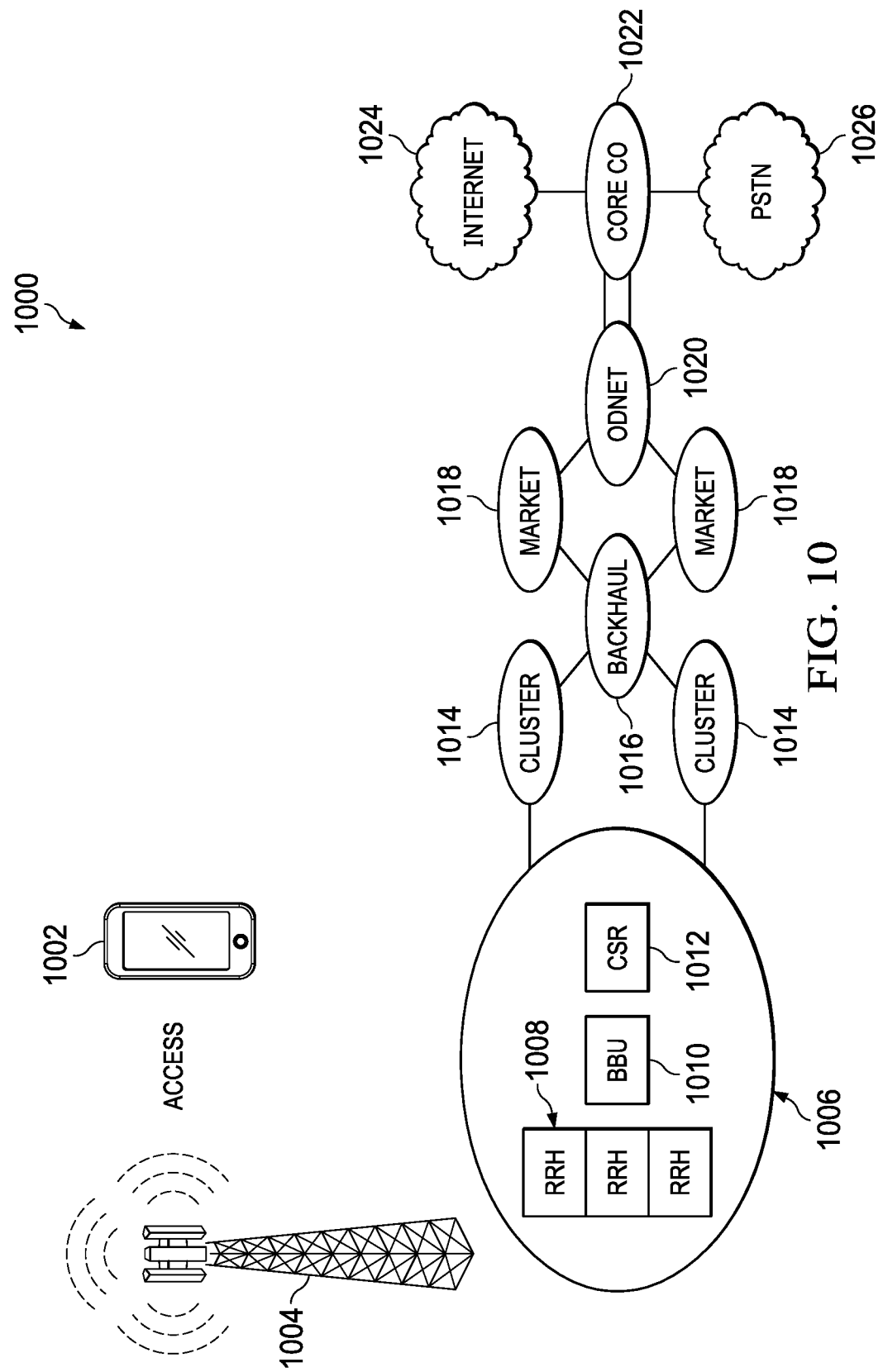
FIG. 10 illustrates a traditional network configuration.

Referring now to FIG. 10, there is illustrated a network configuration for a massive MIMO neutral host network for user in a private network. A user device 1002 establishes a wire connection with an antenna 1004 of the radio access network. Antenna 1004 communicates with the base station 1006. The base station 1006 includes a number of remote radio heads (RRHs) 1008. The RRHs 1008 contains the base stations RF circuitry plus analog-to-digital/digital-to-analog converters and up/down converters. RRHs 1008 have operation and management processing capabilities and a standardized optical interface to connect to the remainder of the base station 1006. The baseband unit (BBU) 1010 processes baseband within the radio link for signals to/from the RRH 1008. The channel state report (CSR) 1012 generates channel state information for the communications link. The base station 1006 is associated with other base stations within a cluster 1014. The cluster 1014 comprises a cluster of cells.

The base station 1006 communications are transmitted from the various clusters 1014 over a backhaul network 1016. The backhaul network 1016 connects to various markets 1018 (particular areas having cell networks) to the optical data network (ODNET) 1020. The optical data network 1020 connects to the core central office 1022. The core central office 1022 communicates with the Internet 1024 or public switched telephone network (PSTN) 1026 in order to download data information or provide voice communications.

Figure 11:
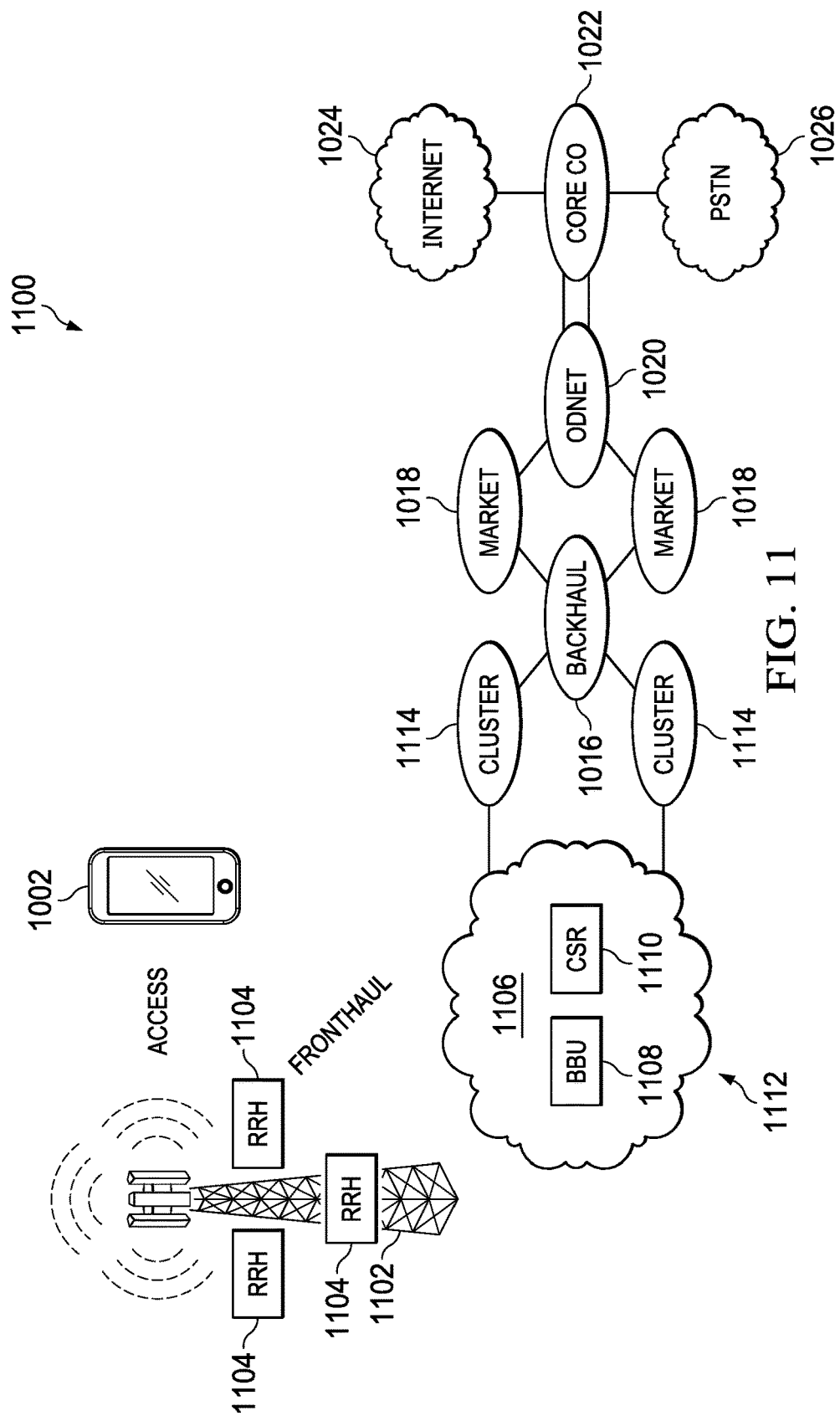
FIG. 11 illustrates a virtual radio access network.

Referring now to FIG. 11, a virtual radio access network 1100 is illustrated. Within the virtual radio access network 1100, the configuration from the backhaul network 1016 to the core central office 1022, and the core central offices connections to the Internet 1024 and the PSTN 1026 are the same as that described with respect to the traditional network 1000 of FIG. 10. The user device 1002 communicates with and antenna 1102 over wireless communication links. The remote radio heads 1104 are located at the antenna 1102 rather than a base station. The remote radio heads are in communication with a virtual base station 1106 virtualized within the cloud that implements a baseband unit 1108 and channel state report 1110 within the network cloud 1112. Virtualized functions are implemented using NFV as will be more fully discussed herein below. Virtualized functions may also use SDN wherein the control functions are taken out of the hardware and implemented within software as will be more fully described. The BBUs communicate with the RRHs over a fronthaul which may be fiber or wireless. The virtual base stations 1106 are associated with other clusters 1114 that communicate through the backhaul network 1016 as described previously.

As systems evolve towards RAN2020, CloudRAN architecture is used to implement RAN real time functions, on-demand deployment of non-real-time resources, component-based functions, flexible coordination, and RAN slicing. With Mobile Cloud Engine (MCE), CloudRAN can support orchestration for RAN real time and non-real-time functions based on different service requirements and transmission resource to perform cloudification (and virtualization) of the RAN.

The RAN real time functions include access network scheduling, link adaptation, power control, interference coordination, retransmission, modulation, and coding. These functions require high real-time performance and computing load. The deployment of sites must include dedicated hardware with high accelerator processing and be located in close to services. The RAN non-real-time functions include inter-cell handover, cell selection and reselection, user-plane encryption, and multiple connection convergence. These functions need low real-time performance and latency requirements and fit for centralized deployment. MCE can support management and coordinating multiple processing capabilities based on regional time, frequency bands, and space. This architecture allows CloudRAN to support 4G, 4.5G, 5G (different bands), and Wi-Fi, and coordination of macro, micro, pico and massive MIMO sites. Network functions are deployed on radio, backbone, or core nodes to maximize network efficiency.

Multi-connectivity is fundamental to the future network architecture. Multi-connectivity with carrier aggregation can support the usage of licensed, shared and unlicensed bands to provide bandwidth hungry applications used by power users that leverage small cells or massive MIMO. Cloud-RAN can be deployed in an unified network architecture. In current fragmented networks, increasing speed and reducing latency can improve user experience. Reliable high-speed data cannot depend on a single frequency band or standard connections. In heterogeneous networks, multi-connectivity helps provide an optimal user experience based on LTE and 5G capabilities, such as high bandwidth and rates of high frequency, network coverage and reliable mobility of low frequency, and accessible Wi-Fi. This could mean a combined coordination of licensed, shared and unlicensed bands to support power users that use high-bandwidth applications. In scenarios that require high bandwidth or continuity, a user requires multiple concurrent connections. For example, data aggregation from multiple subscriptions to 5G, LTE, and Wi-Fi (licensed, shared and unlicensed bands) to aggregate and produce high bandwidth. An LTE network access has to maintain continuity after a user has accessed a 5G high-frequency small cell.

In scenarios that have multiple technologies, CloudRAN can be an anchor for data connection which reduces alternative transmission. In the traditional architecture integrating base stations as an anchor for data connection, LTE, 5G, and Wi-Fi data is aggregated into a non-real time processing module of a specific standard to be forwarded to each access point. In this CloudRAN architecture, non-real time processing functions in access points of different modes are integrated into the MCE, which is as an anchor for data connection. Data flows are transmitted to each access point over the MCE, which prevents alternative transmission and reduces transmission investment.

Figure 12:
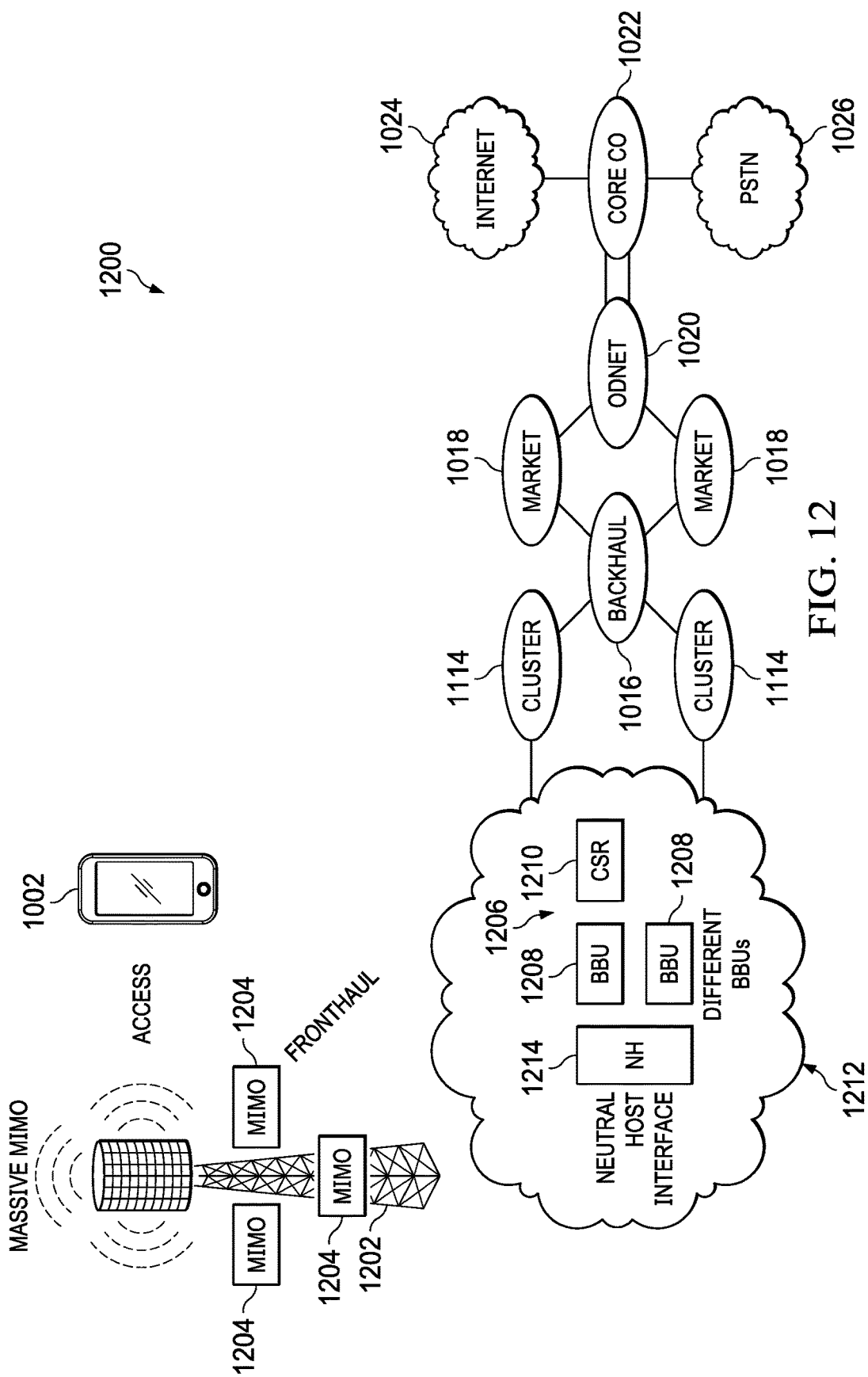
FIG. 12 illustrates a massive MIMO neutral host network.

Referring now to FIG. 12, a virtual radio access network 1200 is illustrated. The virtual radio access network 1200 may be utilized for a private 3.5-5 GHz network. Within the virtual radio access network 1200, the configuration from the backhaul network 1216 to the core central office 1222 and the core central offices connections to the Internet 1224 and the PSTN 1226 are the same as that described with respect to the traditional network 1100 of FIG. 11. The user device 1202 communicates with and antenna 1202 over wireless communication links. The antenna 1202 includes a number of massive MIMO antenna configurations 1204 providing multiple input multiple output transceiver capabilities such as those disclosed in U.S. patent application Ser. No. 15/216,474, entitled SYSTEM AND METHOD FOR COMBINING MIMO AND MODE-DIVISION MULTIPLEXING, filed on Jul. 21, 2016, which is incorporated herein by reference in its entirety. The MIMO transceivers 1204 are located at the antenna 1202 rather than a base station. The MIMO transceivers 1204 are in communication with a virtual base station 1206 that implements a plurality of baseband units 1208 that are each associated with different MIMO transceivers 1204, different network providers and channel state report 1210 within the network cloud 1212. A neural host interface 1214 controls the interactions between the MIMO transceivers 1204 and the base band units 1208. The virtual base stations 1206 are associated with other clusters 1114 that communicate through the backhaul network 1216 as described previously.

Figure 13:
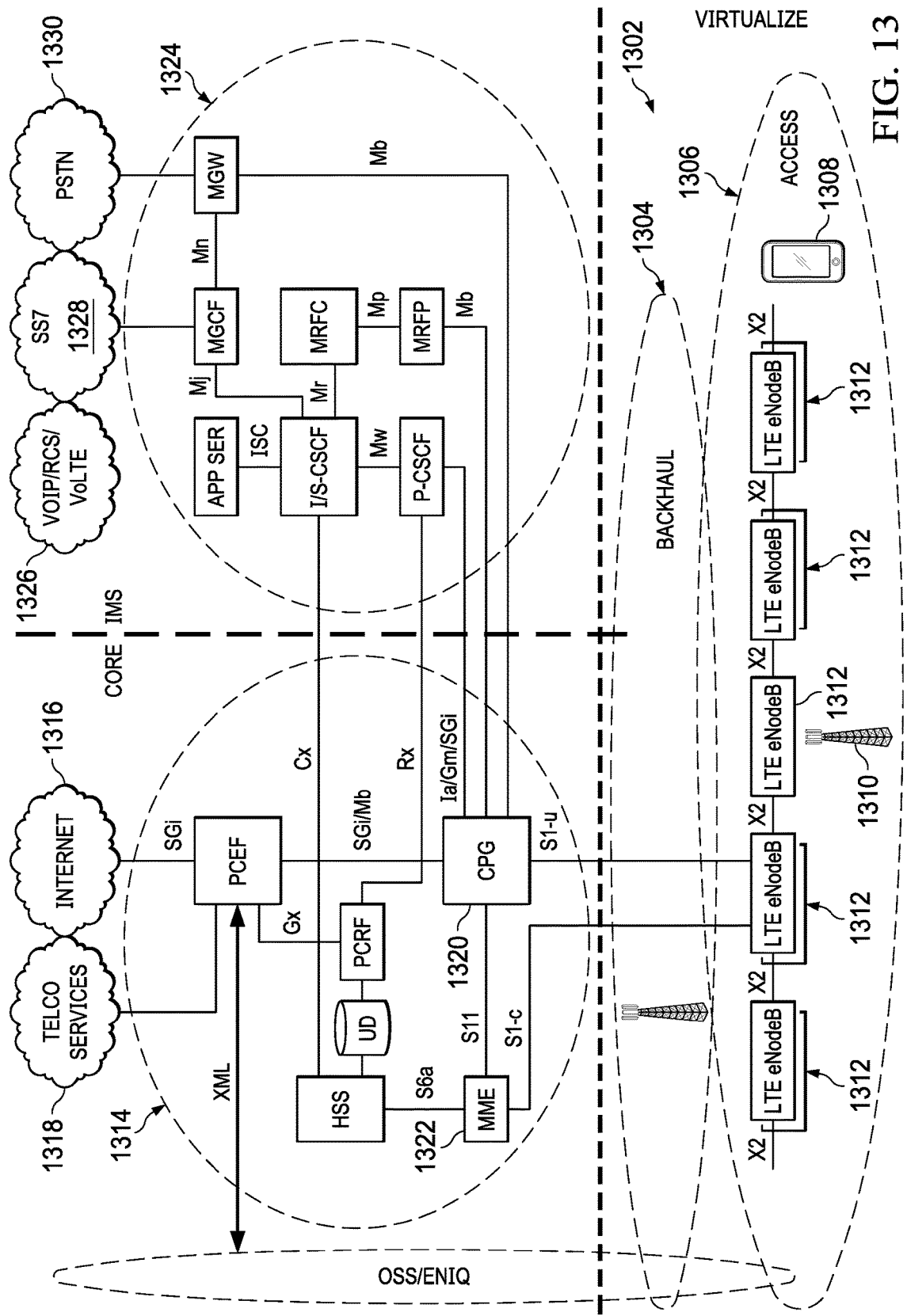
FIG. 13 illustrates a virtualized base station and backhaul network.

Referring now to FIG. 13, there is more particularly illustrated the virtualized base station 1206 and backhaul 1216 portions of the networks that may be virtualized for a private 3.5-5 GHz network. The virtualized portion 1302 consists of the backhaul network 1304 and the access network 1306. The access network 1306 enables a user device 1308 to communicate with an antenna 1310 via an RF link. The antennas 1310 communicate with various LTE eNodeBs 1312. The various LTE eNodeBs 1312 and backhaul network 1304 are implemented in software using, for example, software defined networking (SDN) and network function virtualization (NFV) as will be more fully described herein below. The virtualized backhaul network 1304 communicates with the core network 1314 through a converged packet gateway (CPG) 1320 and a mobility management entity (MME) 1322 to provide access to the Internet 1316 and telco services 1318. The core network 1314 provides access to the Internet multimedia subset (IMS) 1324 to provide access to VOIP/RCS/VoLTE 1326, SS7 network 1328 and the public switched telephone network (PSTN) 1330.

Figure 14A:
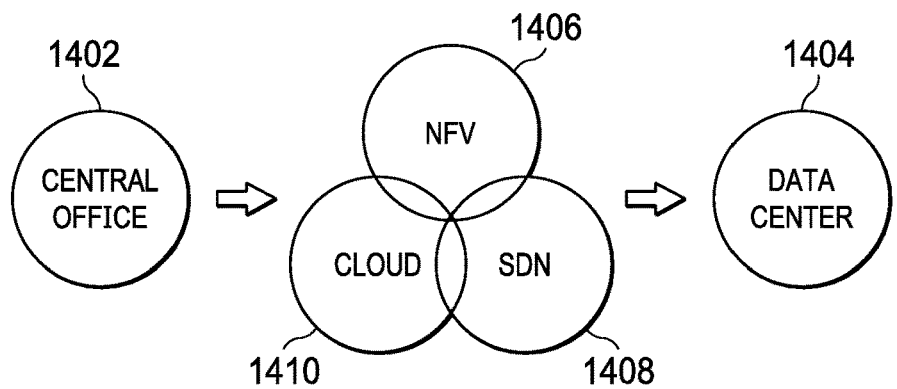
FIG. 14A illustrates the manner in which a central office may be converted to a data center.

Referring now to FIG. 14A, there is illustrated the manner in which a central office 1402 may be converted to a data center 1404 (CORD). The conversion from central office functionalities 1402 to data center functionalities 1404 are carried out using a combination of network function virtualization (NFV) 1406, software defined networks (SDN) 1408 and the cloud 1410. The operation of NFV 1406 and SDN 1408 will be discussed more fully herein below. This reconfiguration of the central office 1402 to a data center 1404 provides for rapid innovation, re-personalizable hardware, agile dev-op models, low cost operating expenses, application network awareness, service programmability, customer control and quick deployment options.

The cloud adaptation of networks, operation systems, and services is the core for an "all cloud" approach to the network (hardware resources, distributed software architecture, and automatic deployment). Operators transform networks using a network architecture based on data center (DC) 1404 in which all functions and applications are running on the cloud data center (cloud-native architecture).

Figure 14B:
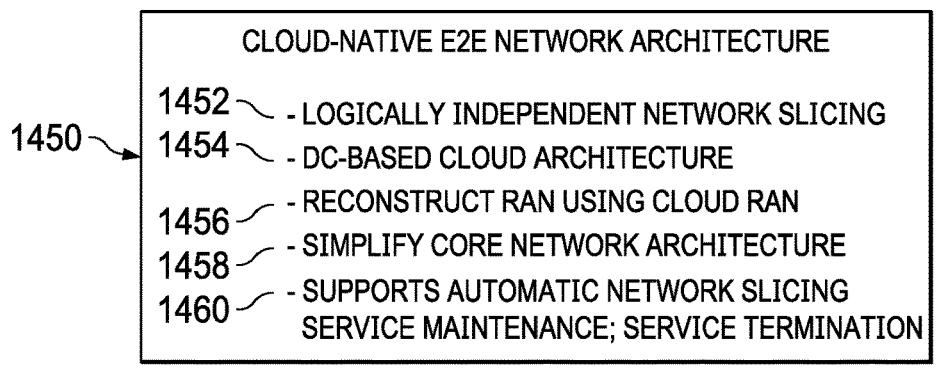
FIG. 14B illustrates a single network infrastructure supporting different services and applications.

As shown in FIG. 14B, in this architecture, a single network infrastructure can support different services and applications. This Cloud-Native E2E network architecture 1450 has the following attributes. The architecture 1450 provides logically independent network slicing 1452 on a single network infrastructure for different service requirements and provides DC-based cloud architecture 1454 to support various application scenarios. The architecture 1450 further uses Cloud RAN and RAN Slicing 1456 to reconstruct radio access networks (RAN) to support massive connections of multiple standards and implement on-demand deployment of RAN functions. The architecture 1450 also simplifies core network architecture 1458 to support on-demand network functions through control and user plane separation and unified database management. Finally, the architecture 1450 supports automatic network slicing service generation, maintenance, and termination for different services 1460 to reduce operating expenses.

New communication requirements for different services are difficult on existing networks in terms of technologies and business models. The next-generation mobile network must support different demands from different applications in different industries on a single network. The international telecommunications union (ITU) has classified 5G mobile network services into three categories: Enhanced Mobile Broadband (eMBB), Ultra-reliable and Low-Latency Communications (uRLLC), and Massive Machine Type Communications (mMTC). The eMBB service targets people's demand for a digital lifestyle and focuses on services that have high requirements for bandwidth, such as high definition (HD) videos, virtual reality (VR), and augmented reality (AR). The high bandwidth requirements are supported by using SDR-based massive MIMO. The uRLLC service focuses on latency-sensitive services, such as assisted and automated driving, and remote management. The mMTC service focuses on services that include high requirements for connection density, such as smart city and smart agriculture. However, a network is needed where all of these different types of networks are possible on one infrastructure and allow network slicing E2E. The described system enables enhanced mobile broadband (eMBB), ultra-reliable low latency communications (URLLC) and massive machine type communication (mMTC) to each be provided on a single infrastructure using end-to-end network slicing.

A number of traditional industries, such as automotive, healthcare, energy, and municipal systems participate in the construction of this ecosystem. 5G allows digitalization process from personal entertainment to society interconnection. The driving forces behind the network architecture transformation include the following aspects. A first factor involves complex networks incorporating multiple services, standards and sites. 5G networks must be able to provide diversified services of different KPIs, support co-existent accesses of multiple standards (5G, LTE, and Wi-Fi), and coordinate different site types (macro, micro, pico base stations as well as massive MIMO). The design challenge to create a network architecture capable of supporting such flexibility while meeting differentiated access demands is very complex to optimize. Another factor involves coordination of multi-connectivity technologies. 5G is expected to co-exist with LTE and Wi-Fi for a long time incorporating multi-connectivity technologies and the new 5G air interface. Multi-connectivity technologies must be coordinated based on traffic and mobility requirements of user equipment to provide sufficient transmission throughput and mobile continuity.

The network must also provide on-demand deployment of services on the site or on the access cloud side. 5G network architecture will be designed based on access sites and three-layer DCs. According to different service requirements, fiber/optic cable availability and network resource allocations, RAN real time and non-real time resources can be deployed on the site or on the access cloud side. This requires that the service gateway location may also be deployed on the access cloud or on the core network side. The network must also provide for flexible orchestration of network functions. Service requirements vary with different network functions. A eMBB service requires a large throughput for scheduling. A uRLLC service requires ultra-low latency and high reliability. Networks must flexibly orchestrate network capabilities considering service characteristics, which significantly simplify network functions and increase network efficiency. Finally, a network must provide a shorter period of service deployment. Different services have expanded the mobile network ecosystem and increased network deployment complexity. Rapidly deploying new services requires better lifecycle management processes involving network design, service deployment, and O&M to rapidly deploy new services.

The service-driven 5G network architecture has to be flexible and efficiently support diversified mobile service requirements. This is achieved using a combination of SDN 1408 and NFV 1406. With software-defined networking (SDN) 1408 and Network Functions Virtualization (NFV) 1406 supporting the underlying physical infrastructure, 5G comprehensively cloudifies and can further virtualize access, transport, and core networks. Cloud solutions 1410 can better support diversified 5G services, and enables the key technologies of E2E network slicing, on-demand deployment of services, and component-based network functions.

CloudRAN 1456 would include sites and mobile cloud engines. This architecture 1450 coordinates multiple services, operating on different standards, in various site types for RAN real time resources that require many computing resources. Networks implement policy control using dynamic policy in the unified database on the core network side. Component-based control planes and programmable user planes allow for network function orchestration to ensure that networks can select control-plane or user-plane functions according to different service requirements. The transport network consists of SDN controllers and underlying forwarding nodes. SDN controllers generate a series of specific data forwarding paths based on network topology and service requirements to implement network optimization or open network capabilities in the API. The top layer of the network architecture implements E2E automatic slicing and network resource management 1460.

Figure 14C:
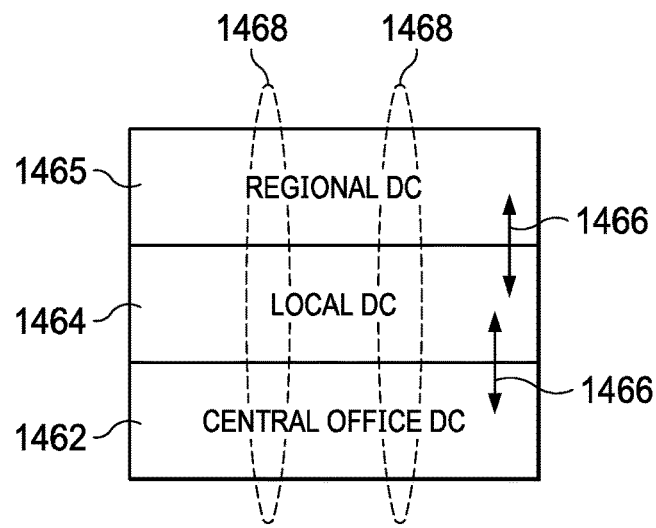
FIG. 14C illustrates a three layer cloud data center.

E2E network slicing 1452, 1460 is a foundation to support diversified 5G services and is key to 5G network architecture evolution. Based on NFV 1406 and SDN 1410, physical infrastructure of the future network architecture would include sites and three-layer DCs. Sites support multiple modes (such as 5G, LTE, and Wi-Fi) in the form of macro, micro, and pico base stations and corresponding massive MIMO at different bands to implement the RAN real time function. These functions have high requirements for computing and real-time performance and require dedicated hardware. As shown in FIG. 14C, three-layer cloud DC includes computing and storage resources. The bottom layer 1462 is the central office DC, which is closest in relative proximity to the base station side. The second layer 1464 is the local DC, and the third layer 1465 is the regional DC, with each layer of arranged DCs connected through transport networks 1466.

As discussed previously based on this architecture to diversify services, networks have topologies and a series of network function (network slices 1468) for each corresponding service type using NFV 1406 on a unified physical infrastructure. Each network slice 1468 is derived from one unified physical network infrastructure, which reduces operators' network costs. Network slices 1468 feature a logical arrangement and are separated as individual structures, which support customizable service functions and independent O&M.

As indicated, eMBB, uRLLC, and mMTC are independently supported on a single physical infrastructure. The eMBB slicing has high bandwidth requirements and has to cache in the mobile cloud engine of a local DC 1464, which supports high-speed services located close to users, reducing bandwidth requirements of the backbone network. The uRLLC slicing has strict latency needs in application of self-driving, assistant driving, and remote management and must be deployed in the mobile cloud engine of the central office DC 1462 (closer to the end user). V2X Server and service gateways must be deployed in the mobile cloud engine of the central office DC 1462, with only control-plane functions deployed in the local 1464 and regional DCs 1465. The mMTC slicing has low network data interaction and a low frequency of signaling interaction in most mMTC applications and the mobile cloud engine can be located in the local DC, with other functions. Therefore, mobile cloud engine can be in the local DC 1464, and other functions and application servers can be deployed in the regional DC 1465, which releases central office 1462 resources and reduces operating expenses.

Figure 15:
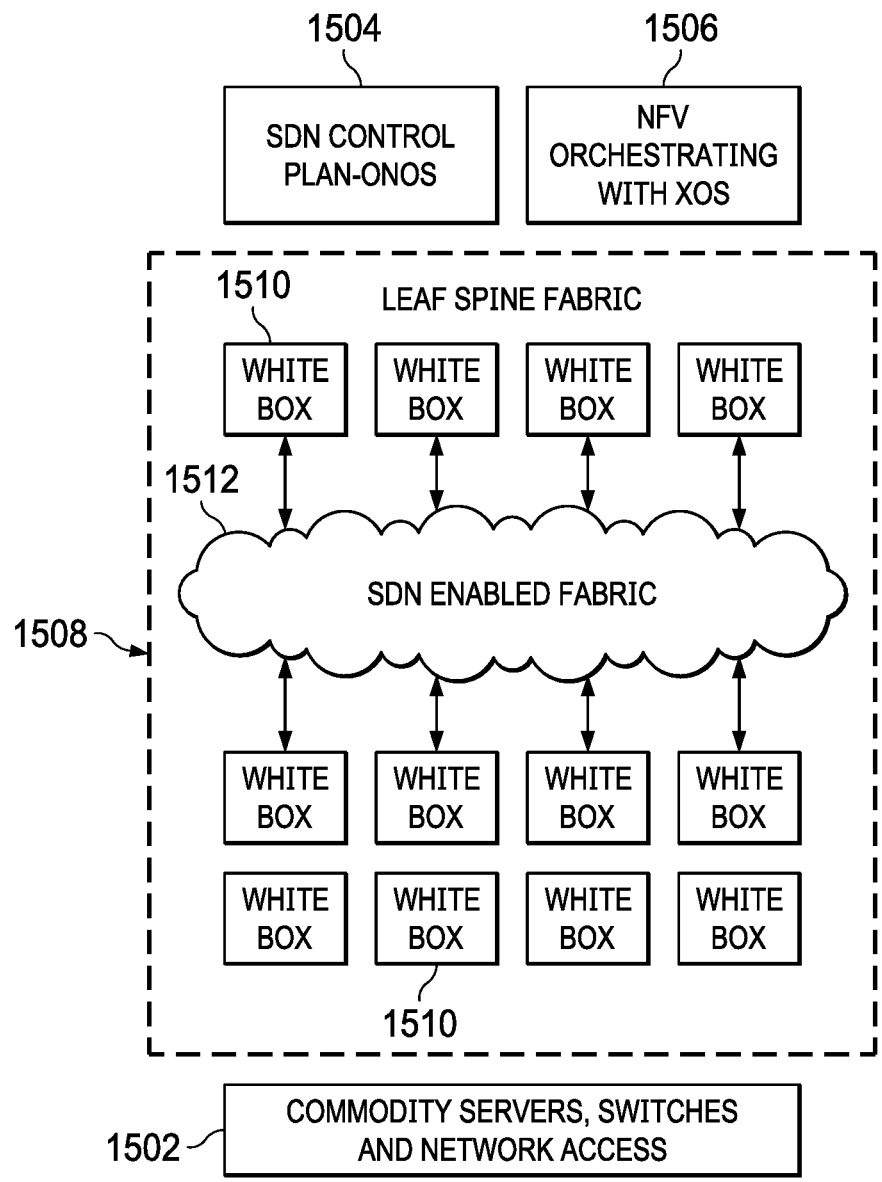
FIG. 15 illustrates the virtualization of the central office to the data center.

FIG. 15 more particularly illustrates the virtualization of the central office 1402 to the data center 1404 using the combination of NSV 1406, SDN 1408 and the cloud 1410. The process uses a number of commodity servers, switches and network access devices 1502 that may be used in combination with SDN control 1504 and NFV orchestration 1506. An inter connection of services and processes are implemented within a leaf spine fabric 1508 using a network of white boxes 1510 that comprise various types of generic network components that are interconnected via an SDN enabled fabric 1512. In SDN and FNV, the defined control structure enables the white boxes 1510 to be utilized in a desired manner or even repurposed in order to provide the virtualized network.

Figure 16:
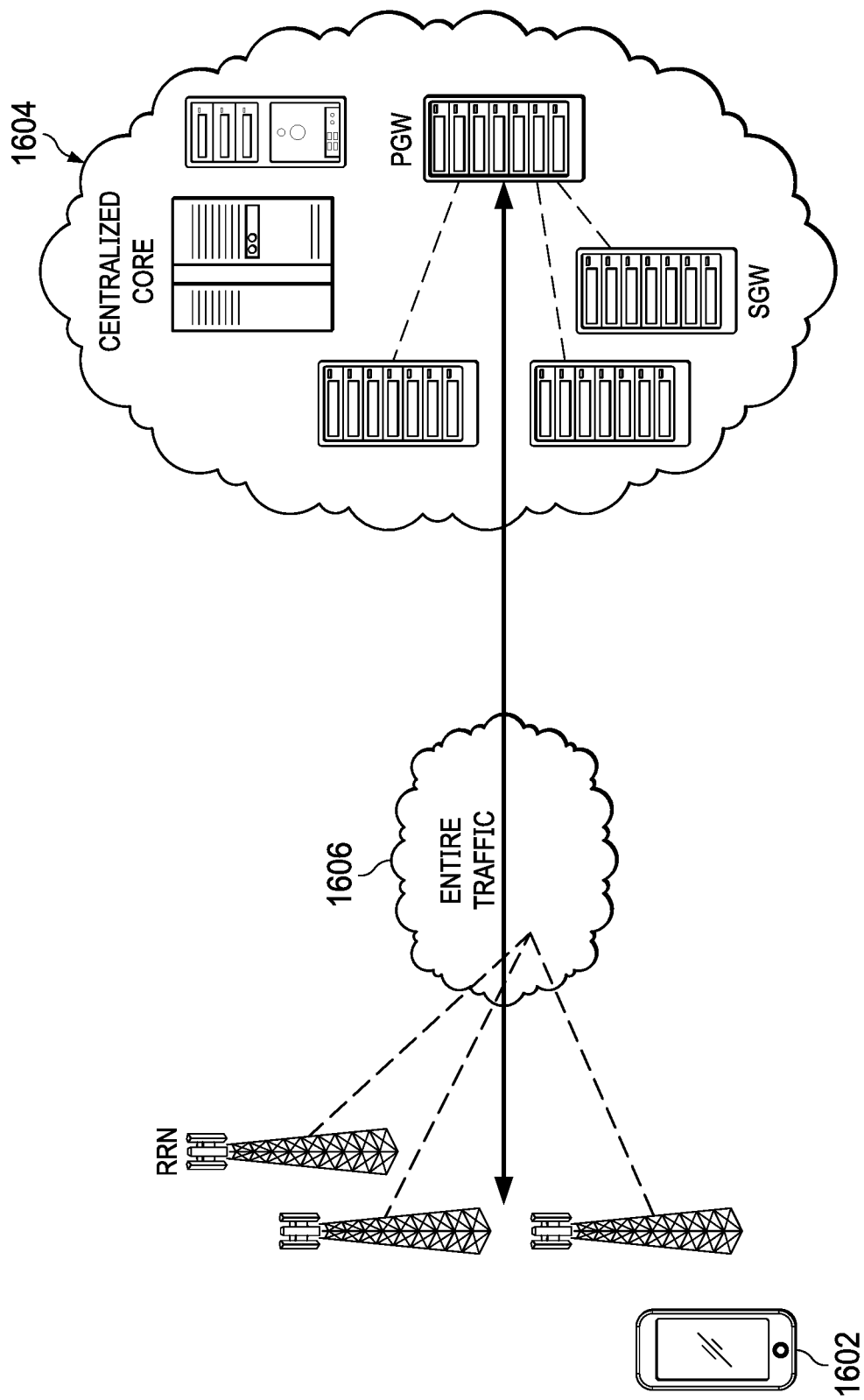
FIG. 16 illustrates the manner in which traditional mobile services are provided to a user device.

Virtualization of the central office enables the use of mobile edge services. Referring now to FIG. 16, there is illustrated the manner in which traditional mobile services are provided to a user device 1602. In this case, a centralized core 1604 transmits all traffic over a network 1606 connecting the centralized core 1604 to the user device 1602. Within traditional mobile service architecture all services are processed at the central core 1604. This requires overloading of the backhaul transport and core EPC. This provides for an inefficient use of network resources and causes a deterioration of the quality of experience of users. This type of implementation can also lead to over provisioning in order to handle peak traffic hours.

Figure 17:
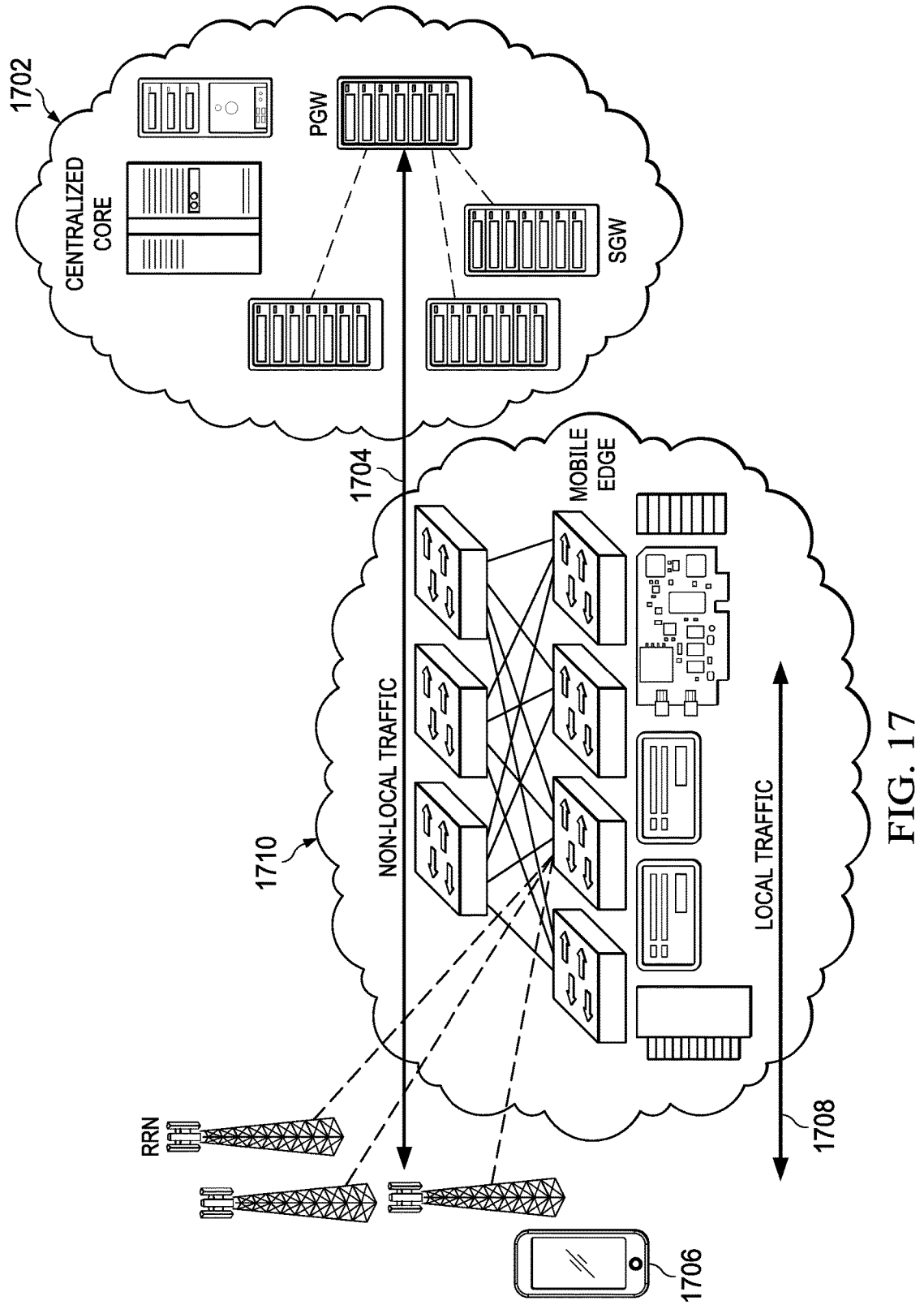
FIG. 17 illustrates a mobile edge computing services system.

FIG. 17 illustrates a mobile edge computing services system wherein the centralized core 1702 communicates only nonlocal traffic 1704 with the user device 1706. With respect to local traffic 1708, a mobile edge network 1710 is used for calculations and determinations in order to locate the processing and communications locally and more closely to the user device 1706. Services that can be processed at the edge network 1710 use M-CORD (mobile central office to data center) systems. Mobile edge services provide the advantage of being proximately located to end users. Mobile edge services provides for innovative and customized services that target customers (Internet of things, smart cities, education, industrial M2M, etc.) mobile edge services provide better efficiencies and new revenue opportunities for system operators.

Thus, CORD has emerged as an important service provider solution platform that brings the economy of the data center and the agility of a cloud. M-CORD integrates disaggregated/virtualized RIN and EPC with mobile edge services into CORD. M-CORD includes the integration of disaggregated eNB and provides connectionless service for Internet of things use cases.

MPEG-DASH is an ISO open standard for the adaptive delivery of segmented control (dynamic adaptive streaming over HTTP). MPEG-DASH-based compression in the mobile edge provides for bit rate trimming, bandwidth minimization, low latency options, HTTP delivery and improve throughput. The key differentiator of DASH, as opposed to any of the other HTTP streaming formats, is its open standard configuration.

Figure 18:
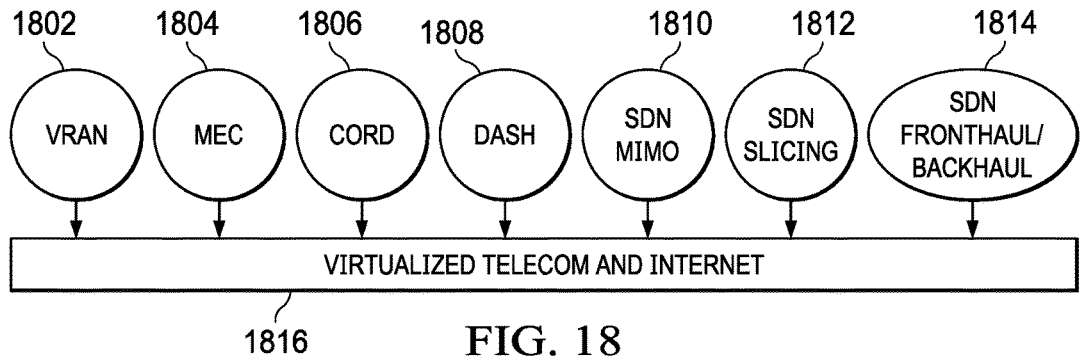
FIG. 18 illustrates the manner for creating a virtualized cloud architecture for telecom and Internet.

Thus, referring now to FIG. 18, by using a cloud native architecture (for example 5G architecture) various combinations of one or more of virtual radio access networks (VRAN) 1802, mobile edge computing (MEC) services 1804, CORD 1806, Dash-based compression 1808, SDN-based massive MIMO 1810, SDN-based end-to-end network slicing with massive MIMO 1812 to optimize the quality of experience for a given application on a same infrastructure, and SDN-based backhaul/fronthaul 1814 ultrabroadband virtualized telecom and internet services 1816 may be provided.

Software-Defined Networks and Network Function Virtualization

Figure 19:
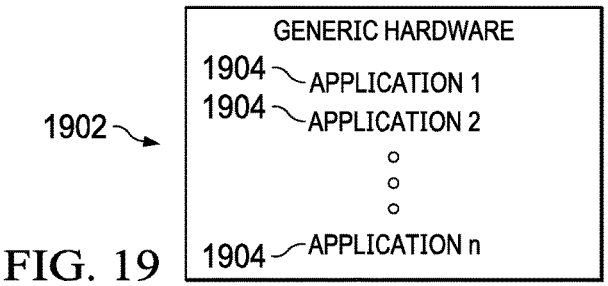
FIG. 19 illustrates a network function virtualization.

Diverse proprietary network hardware boxes increase both the capital and operational expense of service providers while causing problems of network management. Network function virtualization (NFV) addresses these issues by implementing network functions as pure software on commodity and generic hardware. Thus, as shown in FIG. 19, a generic off-the-shelf hardware 1902 may be used to generate a variety of system applications 1904 that are programmed into the hardware. NFV allows flexible provisioning, deployment, and centralized management of virtual network functions. Integrated with Software Defined Networks (SDN), the software-defined NFV architecture further offers agile traffic steering and joint optimization of network functions and resources. This architecture benefits a wide range of applications (e.g., service chaining) and is becoming the dominant form of NFV. Herein below, we introduce development of NFV under the software-defined NFV architecture, with an emphasis on service chaining as its application to Backhaul, Fronthaul and last mile wireless Internet Access. The software-defined NFV architecture is introduced as the state of the art of NFV and presents relationships between NFV and SDN. Finally, significant challenges and relevant solutions of NFV are described and its application domains (i.e. BH/FH/Access) are discussed.

Current network services rely on proprietary boxes and different network devices that are diverse and purpose-built. This situation induces network management problem, which prevents the operation of service additions and network upgrades (ossification). To address this issue and reduce capital expenditures (CapEx) and operating expenditures (OpEx), virtualization has emerged as an approach to decouple the software from the supported hardware and allow network services to be implemented as software. ETSI proposed Network Functions Virtualization (NFV) to virtualize the network functions that were previously carried out by some proprietary dedicated hardware. By decoupling the network functions from the proprietary hardware boxes, NFV provides flexible provisioning of software-based network functionalities on top of an optimally shared physical infrastructure. It addresses the problems of operational costs of managing and controlling these closed and proprietary boxes by leveraging low cost commodity servers.

On the other hand, with the development of Software Defined Networking (SDN), the trend is to integrate SDN with NFV to achieve various network control and management goals (i.e. dynamic resource management and intelligent service orchestration). Through NFV, SDN is able to create a virtual service environment dynamically for a specific type of service chain, consequently the dedicated hardware and complex labor work to provide a new coming service request is avoided. In conjunction with the use of SDN, NFV further enables real-time and dynamic function provisioning along with flexible traffic forwarding.

Software-defined NFV leverages network virtualization and logically centralized intelligence to minimize the service providing cost and maximize the utilization of network resources. In this case, the obtained higher resource utilization will introduce less investigation on the hardware equipment, which on the other hand simplifies networking operations. Moreover, by automating current manually intensive network configuration, provisioning, and management, the time and operational complexity are significantly reduced and manual errors are dramatically decreased, which offers better scalability. On the other hand, especially in large scale networks, deploying and providing a new kind of service usually results in a long and repeated process that requires long cycles of validation and testing. By automating the control, management and orchestration, the deployment time and operation cost will be significantly reduced.

Service chaining is the main area of software-defined NFV. In current networks, a service chain includes a set of hardware dedicated network boxes offering services such as load balancers, firewall, Deep Packet Inspection (DPI), Intrusion Detection System (IDS), etc., to support a dedicated application. When a new service requirement is added, new hardware devices must be deployed, installed and connected, which is extremely time-consuming, complex, high-cost and error-prone. This kind of networking service requires a dedicate plan of networking changes and outages, which requires high OpEx. On the other hand, the architecture of software-defined NFV is able to simplify the service chain deployment and provisioning. It enables easier and cheaper service provisioning in the local area networks, enterprise networks, data center and Internet service provider networks, wireless operator networks and their backhaul, fronthaul and last mile access networks.

The following introduces the state-of-the-art of NFV and its main challenges within the software-defined NFV architecture. Service chaining is highlighted and discussed as a core application of NFV in different contexts. Guidelines are provided for developments of NFV in various applications to backhaul, fronthaul and last mile access.

Software-Defined Network Function Virtualization

To reduce CapEx and OpEx introduced by diverse proprietary hardware boxes, NFV exploits and takes advantage of the virtualization technology. NFV allows network operators and service providers to implement network functions in software, leveraging standard servers and virtualization technologies, instead of purpose-built hardware. Recent trends of increased user information demands, explosion of traffic and diverse service requirements further drive NFV to be integrated with SDN, forming the software-defined NFV architecture. This architecture offers great flexibility, programmability and automation to the operators in service provisioning and service modeling.

Diverse and fixed proprietary boxes make the service, deployment and testing of new systems increasingly difficult. NFV is a key technology to benefit IT virtualization evolution by separating the hardware network functions from the underlying hardware boxes by transferring network functions from dedicated hardware to general software running on commercial off-the-shelf (COTS) equipment, i.e., virtual machines (VMS). These software applications are running on standard IT platforms like high-performance switches, service, and storage. Using NFV, the different network functions can be deployed in different locations of the networks such as data centers, network nodes, and end-nodes of a network edge as required. Currently, the market of NFV includes switching elements, network elements, network services and applications. A summary of these include:

Network switching elements, i.e., Broadband Network Gateway (BNG), carrier grade NAT, Broadband remote access server (BRAS), and routers.

Mobile network devices, i.e., Home Location Register/ Home Subscriber Server (HLR/HSS), Serving GPRS Support NodeMobility Management Entity (SGSNMME), Gateway support node/Packet Data Network Gateway (GGSN/PDN-GW), RNC, NodeB and Evolved Node B (eNodeB) such as that disclosed in T. Wu, L. Rui, A. Xiong, and S. Guo, "An automation PCI allocation method for eNodeB and home eNodeB cell," in *Proc. IEEE 6th Int. Conf. Wireless Commun. Netw. Mobile Comput.* (*WiCOM*), September 2010, pp. 1-4, which is incorporated herein by reference in its entirety.

Virtualized home environments as described in A. Berl, H. de Meer, H. Hlavacs, and T. Treutner, "Virtualization in energy-efficient future home environments," *IEEE Commun. Mag.*, vol. 47, no. 12, pp. 62-67, December 2009 and R. Mortier et al., "Control and understanding: Owning your home net-work," in *Proc. IEEE 4th Int. Conf. Commun. Syst. Netw.* (*COMSNETS*), January 2012, pp. 1-10, each of which are incorporated herein by reference in its entirety.

Tunneling gateway devices, i.e., IPSec/SSL virtual private network gateways.

Traffic analysis elements, i.e., Deep Packet Inspection (DPI), Quality of Experience (QoE) measurement.

Service Assurance, Service Level Agreement (SLA) monitoring, Test and Diagnostics such as that described in H. Ludwig et al., "Web service level agreement (WSLA) language specification," IBM Corp., New York, N.Y., USA, Tech. Rep., 2003, pp. 815-824, which is incorporated herein by reference.

Next-Generation Networks (NGN) signaling such as Session Border Controller (SBCs), IP Multimedia Subsystem (IMS).

Application-level optimization devices, i.e., Content Delivery Network (CDNs), load balancers, cache nodes, and application accelerators such as that described in F. T. Leighton and D. M. Lewin, "Content delivery network using edge-of-network servers for providing content delivery to a set of participating content providers," U.S. Pat. No. 6,553,413, Apr. 22, 2003, which is incorporated herein by reference in its entirety.

Network security devices, i.e., Firewalls, intrusion detection systems, DOS attack detector, virus scanners, spam protection, etc. such as that described in E. D. Zwicky, S. Cooper, and D. B. Chapman, *Building Internet Firewalls*, Sebastopol, Calif., USA: O'Reilly Media, 2000, which is incorporated herein by reference in its entirety.

The major advantage of using NFV is to reduce middle dedicated hardware boxes deployed in the traditional networks to take the advantages of cost savings and bring flexibility. On the other side, NFV technology also supports the co-existence of multi-tenancy of network and service functions, through allowing the usage of one physical platform for different services, applications and tenants.

NFV Framework

Figure 20:
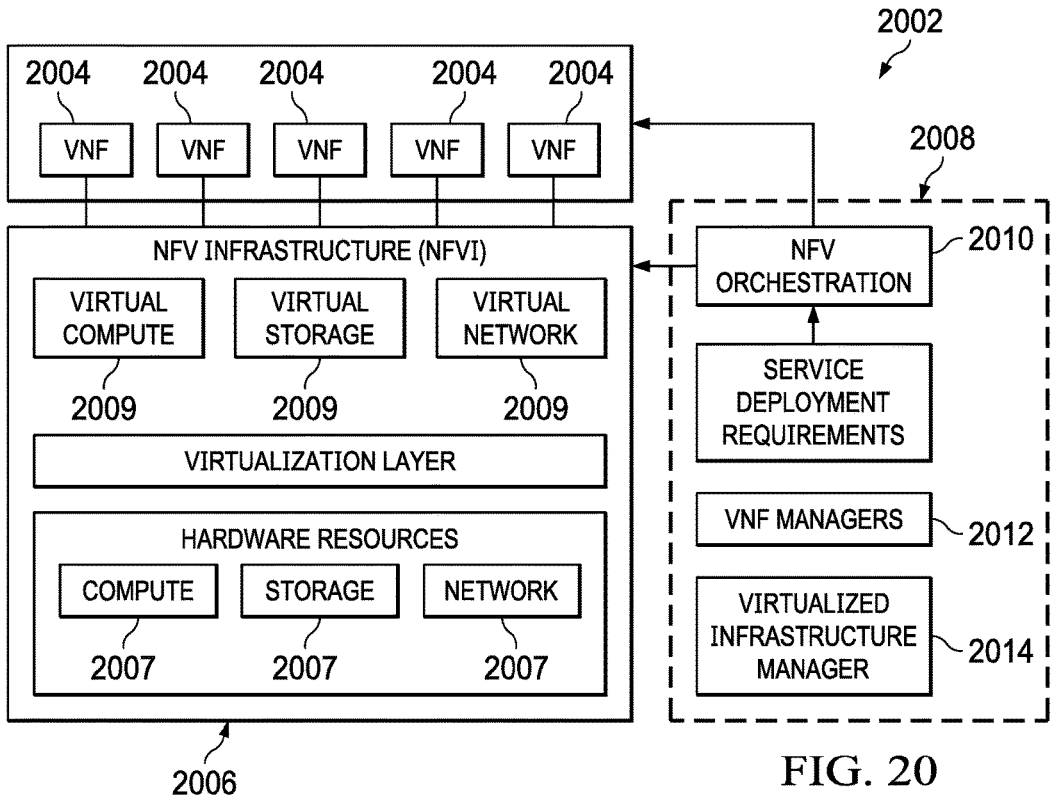
FIG. 20 illustrates a network function virtualization architectural framework.

ETSI defines the NFV architectural framework 2002 as illustrated in FIG. 20 enabling virtualized network functions (VNF) 2004 to be deployed and executed on a Network Functions Virtualization Infrastructure (NFVI) 2006, which consists of commodity servers 2007 to provide computing, storage and network functionalities wrapped with a software layer that logically partitions them. Above the hypervisor layer, a VNF 2004 is typically mapped to one VM (virtual machine) 2009 in the NFVI. The deployment, execution and operation of VNFs 2004 on the NFVI 2006 are steered by a Management and Orchestration (M&O) system 2008, whose behavior is driven by a set of metadata describing the characteristics of the network services and their constituent VNFs. The M&O system includes an NFV Orchestrator 2010 in charge of the lifecycle of network services, a set of VNF managers 2012 in charge of the life cycle of the VNFs and a virtualized infrastructure manager 2014, which can be viewed as an extended cloud management system responsible for controlling and managing NFVI resources.

Software-Defined Networks

A Software-Defined Network (SDN) is an important and recently emerging network architecture to decouple the network control from the data forwarding. With its inherent decoupling of the control plane from the data plane, SDN offers a greater control of a network through programming. This combined feature would bring potential benefits of enhanced configuration, improved performance, and encourages innovation in network architecture and operations.

Especially, SDN offers a promising alternative for traffic steering by programmatically configuring forwarding rules as described in N. Handigol, S. Seetharaman, M. Flajslik, N. McKeown, and R. Johari, "Plug-n-serve: Load-balancing Web traffic using OpenFlow," in Proc. ACM SIGCOMM Demo, 2009, pp. 1-2, which is incorporated herein by reference in its entirety.

Figure 21:
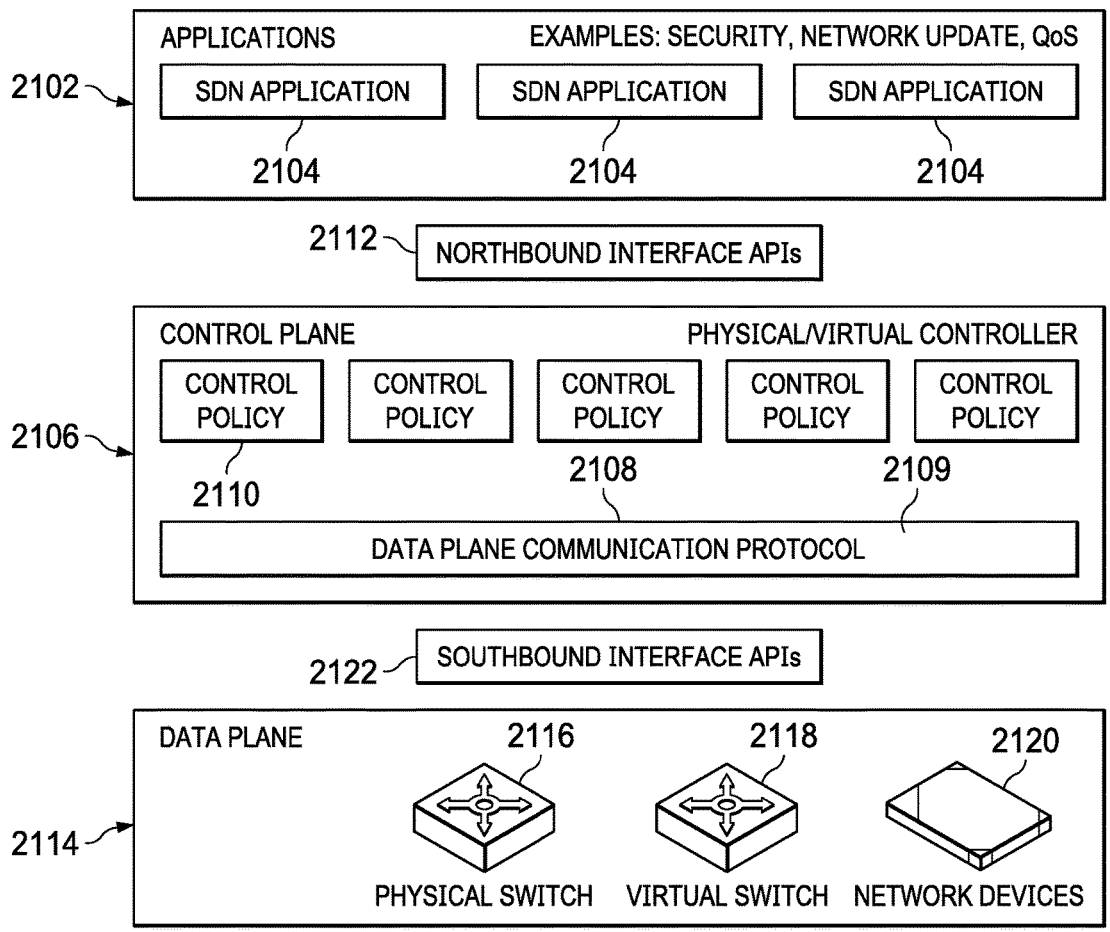
FIG. 21 illustrates software defined network architecture.

FIG. 21 depicts the SDN architecture. There are three different layers. The application layer 2102 covers an array of applications 2104 focusing on network services, and they are mainly software applications communicating with the control layer 2106. As the core of SDN, the control layer 2106 consists of a centralized controller 2108, which logically maintains a global and dynamic network view, takes requests from the application layer 2102, and manages the network devices via standard protocols 2109 using control policies 2110. Communications between the applications layer 2102 and the control layer 2106 occur through application program interfaces 2112. The data-plane layer 2114 provides infrastructure including switches, routers and network appliances through physical switches 2116, virtual switches 2118 and network devices 2120. In an SDN context, these devices are programmable and support standard interfaces. Communications between the control layer 2106 and the data plane layer 2114 occur via application program interfaces 2122.

The application layer 2102 utilizes the northbound APIs 2112 to communicate with the SDN controller 2106 (Control Plane Layer), which enable different control mechanisms for the networks. The southbound APIs 2122 define the communication interface between the controller layer 2106 and data plane devices within the data plane layer 2114, which enable the application to control the forwarding device is a flexible and programmable manner.

NFV Versus SDN

NFV and SDN are closely related and highly complementary to each other. NFV can serve SDN by virtualizing the SDN controller 2106 (which can be regarded as a network function) to run on the cloud, thus allows dynamic migration of the controllers to the optimal locations. In turn, SDN serves NFV by providing programmable network connectivity between virtual network functions (VNFs) to achieve optimized traffic engineering and steering. However, NFV and SDN are completely different from the concepts to the system architecture and functions, which are summarized by the following aspects.

Figure 22:
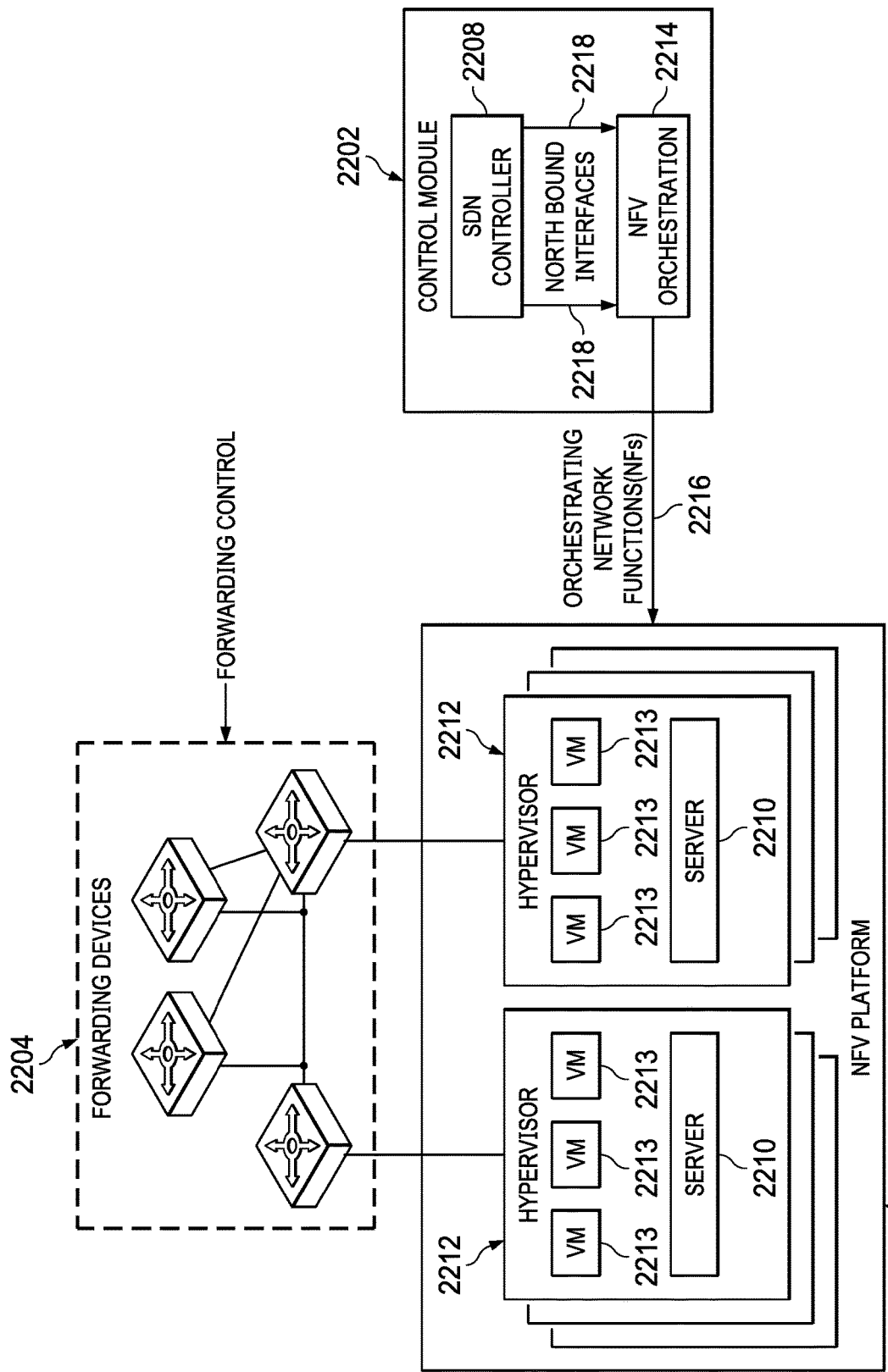
FIG. 22 illustrates a software defined network function virtualization system.

NFV is a concept of implementing network functions in software manner, while SDN is concept of achieving centrally controlled and programmable network architecture to provide better connectivity. NFV aims at reducing CapEx, OpEx, and space and power consumption, while SDN aims at providing network abstractions to enable flexible network control, configuration and fast innovation. NFV decouples the network functions from the proprietary hardware to achieve agile provisioning and deployment, while SDN decouples the network control plane from the data Software-Defined NFV Architecture The software-defined NFV system is illustrated in FIG. 22. The system consists of a control module 2202, forwarding devices 2204 and NFV platform 2406 at the edge of the network. The logic of packet forwarding is determined by the SDN controller 2408 and is implemented in the forwarding devices 2204 through forwarding tables. Efficient protocols, e.g., OpenFlow, can be utilized as standardized interfaces in communicating between the centralized controller 2202 and distributed forwarding devices 2204. The NFV platform 2206 leverages commodity servers 2210 to implement high bandwidth NFs (network functions) at low cost. Hypervisors 2212 run on the servers 2210 to support the VMs 2213 that implement the NFs. This platform 2206 allows customizable and programmable data plane processing functions such as middle box of firewalls, IDSs, proxies, which are running as software within virtual machines, where NFs are delivered to the network operator as pieces of pure software.

Figure 23:
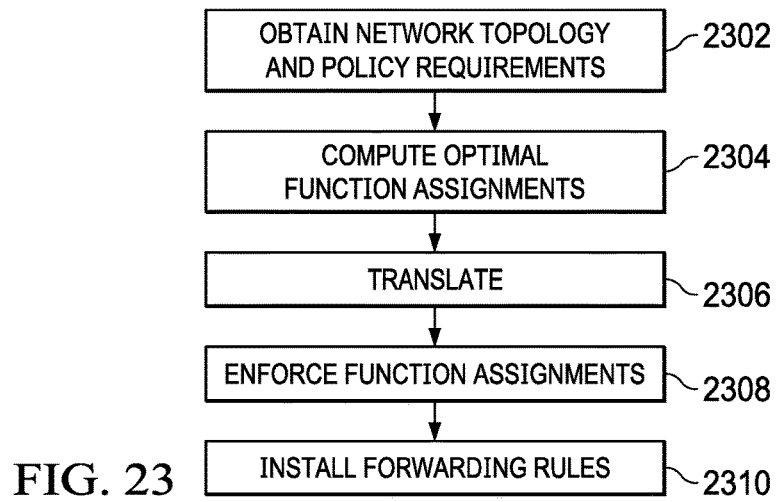
FIG. 23 illustrates a flow diagram describing a process for provisioning functions.

The SDN controller 2208 and the NFV orchestration system 2214 compose the logical control module 2202. The NFV orchestration system 2214 is in charge of provisioning for virtualized network functions 2216, and is controlled by the SDN controller 2208 through standard interfaces 2218. Referring now to FIG. 23, there is illustrated a process for provisioning functions. After obtaining the network topology and policy requirements at step 2302, the control module 2208 computes the optimal function assignments (assigning network functions to certain VMs) at step 2304 and translates at step 2306 the logic policy specifications into optimized routing paths. The function assignments are enforced at step 2308 by the NFV orchestration system 2214, and the controller 2208 steers the traffic traveling through the required and appropriate sequence of VMs 2413 and forwarding devices 2204 by installing forwarding rules into them at step 2310.

From Middle Box to NFV

Though NFV is not limited to virtualizing middle boxes, the concept of NFV was initiated in the context of middle box. The present disclosure introduces the evolution from a traditional purpose-built middle box to NFV, during which consolidated middle box and software-defined middle box act as transitional paradigms.

Middlebox Overview

A middle box is a networking forwarding or processing device that transmits, transforms, filters, inspects or controls network traffic for purposes of network control and management. A middle box service or function is a method or operation performed by a network device that needs specific intelligence about the applications. Typical examples of middle boxes include network address translators (NATs) that modify packet's destination and source addresses, and firewalls that filter unwanted or malicious traffic. The following are commonly deployed middle boxes:

1) Network Address Translator (NAT)
2) Firewall (FW)
3) Intrusion Detection System (IDS)
4) Load Balancer (LB)
5) WAN Optimizer
6) Flow Monitor (FM)

Consolidated Middlebox

Here, an overview for the efforts on consolidating middle boxes is provided, which are precursors to the current NFV paradigm.

1) CoMb
2) APLOMB
3) Integrate Middle Boxes into Network

Software-Defined Middlebox

As SDN evolves, the principles of abstracting the architecture layer of network from the control plane 1906 and data plane 1914 have been investigated in various contexts. This idea introduces some unique opportunities for the development of middle boxes. Inspired by the idea of SDN, some researchers proposed a software-defined middle box and corresponding networking architecture, with the aim of providing fine-grained and programmable control over the middle box state and network forwarding.

Service Chaining

Service chaining is an important model for network service providers, in which NFV plays an important role. It is utilized to organize the service function deployment, where the ability of specifying an ordered list of service processing for the service's traffic flows is provided. A service chain defines the required processing or functions and the corresponding order that should be applied to the data flow. These chains require the integration of service policy and the above applications to achieve optimal resource utilization.

Traditional service chaining mainly relies on manual configuration which is tedious, error-prone and clumsy. SDN provides new capabilities to steer traffic dynamically based on user requirements. However, hardware-based middle boxes limit the benefit of SDN due to their fixed functionalities and deployment. NFV is a good enabler for SDN. With the ability of dynamic function provisioning offered by NFV and the centralized control of SDN, new opportunities emerged in service chaining. Better performance and resource utilization can be achieved with the software-defined NFV architecture.

SDN & Middle Box Based Service Chaining

SDN offers the flexible control approach and enables dynamic traffic forwarding, and this style of traffic control for middle box-specific flow can realize flexible and efficient service chaining with no need to generate any placement or introduce some constraints on middle boxes, which are on the other hand easily supported by current SDN standards. The following are some of the important functions:

1) Symple
2) Steering
3) Flowtag

Service Chaining in the Software-Defined NFV Architecture

SDN and NFV together have the potential to benefit service operators, satisfy user service level agreements and accurately monitor and control network traffic, which further reduces and minimizes the operating cost. On one hand, NFV moves network functions out of dedicated hardware boxes to the software based on general hardware platform. SDN moves control functions out of the hardware and places it in the software controller. Therefore, the service deployment and service chains can be provided and reconfigured in the controller. In this way, not only flexible and dynamic operations are allowed, the chance for operation error and events will be much smaller because the network controller has an overall view, which reduces the probability of inconsistent configurations.

Moving the required network functions into software means that deploying the service chain no longer requires acquiring a dedicated middle box. In this case, the network functions execute as the software running on virtual machines with the control of a hypervisor 2412, which enable flexible computational and networking resource provisioning. Thus, since the computational capacity can be increased when required, there's no need to over-provision. On the other hand, software-defined NFV service chaining also helps the network upgrade process. For geographically distributed networks, upgrading network devices is costly. Moreover, the errors in the network updates and re-configuration can bring down the entire network. However, with the software-defined NFV, service providers are able to create new chains without radically changing hardware. Finally, service operator can utilize these service chaining techniques by themselves, instead of using third party providers. With intelligent service chaining, complexity of resource provisioning is significantly reduced. Thus, service providers can deliver services on demand without the help of third parties.

Figure 24:
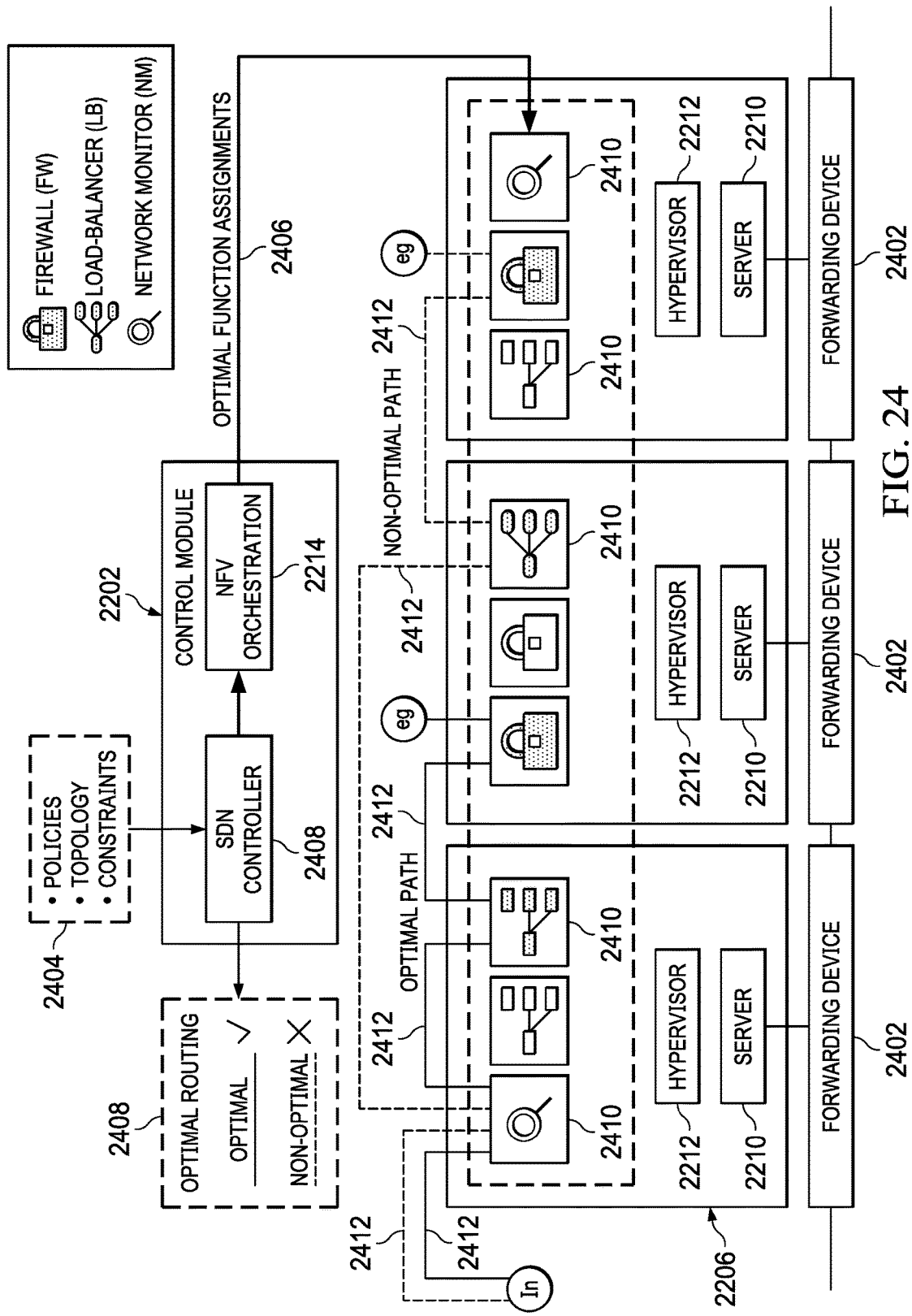
FIG. 24 illustrates an example of a service chaining process.

FIG. 24 illustrates an example of the service chaining process. Within a software-defined NFV architecture, a unified control and orchestration framework is required to integrate the SDN controller 2208, forwarding elements 2402 and virtual network functions 2004. Moreover, due to the existence of dynamic function and resource provisioning, this framework should also provide coordinated control of both network forwarding state and network functions states. Taking user policies 2404 as inputs, the control module 2402 assigns the NFs 2206 fulfilling these services in an optimal way and meanwhile the optimal routing paths 2408 of all policies are selected taking account of the resource constraints. The service functions 2410 are then chained by the centralized controller and the traffic flows 2412 are steered according to the service chains.

Challenges and Problems of Network Function Virtualization

NFV is an important innovation and a promising approach for the service operators and providers. However, it also faces several challenges. Here the corresponding challenges, open problems, and related solutions are summarized with the classifications organized in Table 1.

Function Virtualization

The virtualized functions should meet performance requirements to support packet processing at line-rate for multiple tenants. First, since neither the hypervisors 2212 nor the virtual machines 2213 have been optimized for the processing of the middle box, obtaining high performance, i.e., high I/O speed, fast packet processing, short transmission delays, etc. from standard servers is the main challenge for function virtualization. Further, as a server may implement a large amount of functionality, their platforms should host a wide range of virtual machine 2213 and software packages. Finally, NFV hardware and software platforms should support multi-tenancy, because they are concurrently run by software belonging to the different operators. These co-located VNFs 2004 should be isolated not only from a security but also a performance point of view. Here is a summary of some important related works on function virtualization.

1) DPDK is a set of libraries and drivers for fast packet processing for the network functions. DPDK can be run on a wide range of processors. However, the DPDK system has some limitation to support virtualization as it cannot support flexible, high performance functionality in the NFV environment.
2) NetVM is a software platform for running diversity network functionality at line-speed based on the general commodity hardware. It takes advantage of DPDK's high throughput packet processing capabilities, and further enables flexible traffic steering and overcomes the performance limitations of hardware switching. Thus, NetVM provides the capability to support network function chains by flexible, high-performance network elements.
3) ClickOS is a high-performance, virtualized software network function platform. It provides small, quickly booting, and little delay virtual machines, and over one hundred of them can be concurrently run while guaranteeing performance on a general commodity server. To achieve high performance, ClickOS relies an extensive overhaul of Xen's I/O subsystem to speed up the networking process in middle boxes. ClickOS is proof that software solutions alone are enough to significantly speed up virtual machine processing, to the point where the remaining overheads are dwarfed by the ability to safely consolidate heterogeneous middle box processing onto the same hardware.

Portability

The NFV framework is expected to support the loading, executing and moving of VNFs 2004 across different but standard servers in multi-vendor environments. This capability is known as portability. These virtualized network functions 2004 defeat the portability goal and key benefits of NFV, namely the capability of multi-tenancy and resource isolation. The portability challenge is how to achieve high performance leveraging hardware accelerators and at the same time have hardware independent NFs. This approach ensures that the VNFs 2004 are OS-independent and resource isolation is also guaranteed since the VNFs 2004 are executed on independent VMs and are decoupled from the underlying OS by the hypervisor layer.

Standard Interfaces

NFV relies on existing infrastructure to touch the customer. In this case, it is also highly unlikely that an upgrade of the physical network or entire operational support systems will be feasible. This is a management software integration challenge with the interfaces between NFV and underlying infrastructure. On the other hand, the interfaces between the centralized controller and VNFs 2204 should also be standardized. To smoothly bridge NFV with upper and lower layers, the VNFs 2204 and the underlying computing platform should be described by standard templates that enable flexible control and management. Thus, north- and south-bound interface APIs 2112, 2122 need to be developed. North-bound interface 2112 interactions are used to control and manage functions to different types of instances, e.g., physical servers, VM 2013 and VNFs 2004. Since network functions need service-oriented APIs to be controlled directly or indirectly, each network service has a specific operation policy and SLA. Moreover, VNFs 2004 could use the north-bound API 2112 for the requests. On the other hand, the south-bound APIs 2122 are utilized to communicate with the NFVI 2006 and request information from other framework entities. Thus, how to design a flexible and efficient API for both the north-bound and south-bound communications are important problems in the research and development of NFV technologies.

Function Deployment

Fine-grained deployment, control and management of network functions are needed in the context of NFV-enabled network nodes, for various optimization purposes. Thus, many challenges are related to algorithm and system design of function deployment.

One of these challenges is to automatically provide network and function process resources according to the usage of the resources involved. A similar and probably even more important challenge is to achieve automatic placement and allocation of the VNFs 2004, since the placement and assignment of the VNFs 2004 significantly impact the performance of service chaining. Both automated provisioning and placement require a global view of the resources and a unified control and optimization system with various optimization engines running in it. Another issue is to translate higher-level policies, which are generated from the resource allocation and optimization mechanisms, into lower level configurations. Templates and standards should be developed to guarantee automated and consistent translation. For example, when there is a need to achieve a high-level goal of reducing the networking transmission delay, the optimization engine may require an algorithm to provision and place virtual functions ensuring that the least overall transmission delay is achieved. Conversely, when it is required to achieve the minimum or maximum link utilization, it would need a different optimization engine with a different algorithm. For more effective operation and control, the optimization approach should support real-time swap to make provisioning and placements that dynamically match the high-level policies from the operator and application.

Traffic Steering

SDN offers the new agility of traffic steering by allowing the network operators and service providers to specify a logical control policy, and then automatically translates this into data plane 2114 forwarding rules. Prior to this, the routing paths are carefully selected by the optimization framework taking into account the physical topology, link capacities, and network resource constraints. Solid work has been done on traffic steering in hardware based middle box systems. However, in the software-defined NFV architecture, traffic steering is jointly optimized with NFV deployment that can achieve better composition. However, the unified optimization paradigm also makes the optimization problem difficult to solve since more variables are introduced. To achieve online computing of traffic steering, heuristic algorithms should be designed to reduce the computing complexity.

TABLE 1

| Challenges | Description | Solution |
|---|---|---|
| Function Virtualization | Virtualized functions should meet certain requirements to support packet processing at line-rate: (1) High performance (high I/O speed, fast packet processing, short transmission delays, etc.) (2) Support multi-tenancy (3) OS-independent | Important related works: (1) DPDK, a set of libraries for fast packet processing. (2) NetVM, a system for running network functionality and middlebox at line-speed in general commodity hardware. (3) ClickOS, a small, quick-boot, low-delay, virtualized software middlebox platform. |
| Portability | The NFV framework is expected to load, execute and move VNFs across different but standard servers in multi-vendor environments. This capability is known as portability. | Deploying network functions via a virtual software environment enhances the portability. This approach ensures that the VNFs are OS-independent and resource isolation is also guaranteed. |
| Standard Interfaces | Standardized API should be developed to enable NFV to reach the customers via underlying infrastructure and to be centrally controlled and managed. | Both VNFs and computing resources are described via standard templates. Normalized north- and south-bound should be developed between these layers. |

TABLE 1-continued

| Challenges | Description | Solution |
| --- | --- | --- |
| Function Deployment | Fine-grained deployment, control and management of network functions, are needed in the context of NFV-enabled network nodes, for various optimization purposes. | A monitoring system collecting and reporting on the behavior of the resources, and a unified control and optimization system with various optimization engines should be developed. |
| Traffic Steering | In the software-defind NFV architecture, traffic steering should be jointly optimized with function deployment, making the optimization problem difficult to solve. | To achieve online computing of traffic steering, heuristic algorithms should be designed to reduce the computing complexity. |

Applications

Software-defined NFV technology is used for delivering significant benefits in niche applications today, while its full scale use and benefits have yet to be achieved. The following describes the major domains of the software-defined NFV scenario.

Cloud-Computing

Cloud computing enables globally distributed services and enterprises to quickly deploy, manage and optimize their computing infrastructure dynamically. Partitioning or replicating a service across multiple globally distributed instances allow these services to move closer to the users thus providing richer user experiences, avoid infrastructure bottlenecks, and implement fault tolerance.

NFV is an enabler of such dynamic service provisioning. By replacing service elements with virtual network functions, new functions can be added or improved by updating a software image, rather than waiting for a vendor to develop and manufacture a dedicated box. Furthermore, while integrated with SDN, service providers can express and enforce application traffic management policies and application delivery constraints at the required level of granularity.

NFV allows service providers to provide better services to the users by dynamically changing their deployment topologies or traffic allocations based on user access patterns, user consumption and mobility, infrastructure load characteristics, infrastructure failures and many such situations that may cause service degradation, disruption or churn. Similarly, replicated service instances might need to be moved/instantiated/released to mask infrastructure failures, load conditions, or optimize the deployment based on consumption patterns and social interaction graphs. NFV can also provide intelligent infrastructure support for such dynamic service deployment scenarios. Moreover, since NFV offers good support for multi-tenant usage, it is available for wide area dynamic multi-cloud environments that can be shared by multiple providers to implement their specific distributed service delivery contexts.

Below are summarized some important works trying to implement NFV in clouds:

1) CloudNFV
2) THE REALTIME CLOUD
3) CLOUDBAND

Mobile Network

NFV considers all network functions for virtualization through well-defined standards, i.e., in mobile network, NFV targets at virtualizing mobile core network and the mobile-network base station. NFV also benefits data centers owned by mobile service providers, including mobile core network, access networks and mobile cloud networks.

For the core networks, which are the most important part of mobile networks, NFV allows the cellular providers to adopt a network more akin to the data centers, which consist of simple forwarding devices 2204, with most functionality executed in commodity servers that are close to the base stations. Some network functions can even be fulfilled by packet-processing rules installed directly in the switches. In the system, a logically centralized controller is able to steer the network traffic through the required network functions to realize service chaining.

For the access networks, the base stations are being virtualized as well. Thus, SDN and NFV are applied to the wireless access networks to sharing their remote basestation infrastructure along with optimization with constraints to achieve better coverage and services with the minimum investment of CapEx and OpEx.

Enterprise Network

NFV is also being utilized in the enterprise network. Network managers would like to consume as much or as little of the network as they need, but there is a gap between what enterprise customers want and what service providers can offer today, which can be address by NFV. It enables the dynamic provisioning of virtual network services on commodity servers within minutes instead of months.

NFV for the enterprise will require their platform to become more comfortable embracing software L4-7 services, as well as changes in their operation models. An understanding of how to optimize performance with DPDKs, and potentially even looking at programmable hardware is critical. Another challenge is the time and process it takes to re-architect monolithic services that were predominantly deployed for north-south traffic.

A comprehensive overview of NFV within the software-defined NFV architecture is provided. NFV and its relationship with SDN has been introduced. The evolution of NFV has been reviewed and the discussion has covered how middle boxes evolved to virtual network functions. In particular, service chaining as a typical application of NFV has been described. Furthermore, software defined NFV challenges and possible solutions were covered. Next, a discussion of how to take the SDN and NFV concepts and leverage them in planning, designing and implementing a wireless backhaul, fronthaul and last mile access networks using standard based protocols as well as open source protocols will be provided.

Figure 25:
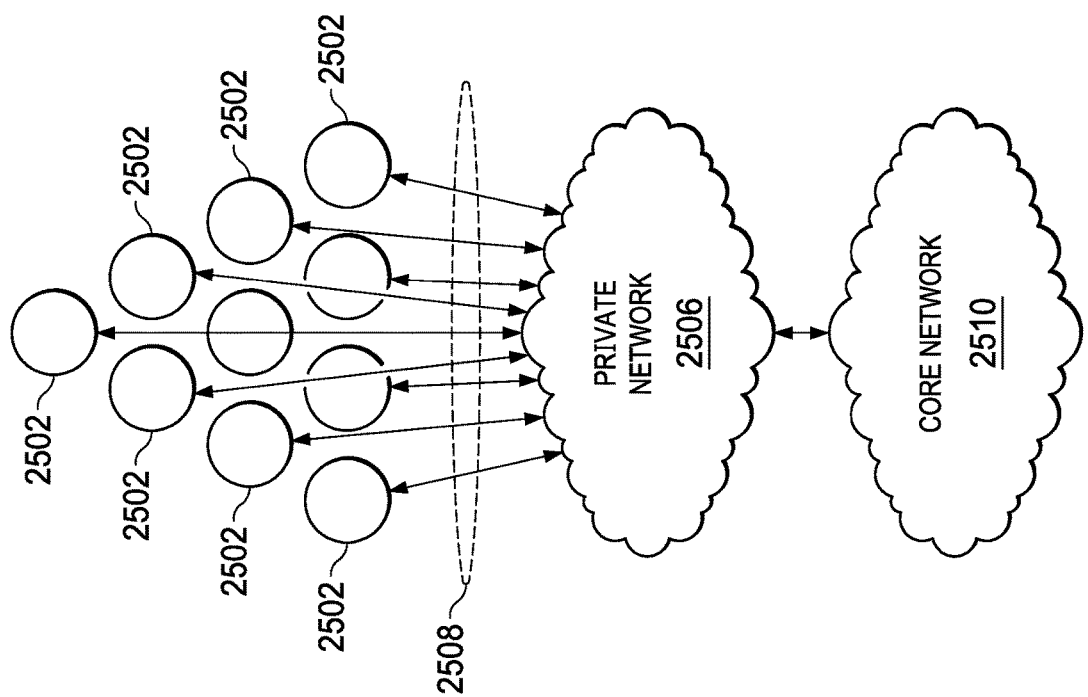
FIG. 25 illustrates a wired private network.

Access, backhaul and private networks need to carry significantly more data in order to support ever growing data use within networks which calls for network densification. However, as illustrated in FIG. 25, when many small cells 2502 are densely deployed within a small cell network 2504, the private network 2506 may become a bottleneck due to the issues with providing a wireline link 2508 between each cell 2502 in the private network 2506 due to the large number of wireline or wireless connections within a network. The private network 2506 then further provides interconnection to the core network 2510 for passing messages to and from the small cell network 2504.

Figure 26:
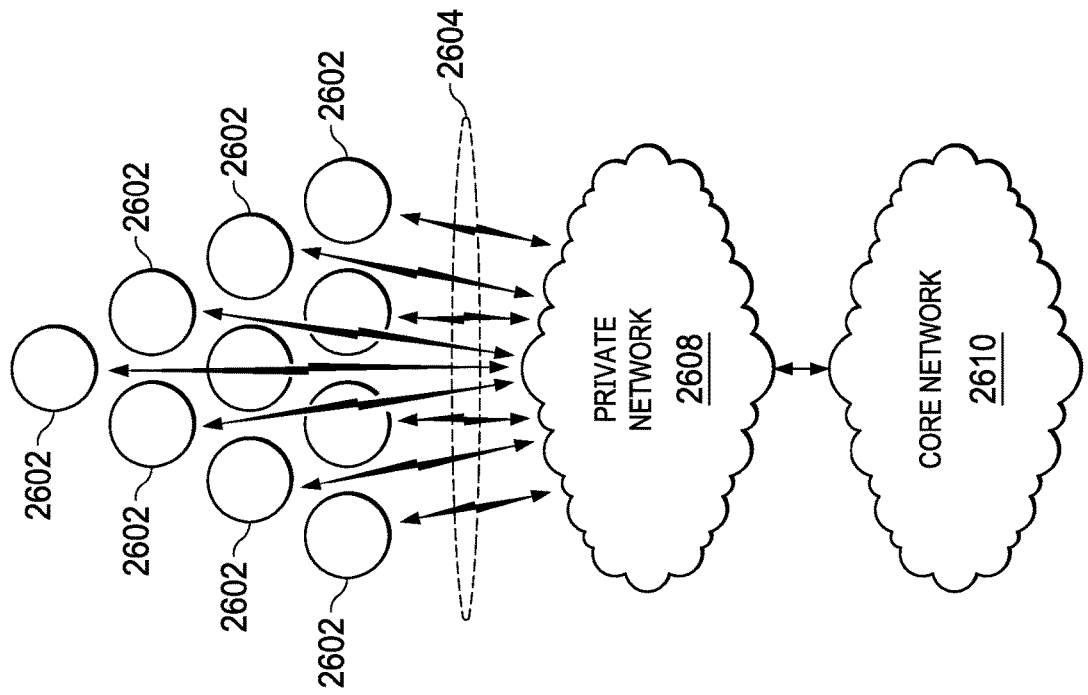
FIG. 26 illustrates a wireless private network.

Referring now to FIG. 26, there is illustrated an implementation of a wireless small cell network 2602. The small cell wireless backhaul network 2602 is needed due to its multi-hop operation and ability to operate in multiple bands (mmWave bands, Sub 6 GHz bands and free space optical (FSO) bands. The small cell network 2602 provides a plurality of wireless connections 2604 between the cells 2606 and the private network 2608. The private network 2608 then forwards messages received on the wireless communications links 2604 to/from the core network 2610.

Figure 27:
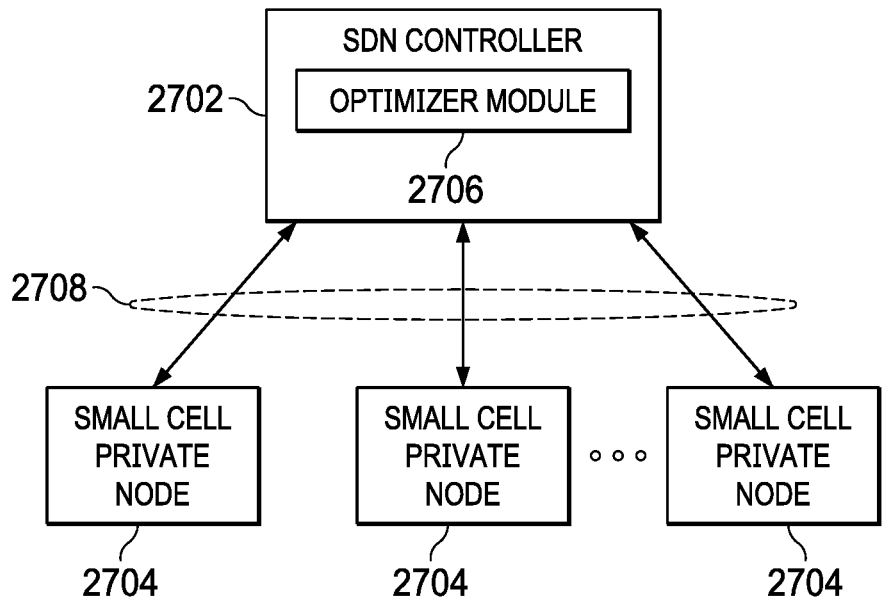
FIG. 27 illustrates a manner for using an SDN-based system for creating connections with the small cell network.

Referring now also to FIG. 27, there is illustrated the manner to utilize an SDN-based system for creating the connections with the small cell network 2602. An SDN controller 2702 enables connections to a number of different small cell backhaul nodes 2704. The SDN controller 2602 is based on OpenDaylight and controls adaptively powering on/off small cells 2704 and reconfigures the backhaul forwarding topology according to traffic demands. OpenDaylight is a collaborative open source project hosted by the Linux foundation. OpenDaylight promotes software defined networking (SDN) and network function virtualization (NFV). OpenDaylight software is written in the Java programming language. OpenDaylight supports technologies such as OpenFlow. OpenDaylight is a modular open platform for customizing and automating networks of any size and scale. OpenDaylight is driven by a global, collaborative community of vendor and user organizations.

The core of the OpenDaylight platform is the Model-Driven Service Abstraction Layer (MD-SAL). In OpenDaylight, underlying network devices and network applications are all represented as objects, or models, whose interactions are processed within the SAL. The SAL is a data exchange and adaptation mechanism between data models representing network devices and applications. The data models provide generalized descriptions of a device or application's capabilities without requiring either to know the specific implementation details of the other. Within the SAL, models are simply defined by their respective roles in a given interaction.

The OpenDaylight platform is designed to allow downstream users and solution providers maximum flexibility in building a controller to fit their needs. The modular design of the OpenDaylight platform allows anyone in the OpenDaylight ecosystem to leverage services created by others; to write and incorporate their own; and to share their work with others. OpenDaylight includes support for the broadest set of protocols in any SDN platform—OpenFlow, OVSDB, NETCONF, BGP and many more—that improve programmability of modern networks and solve a range of user needs The SDN controller 2602 uses an optimizer module 2706 that is configured with different policies in order to minimize the power and latency and maximize system capacity. The optimizer module 2706 uses SDN for the operation and management of small cell wireless networks to extend the OpenFlow protocol in order to gather wireless and power consumption statistics, which are exchange between the controller 2702 and small cell backhaul nodes 2704 using and an LTE out of band control channel 2708. OpenFlow is a communication protocol that provides access to the forwarding plane of the network switch or router over the network. OpenFlow enables network controllers to determine the path of network packets across a network of switches. The controllers are distinct from the switches. The separation of the controller from the forwarding allows for more sophisticated traffic management than is feasible using access control lists and routing protocols. Also, OpenFlow allow switches from different vendors to be managed remotely using a single, open protocol. OpenFlow is an enabler of software defined networking.

OpenFlow allows for the remote administration of a layer 3 switch's packet forwarding tables, by adding, modifying and removing packet matching roles in action. Routing decisions can be made periodically or ad hoc by the controller and translated into rules and actions with a configurable lifespan, which are deployed to a switch's flow table, leaving the actual forwarding of matched packets to the switch at wire speed for the duration of those rules. Packets which are unmatched by the switch can be forwarded to the controller. The controller decides to modify existing flow table rules on one or more switches or to deploy new rules, to prevent a structural flow of traffic between switch and controller. It could even be decided to forward the traffic itself, provided that it is told the switch to forward entire packets instead of just the header. The OpenFlow protocol is layered on top of the transmission control protocol and proscribes the use of transport layer security.

Figure 28:
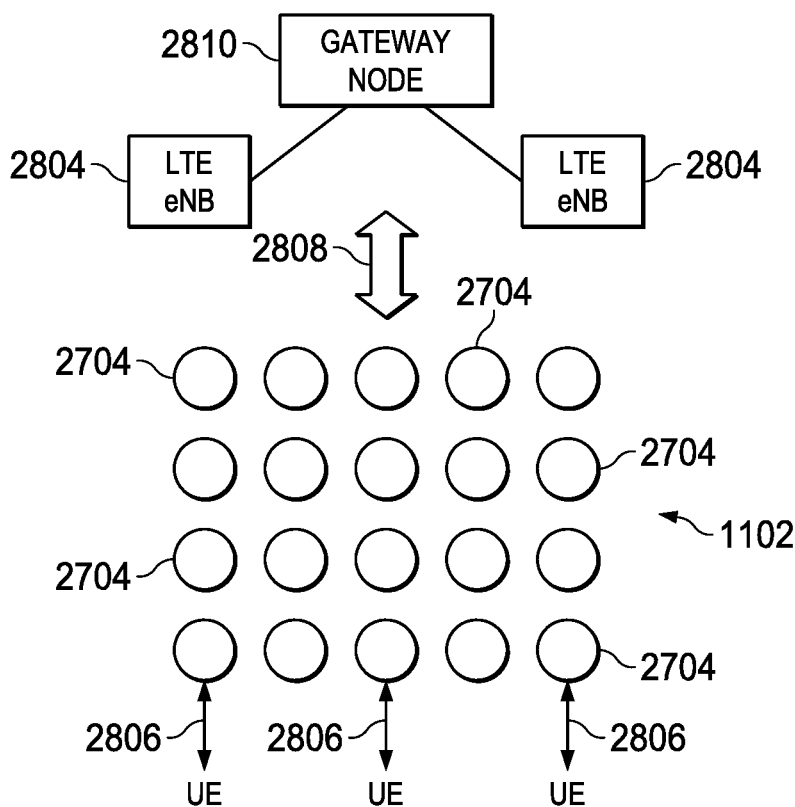
FIG. 28 illustrates a heterogeneous network.

Referring now to FIG. 28, there is illustrated a heterogeneous network (HetNet) 2802. In HetNet, a dense small cell network 2802 comprised of a number of small cell nodes 1004 that coexist with an overlay of LTE eNBs 2804 providing the basic coverage. In such a deployment, traffic from user equipments (UE) 2806 is forwarded from the small cell node 2804 over multiple wireless links 2808 to a gateway node 2810. Thus, in a multi-hop deployment, routing and forwarding are crucial aspects to consider, since they have to dynamically power on and off nodes 2704, according to traffic demand changes creating a liquid wireless backhaul were network resources are used where they are needed. Multi-hop deployment is used for routing and forwarding of the data plan over a multiband (mmWave, sub 6 GHz and FSO) MulteFire network.

With software defined networking (SDN), packet forwarding can be handled by a centralized controller 2702 (FIG. 27), in a flexible and effective way. Adding device configuration capabilities for this kind of architecture allows small cell wireless networks to be fully managed. In a typical SDN-based architecture, the SDN controller 2702 sends OpenFlow messages that must be routed over the wireless links 2708 towards the 2704. This can lead to potentially long latency.

Figure 29:
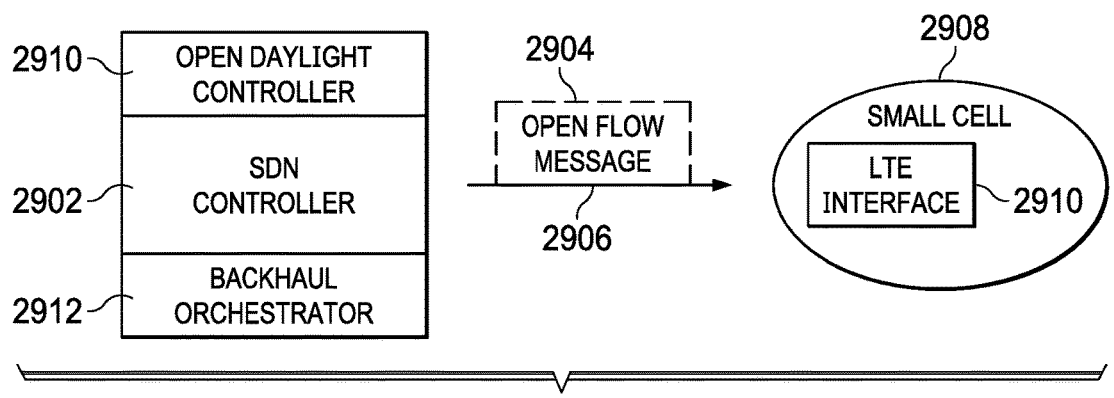
FIG. 29 illustrates communications between an SDN controller and a small cell using OpenFlow messages.

An SDN-based network architecture for small cell backhaul operation and management is proposed for dealing with these latency issues. Referring now to FIG. 29, based on the HetNets concept, the proposed SDN controller 2902 transmits an OpenFlow messages 2904 via LTE control channels 2906 directly to small cell nodes 2908. Extensions to the OpenDaylight (ODL) controller 2910 provide the necessary resilient routing infrastructure for a small cell backhaul operation. An orchestrator 2912 dynamically optimizes the small cell network by minimizing power and latency while maximizing the capacity of the small cell network.

Figure 30:
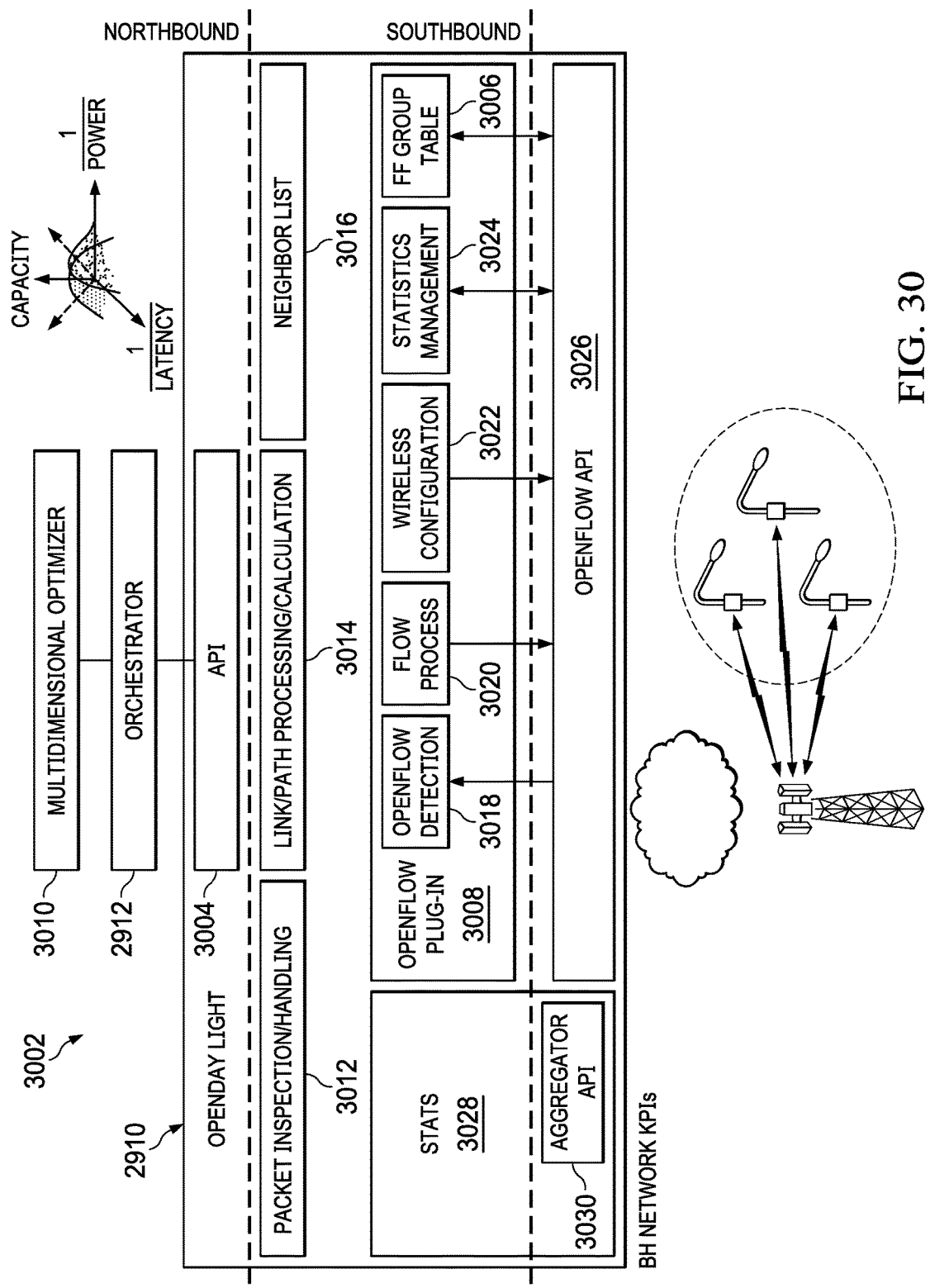
FIG. 30 illustrates a block diagram of a Backhaul Network Key Performance Indicator.

Referring now also to FIG. 30, there is illustrated a more detailed description of a small cell network KPI (key performance indicator) 3002. The small cell network KPI 3002 is implemented within the SDN controller 2902 to enable communications between the SDN controller and small cells within the small cell network. As mentioned previously, the OpenDaylight controller 2910 provides routing infrastructure for the small cell operation. The OpenDaylight controller 2910 utilizes an application program interface 3004 for enabling communications between the controller 2910 and an orchestrator 2912. The orchestrator 2912 dynamically optimizes the small cell network by minimizing power and latency while maximizing the capacity of the network. The network KPI 3002 must maintain a communication channel 2906 with the SDN controller 3004 in order to be able to exchange control plane messages with the small cell nodes 2908. This communication channel 2906 can be established in the same network interface as the one used for the data plane (in-band connectivity) or in a different interface (out-of-band). With in-band connectivity, the infrastructure costs are reduced, but if link failure occurs, the node loses the connection with the controller 2910. Out-of-band control plane connectivity requires an additional NIC (network interface controller) in the managed devices. An LTE interface 2910 is used on each SDN enabled small cell backhaul node 3010 for SDN control plane connectivity, in order to provide a robust channel and reduce SDN control latency while the data plane is using the multi-hop backhaul connectivity over a multiband (mmWave, sub 6 GHz and FSO) network.

Small cell wireless links may have dynamic link outages, especially when operating at mmWave band. A link can temporarily go from non-line of sight to outage (e.g. due to blockage), leading to changes in the topology and consequently, in the available capacity. When such events happen, the SDN controller 2902 can perform path recalculation between the small cell nodes 2908 but the process may take a significant amount of time. The network KPI 3002 as illustrated in FIG. 30 uses fast failover (FF) group tables 3006 from the OpenFlow plug-in 3008 to rapidly repair link failures locally.

The orchestrator 2912 communicates with the multidimensional optimizer 3010. The Application Program Interface 3004 is used to communicate with the orchestrator 2912 in order to perform the reconfiguration of the small cell network. Also, this configuration can be triggered by the orchestrator 2912 through this REST API. The new configurations are pushed to the wireless communications services (WCS) and new paths are requested to the Path Calculator. The multidimensional optimizer 3010 finds a maximum value based upon latency, capacity and 1/power using Euler-Lagrange multipliers. The network KPI 3002 further includes a packet inspection/handling module 3012. The packet inspection/handling module 3012 inspects and controls the data packets that are transmitted over the communications channels 2903 to the small cell nodes 2908. The packet inspection/handling module 3012 parses packets sent to the SDN controller 2902 (e.g. for new flows when no rules are installed at the small cell nodes 2908). The extracted information is sent to the path calculator 3014, which replies with a primary path from the source to the destination node according to a given path calculation strategy. The original packet is then sent back to the destination node.

The path calculator 3014 is responsible for calculating alternate paths to the small cell nodes 2908 when existing links fail. The path calculator 3014 computes paths between the powered on small cell nodes 2908 and instructs the installation of new forwarding rules. The path calculator 3014 uses a network graph that contains only the active nodes. If the fast failover (FF) strategy is active, a maximum disjoint path is also calculated from each intermediate node, and the required forwarding rules are installed in combination with the usage of the FF group table 3006 feature from OpenFlow. The link/path processing calculation module 3014 uses information from the neighbor list 3016 to make the new path calculations. The neighborhood mapper 3016 is a database list of small cell nodes and their associated neighboring nodes. The neighborhood mapper 3016 infers the neighborhood and interference graph for each node/link from the existing topology. Small cell nodes 2908 send out periodic beacons to neighbors. The collected information statistics are sent to the SDN controller 2902 and used to augment existing data from the network links.

The OpenFlow plug-in 3008 includes an OpenFlow detection module 3018 for detecting OpenFlow messages. The flow process module 3020 calculates the message routing. The wireless configuration service 3022 sends wireless specific configuration requests to the managed small cell nodes 2908 through an OpenFlow protocol extension. The Wireless Statistics Manager 3028 collects wireless related statistics from the managed small cell nodes 2908 over an aggregator API 3030 through an extension of the statistics manager component 3024 from the OpenFlow Plugin 3008. The statistical information is fed to the statistics module 3024 from the small cell nodes 2908. The requests and statistics can have different types, which are specified by a bit mask field in the request body. Each of the modules within the OpenFlow plugin 3008 communicates with the small cell nodes 2908 through an OpenFlow API 3026. A metrics collector 3028 is responsible for obtaining network performance metrics that cannot be directly retrieved through OpenFlow plug-in 3008. The metrics are obtained through the aggregator API 3030. The calculated data is merged into the available statistics and can be used by every other SDN controller 2902 component.

Figure 31:
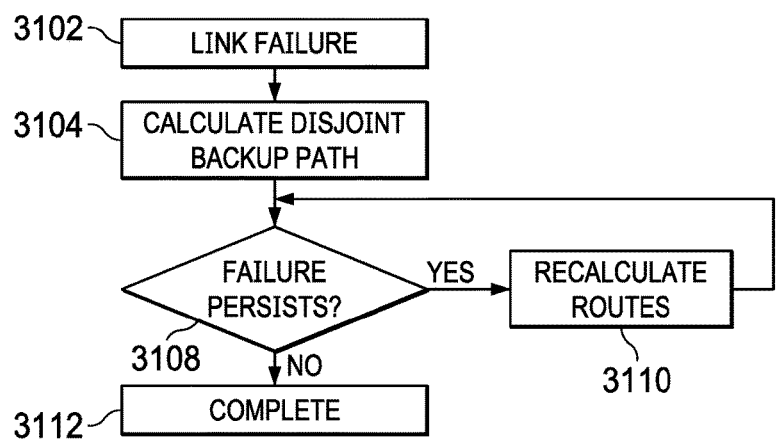
FIG. 31 is a flow diagram illustrating the process for link repair.

Referring now to FIG. 31, there is illustrated a flow diagram of the process for link repair. Upon occurrence of a link failure at step 3102 a disjoint backup path toward the gateway node 2810 at each small cell node 1004 is calculated at step 3104 using the fast failover group tables 3006. If the failure that triggered the usage of a different network path persists, as determined at inquiry step 3108, the controller 3002 recalculates new routes at step 3110 based upon the current apology and previously calculated energy optimization strategies. Control then passes back to inquiry step 3108 to determine if the failure persists. When the failures do not persist, the process is completed at step 3102.

With SDN it is possible to have flexible path calculation strategies act on detailed forwarding decisions. For multi-hop small cell networks, it will be essential to control the existing paths latency. This requires an estimation of the delay for each link and path at the SDN controller 2902 which can also depend on existing queuing strategies to implement control of existing paths' latency. Therefore, some flows might be routed along low latency paths, while others are routed to higher latency paths with higher capacity. New routing algorithms might be needed, allowing fast path calculation while supporting multiple constraints (bandwidth, latency, capacity and power). Therefore, the SDN-based network would manage flow rules, wireless link and our management parameters. The SDN based network interacts with an orchestrator 2912, responsible for optimizing the backhaul network operation.

Figure 32:
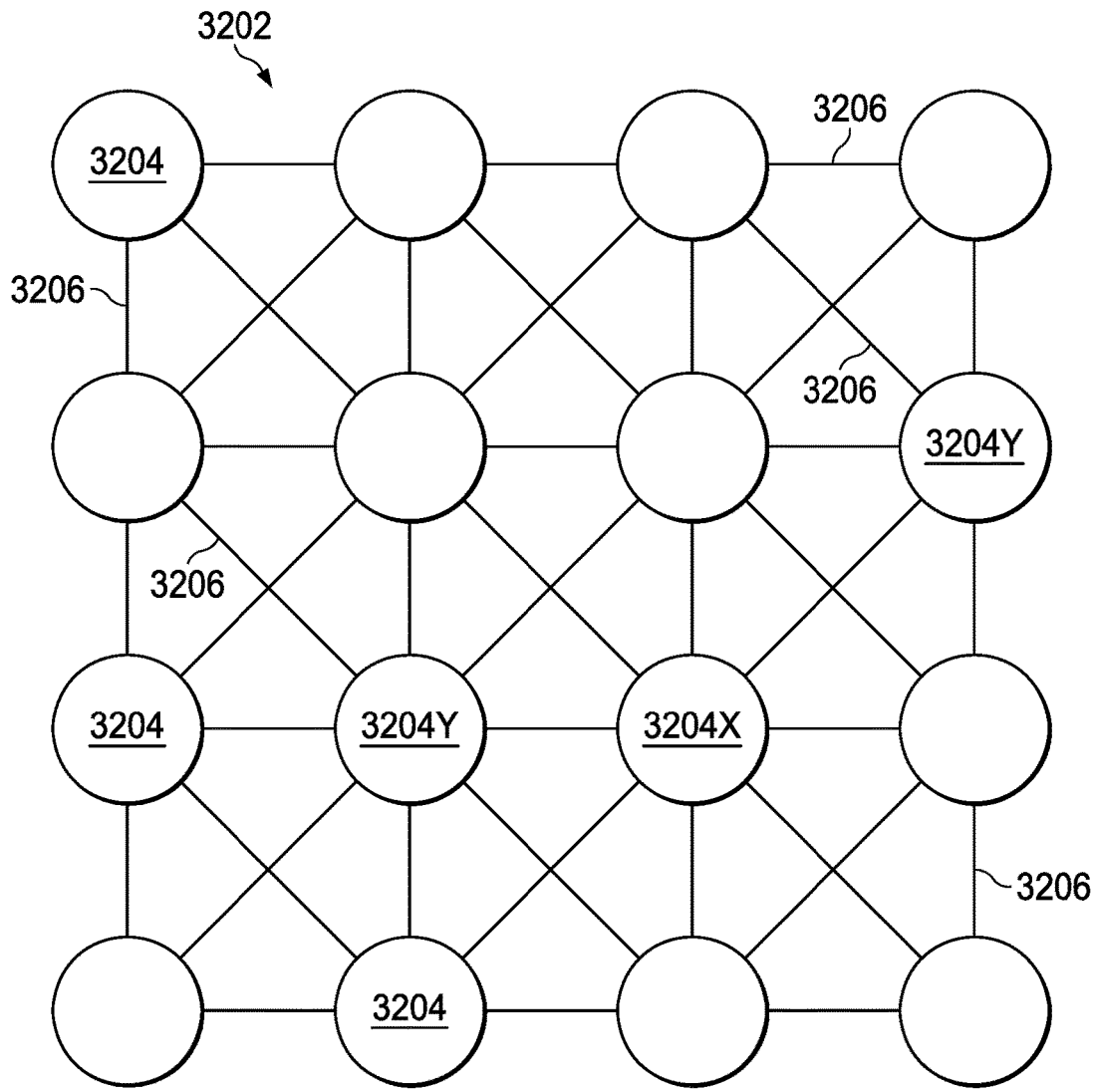
FIG. 32 illustrates a small cell private network.

Due to the increasing traffic demand, existing mobile access and private networks face a capacity problem. In order to increase the capacity, it is customary to deploy many small cells which may be dynamically controlled based upon traffic demand as illustrated in FIG. 32. The private small cell network 3202, as described previously, consist of a plurality of individual small cell nodes 3204 that are interconnected via communication links 3206. Each of the small cell nodes 3204 are interconnected with each of the small cell nodes within its vicinity via one of the communication links. Thus, for example, as illustrated in FIG. 32, node 3204x is interconnected with each of the surrounding nodes 3204y (in this case eight nodes) through an associated communication link 3206. Thus, node 3204x can communicate over the small cell network 3202 through any of the adjacent small cell network nodes 3204y.

As a consequence, the fabric for small cell networks 3202 needs to cope with the massive increase in user demands since the laying of fiber to each small cell node 3204 is not economically feasible. It is possible to have mmWave based private mobile networks due to the large chunk of spectrum that is available both in unlicensed bands (the 60 GHz and 70/80 GHz bands) as well as licensed bands of 24, 28 and 39 GHz. However, due to the specific propagation characteristics of the mmWave spectrum, communications links 3206 between small cell nodes 3204 may face challenging network outages. Additionally, a more flexible design of the network 3202 is desired in order to cope with the diversification of service requirements.

Figure 33:
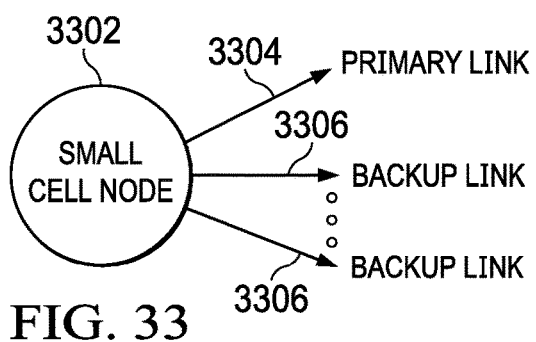
FIG. 33 illustrates a small cell node having a primary link and one or more backup links.

A private small cell network architecture based on the concept of software defined networking will be able to address these issues and provide a mmWave or MulteFire based mobile network or private network. Referring now to FIG. 33, in order to cope with the dynamics of the network, the SDN control plane calculates for each small cell node 3302 a primary link 3304 and a set of backup links 3306. The set of backup links 3306 include at least one backup link which may be utilized if the primary link 3304 goes out. Using OpenFlow Fast Failover groups such as those described herein above, a fast local repair of a link 3306 can be achieved leading to a resilient mesh network architecture. The proposed architecture leads to a lower packet loss and consequently higher throughput data rate and better private network reliability.

Figure 34:
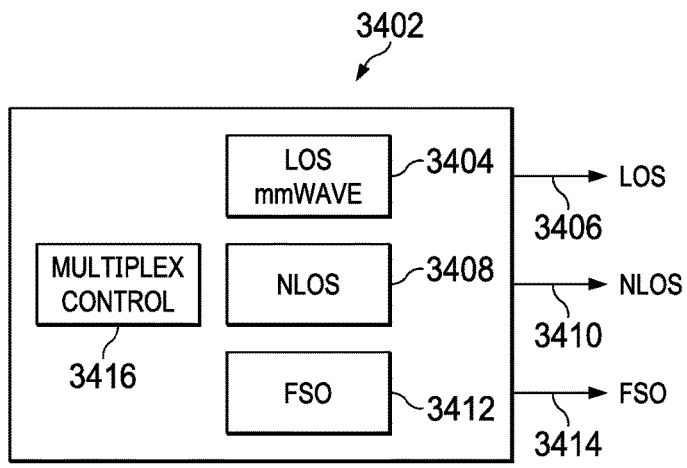
FIG. 34 illustrates a small cell node including means for multiplexing between multiple transceiver types.

Referring now to FIG. 34, network reliability may also be improved utilizing an architecture wherein each node 3402 uses SDN-based channel estimation to multiplex between line of sight (LOS) mmWaves, non-line of sight (NLOS) sub-6 GHz and free space optics (FSO) transmissions. This is achieved using a LOS mmWave transceiver 3404 for transmitting line of sight millimeter waves 3406, an NLOS transceiver 3408 for transmitting non-line of sight sub-6 GHz signals 3410 and a FSO transceiver 3412 for transmitting FSO signals 3414. Multiplexing control circuitry 3416 multiplexes between the LOS mmWave transceiver 3404, an NLOS transceiver 3408 and an FSO transceiver 3412 based upon the environmental and system operating conditions. When the atmospheric conditions are good, the network relies upon the FSO transceiver 3412. When atmospheric conditions become foggy or rainy, the system adaptively switches to RF LOS transceiver 3408 or the LOS transceiver 3404 using the multiplexer control 3416. If the operating environment has many physical obstacles between the transmitter and the receiver, the system would select the NLOS transceiver 3408.

Despite introducing new technologies at lower layers of the protocol such as better modulation and coding schemes or coordinating multipoint transmissions, the predicted demand is much higher than what can be supported with new physical layer only technologies in the short term. A common assumption to provide increased capacity at scale is to use a higher frequency band were more spectrum is available and to reduce the cell size in order to increase spatial reuse. Network operation is often dominated by proprietary solutions which hinder innovation. An important challenge to solve for small cell backhaul links is an efficient but flexible forwarding architecture which relays user data over a multi-hop wireless backhaul between a plurality of small cell nodes.

Figure 35:
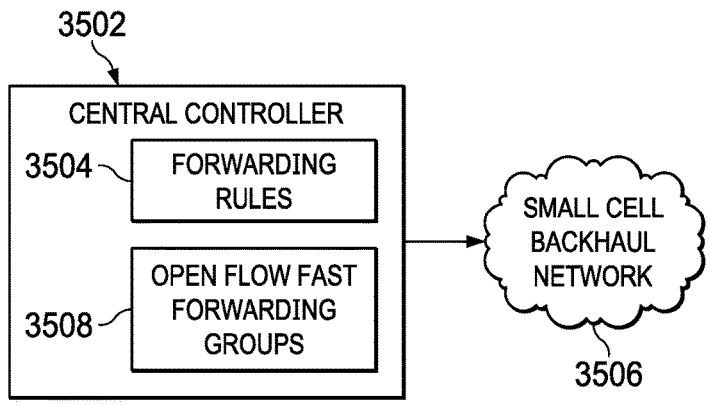
FIG. 35 illustrates an SDN-based architecture for link generation.

Referring now to FIG. 35, in a typical SDN-based architecture, a centralized controller 3502 installs within small cell nodes flexible rules 3504 that determine the forwarding behavior within the data plane. However, a forwarding configuration addressing the inherent resiliency challenges to cope with unstable backhaul links using a combined RF LOS, NLOS and FSO has not been previously addressed. A resilient forwarding configuration of an SDN-based small cell private wireless network 3506 that focuses on SDN-based resiliency mechanisms and uses the concept of OpenFlow fast failover groups 3508 as described hereinabove. The controller 3502 calculates each link 3206 for each small cell node 3204 backup links toward the Gateway. The main link and the backup link are both placed into a fast failover group 3508. The small cell node 3204 uses rapid link monitoring to locally detect if a link is in the outage stage, in which case, the OpenFlow-based fast failover locally switches from a main link to a backup link.

The traditional SDN concept relies on a centralized control plane, which exercises control on forwarding decisions in the data plane. Consequently, the control and data planes are decoupled which allows a very flexible forwarding control. However, using SDN for small cell links present several challenges. This is because the performance and reliability of mesh-based networks such as that illustrated in FIG. 32 depends on fast local reactions to topology changes where a centralized control plane is typically too slow to react. Therefore, there been attempts to use proprietary routing and forwarding decisions based on distributed protocols were SDN is used to steer traffic.

Figure 36:
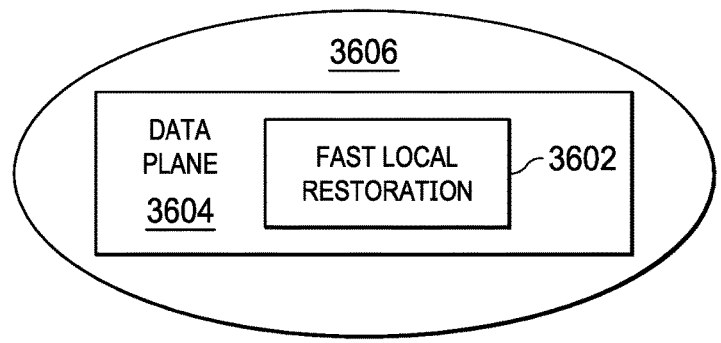
FIG. 36 illustrates a small cell node implementing fast local restoration within its data plane layer.

In an alternative approach as illustrated in FIG. 36, the forwarding decisions inside the small cell network may be configured by the SDN control plane. SDN-based resiliency using fast local restorations 3602 (e.g. implemented inside the data plane 3604 of the cell small nodes 3606) may be used whenever local problems such as link outage transitions of the millimeter wave links are detected. This local repair mechanism, which can be preinstalled, avoids the need to ask the controller how to react in a case when a neighbor node cannot be reached anymore and leads to a more robust data plane behavior.

Figure 37:
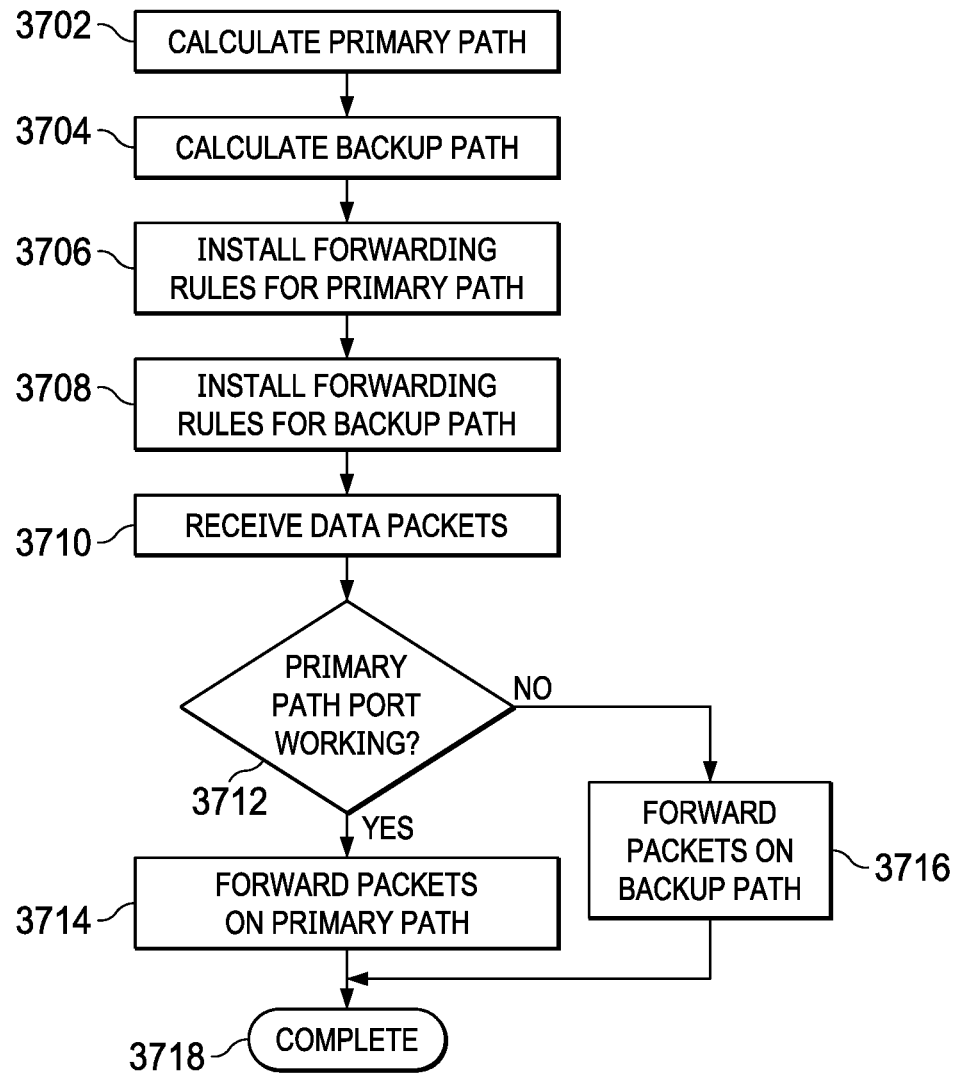
FIG. 37 illustrates a flow diagram describing the process for implementing SDN-based local repair.

Referring now to FIG. 37 there is illustrated the process for implementing SDN-based local repair. The process uses SDN to calculate a primary and a secondary path for private small cell network nodes. SDN-based local repair is implemented using fast failover groups 3508 (FIG. 35). A primary and a secondary action are put into the same group. Consequently, the SDN controller calculates for each small cell a primary path at step 3702 towards the gateway. Additionally, the SDN controller calculates a backup path towards the gateway at step 3704. Based upon the path calculations, the SDN controller installs forwarding rules for the primary path at step 3706 into the fast failover group 3508 and will additionally install forwarding rules at step 3708 for the backup path into the fast failover group.

Once data packets arrive at a small cell node at step 1010 which should be forwarded to a neighboring small cell node using mmWave or MulteFire links, the data packets will be forwarded according to the first port in the fast failover group table whose port state is active. This requires an OpenFlow data path implementation which uses for each neighbor a dedicated OpenFlow port. Once the primary port is detected to be down, the data packets are automatically forwarded using the next active port, i.e. towards a different neighbor where there is an active backup link. Thus, a determination is made at inquiry step 3702 if the primary path is working. If so, control passes on to step 3714, and the packet is forwarded on the primary path. If inquiry step 3712 determines that the primary path is not working, the packet is forwarded on the backup path at step 3716. The process is then completed at step 3718. This process allows the small cell node to perform a local failover instead of the SDN controller performing a centralized failover. This significantly reduces the reaction time to failures in the mesh forwarding structure.

Figure 38:
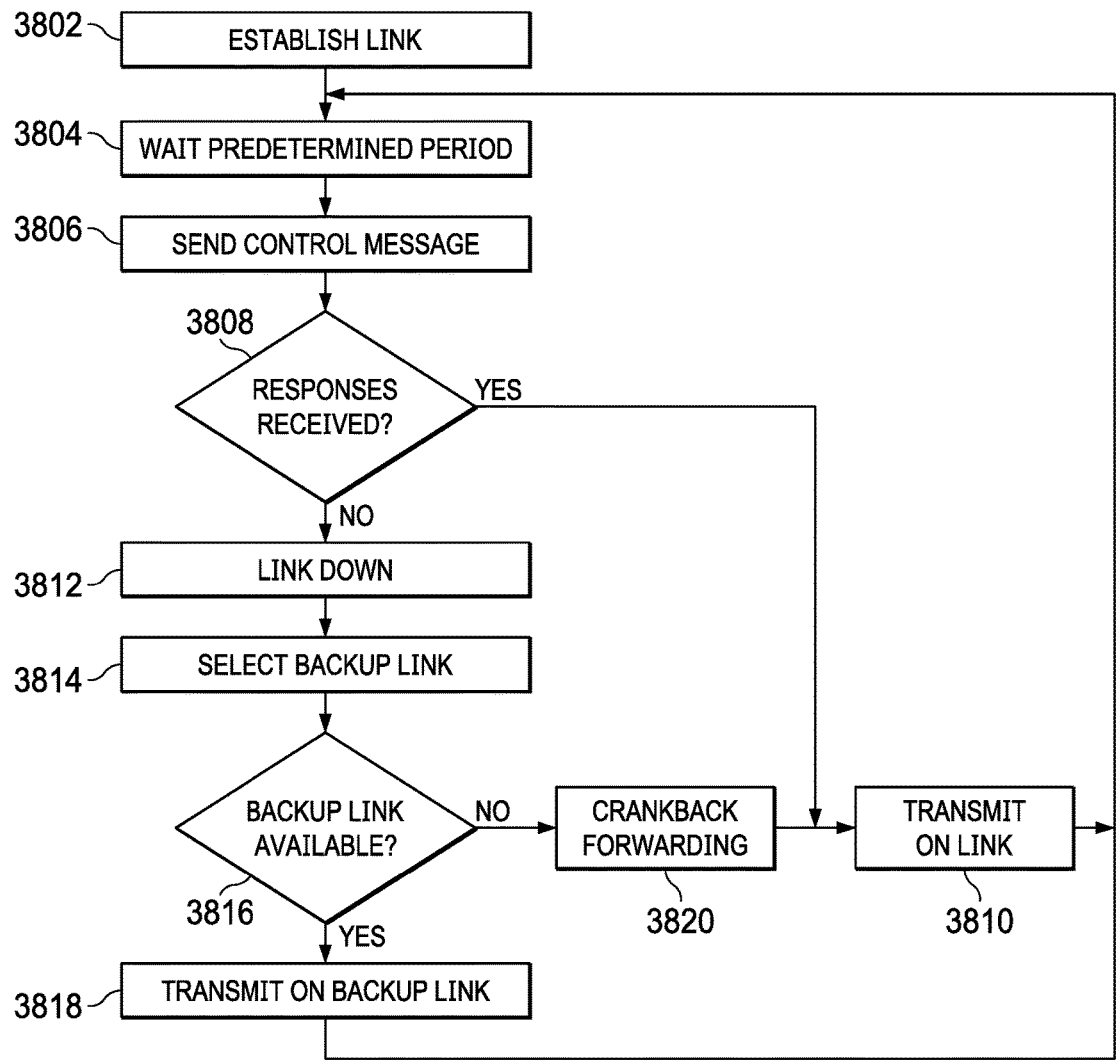
FIG. 38 illustrates a flow diagram describing the process for detecting link state and for the transmission on primary and backup links.

Referring now to FIG. 38, there is illustrated the process for detecting link state and transmitting on primary and backup links. In order to detect the link state, bidirectional forwarding detection (BFD) is a commonly used technology. BFD determines the state of the port by establishing a connection at step 3802 using a three-way handshake routine. BFD next waits a predetermined period of time at step 3804 and transmits a periodic control message at step 3806. Inquiry step 3808 determines if a response to the control message has been received. The timeout period is determined by the control messages between the BFD messages. If a response to the control message is received, transmissions are carried out on the link at step 3810 and control passes back to step 3804 to await an additional predetermined period. If no response to the control message is received within a specified time interval, the link is considered down at step 3812. In this manner, link failures may be rapidly detected and reacted to. Consequently, small cell backhaul nodes would send periodic BFD messages to each neighboring node over the connection links to detect link states. Once BFD detects a link down event at inquiry step 3808, the link state is set to down at step 3812. This triggers the OpenFlow datapath to start transmitting to a different neighbor small cell. This is achieved by selecting a backup link at step 3814.

Alternatively, MAC layer protocol messages can be used in order to infer the state of the communications links, which could be integrated into the OpenFlow data path. The media access control (MAC) layer is a lower sublayer of the data link layer of the seven-layer OSI model. The Open Systems Interconnection model (OSI model) is a conceptual model that characterizes and standardizes the communication functions of a telecommunication or computing system without regard to their underlying internal structure and technology. Its goal is the interoperability of diverse communication systems with standard protocols. The model partitions a communication system into abstraction layers. The original version of the model defined seven layers.

A layer serves the layer above it and is served by the layer below it. For example, a layer that provides error-free communications across a network provides the path needed by applications above it, while it calls the next lower layer to send and receive packets that comprise the contents of that path. Two instances at the same layer are visualized as connected by a horizontal connection in that layer.

The MAC sublayer provides addressing in channel access control mechanisms that make it possible for several terminals or network nodes to communicate with a multiple access network and incorporates a shared medium, e.g. an ethernet network. The hardware that implements the MAC is referred to as the media access controller. The MAC sublayer acts as the logical link controller (LLC) sublayer and the networks physical layer. The MAC layer emulates a full-duplex logical communication channel in a multipoint network. The channel may provide unicast, multicast or broadcast communication service.

A weakness with fast failover is that it can only perform local failover. If no alternative local path is available, e.g. all neighbors are not reachable anymore, then crankback routing must be performed. This requires that the packet be sent backwards toward the source to a small cell node which has an alternative active path towards the destination. Thus, crankback forwarding can potentially have large impacts on the latency. Such latency can be reduced significantly by introducing stateful forwarding in the data plane using OpenState. OpenState is a research effort focused in the development of a stateful data plane API for Software-Defined Networking. OpenState is more particularly described in the OpenState v1.0 specification. If packets arrive at a small cell forwarding node which does not have a next hop towards the destination node because the link is down, the node tags the packet and the packet is sent back towards the source. When the message reaches the small cell node having a backup path, the state of the forwarding rules change in such a way that the coming packet traverse the backup path already at the node. Therefore, once a backup link is selected at step 3814, inquiry step 3816 determines if the backup link is operating and available. If so, transmissions are carried out on the backup link at step 3818 and control passes back to step 3804. If the backup link is not available as determined at inquiry step 3816, the crankback forwarding process is carried out at step 3820 and transmissions carried out on allocated available link.

Figure 39:
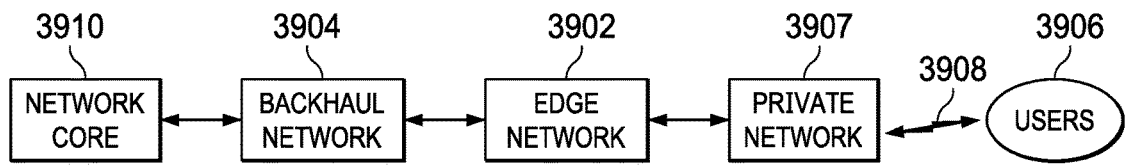
FIG. 39 illustrates a private network wirelessly connecting to users to provide a connection to the network core.

Referring now to FIG. 39, the use of SDN and NFV within the edge/access network 3902 connected to a backhaul network 3904 in addition to being useful as described herein above, may also be used for providing a high capacity last drop access connections to users 3906 that lowers costs and guarantees flexibility. Last drop connection comprises a wireless access 3902 from the edge/access network 3904 to the user 3906. The last drop connection 3908 is the access connection to a network by user 3906. Data from a user 3906 may be provided over the wireless last drop connection 3908 to a private network 3907 and then on to the edge network 3902 and forwarded onward to the backhaul network 3904 and network core 3910. These last drop connections 3908 can be provided between the private network 3907 and users 3906 in a number of fashions. A last drop connection 3908 provided in the described manner provides a high-capacity access solution that lowers cost and guarantees flexibility and scalability for both residential and enterprise customers with 60 GHz access in both backhaul and fronthaul.

Figure 40:
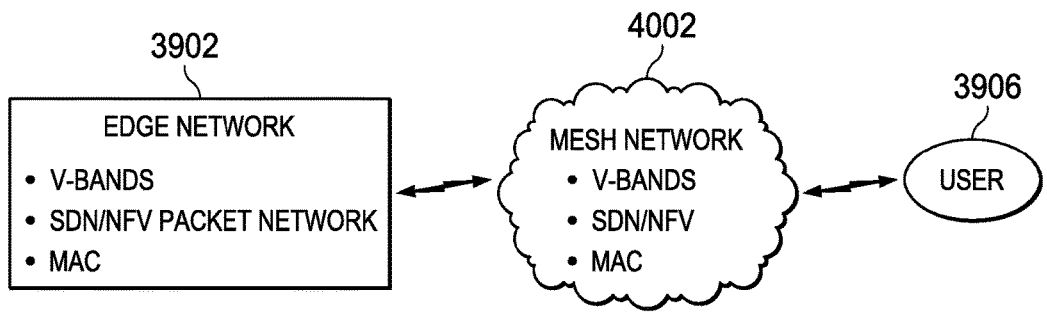
FIG. 40 illustrates a mesh network for interconnecting an edge network with users.
Figure 41:
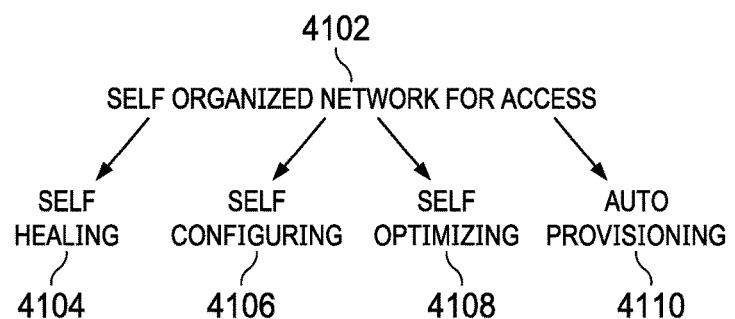
FIG. 41 illustrates the components of a self-organized network for access.

Mesh networks can be applied to both access networks 3902, 3907 (from base to end users) and backhaul networks 3904 (from base to network core). A mesh network means that each node is connected to at least two or more sites, so that when a link is broken, the mesh network can self-heal itself, by finding another path to keep the network connections active. FIG. 40 illustrates the use of a mesh network 4002 for the last drop connections 3908 between the user 3906 and the edge network 3902. While the following description is made with respect to using a mesh network to provide the access network 3902 connections, the mesh network could be applied in a similar manner as part of the backhaul network 3904. The last drop connection 3908 comprises what may be termed as a self-organized network for access 4102 as illustrated in FIG. 41. The mesh network 4002 may comprise one or both of an indoor or outdoor network. The mesh network 4002 uses an SDR based indoor and outdoor MulteFire system to allow a private network to provide scalable coverage, capacity and control that is not available in public networks. The self-organized network for access 4102 includes a number of characteristics enabling the communications. The self-organized network 4102 includes a number of characteristics including that the network is self-healing 4104, self-configuring 4106, self-optimizing 4108 and provides auto provisioning 4110. The network 4102 is self-healing 4104 in that when a communications link within the network 4104 breaks down, the network may self-correct the problem in order to cure the failed link. The network 4102 is self-configuring 4106 in that the network software may reconfigure the links automatically without any external inputs from a network manager in order to correct failed communication links. The network 4102 is self-optimizing 2908 in that decisions for placement of nodes within the network 4102 are made in order to optimize the closeness to the various end-users and to further minimize backhaul cost in order to reduce overall network costs. Finally, the auto provisioning functionalities 4110 of the network 4102 enable the network to automatically establish new communication links that are generated based upon failed existing communication links.

Various optimization techniques may be utilized. An effective hybrid technique may be used for optimizing multimodal functions in large scale global optimization (LSGO) that will pair the first search space exploration performed initially by standard techniques with more efficient local search techniques. Large scale global optimization (LSGO) is as important technique in large scale traffic networks. As dimensionality increases, the performance of most optimization algorithms quickly goes down. There are two major reasons for this decrease in performance. These are an increase of the complexity and an exponential increase of the search space volume. Due to the increase in complexity, unimodal functions may become multimodal in large dimensions. Due to the exponential increase of the search space volume, optimization algorithms need to increase their efficiency when exploring large search spaces. The efficiency can be measure by the number of function evaluations required to converge to a given optimum. In practice, many large-scale problems are multimodal.

In addition to the exponential increase in the number of candidate solutions, the cost of converging to any local optimum also increases. In high dimensional search spaces, we must focus almost exclusively on gradient exploitation in order to guarantee convergence to any local optima. However, disregarding exploration may lead to poor results in multimodal problems. In multimodal problems, it is critical to explore the search space to find the most promising regions before converging toward a local optima. Even in LSGO some exploration is necessary to achieve good performance on multimodal problems. There is a need to focus on minimum Population Search. The key idea behind the approach is to focus on multi-modal functions and to consider from the beginning the issues when scaling to large scale global optimization. This is done via an efficient use of function evaluations and an unbiased exploration.

In the current approach, search techniques focus more and more on gradient exploitation as dimensionality increases. So the primary focus is on hybrid techniques which will pair the full search space exploration performed initially by standard techniques with more efficient local search techniques. Therefore, an effective hybrid technique is used for optimizing multimodal functions in LSGO.

Minimum Population Search focuses on multi-modal functions. Originally the ideas were developed for two dimensional problems, later generalized for standard dimensions and scaled towards large scale problems. Standard techniques perform a methodical and unbiased exploration based on the Threshold Convergence (TC) technique. Threshold Convergence is designed to avoid a biased exploration by preventing global and local search steps from happening at the same time. This is achieved by fixing a minimum search step (threshold) which decays as the search progresses. Convergence is thus "held" back until the last stages of the search process.

An iterative optimization procedures built around the concept of self-adaptation called Covariance Matrix Adaptation (CMA) with (µ, A) selection considers the best µ solutions out of a population with A solutions for recombination. It is an iterative optimization procedures built around the concept of self-adaptation. The parameters of the search strategy evolve together with the solutions. CMA is an evolution strategy with (µ, A) selection considers the best µ solutions out of a population with A solutions for recombination. Recombination operators then create a (single) parent representation from the µ selected solutions, and A new children are produced through the use of a probabilistic mutation distribution. CMA-ES (Evolutionary Strategy) uses parameterized multivariate normal distribution for the representation of the mutation distribution.

A hybrid method is used for the optimization of multi-modal problems by identifying promising attraction basins and finding the local optima in these basins. The optimization of multi-modal problems involves two tasks including the identifying promising attraction basins and finding the local optima in these basins. To effectively perform each of these tasks, different search strategies may be used. The hybrid technique of standard MPS takes care of this issue by assigning a different heuristics to each task. MPS's ability to efficiently explore the search space is used during the early stages to identify promising attraction basins.

Figure 42:
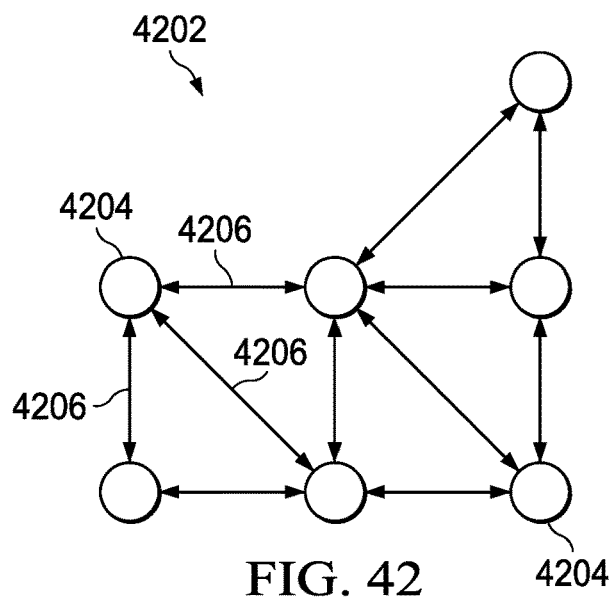
FIG. 42 illustrates a number of mesh network nodes.

Referring now to FIG. 42, there is illustrated a portion of a mesh network 4202 used for implementing the self-organized network for access 4102 described with respect to FIG. 41. The mesh network 4202 includes a plurality of nodes 4204. Each of the nodes 4204 include at least two links 4206 providing a pathway from the node to at least two other nodes. This is done to provide a backup link should a primary link fail. This use of the backup and primary link utilizes SDN and NFV processes such as those described hereinabove. The wireless communication links 4206 between nodes are provided using standard-based unlicensed V-band (60 GHz) or MulteFire frequencies (3.5-5 GHz) to provide SDN/NFV based packet network communications between the nodes 4204. This provides for a 1 Gbps access to users. The use of SDN and NFV processes are used for maintaining the communication links 4206 between nodes 4204. The described system provides solutions to support existing and future traffic demands using a system that leverages existing technologies, new processes, topologies and architectures.

Figure 43:
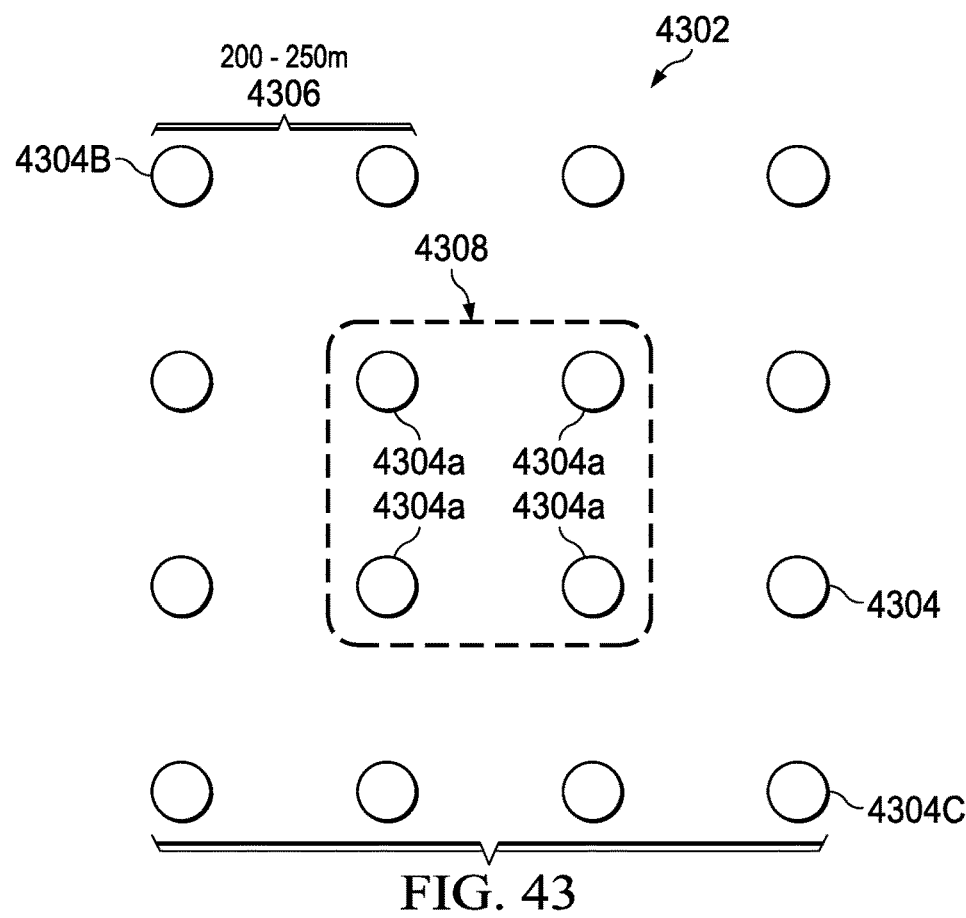
FIG. 43 illustrates a mesh network with interfering structure.

FIG. 43 illustrates a mesh network 4302 that may be used for interconnecting with a number of users. The mesh network 4302 comprises a number of nodes 4304 that communicate with each other using V-band (60 GHz) or MulteFire (3.5-5 GHz) communications transceiver. The 60 GHz V-band has been standardize under the WiGig standards. The 60 GHz V-band currently provides 7 GHz of spectrum. However, the US is planning to expand the V-band spectrum to include an additional 7 GHz to provide a total of 14 GHz of spectrum. The 60 GHz V-band spectrum provides a communications between nodes at a distance of approximately 200 m to 250 m from each other as indicated generally at 4306. Thus, the transmission distance between nodes 4304 within the 60 GHz system is somewhat limited. The MulteFire frequencies are in the 3.5-5 GHz frequency range. The mesh network 4302 implements a number of phase array antennas at the nodes 4304 to retain the highly directional signal required for 60 GHz or 3.5-5 GHz, but makes the communication links steerable to communicate over a wide area. The use of the 60 GHz V-band or 3.5-5 GHz band enables transmitted signals to be routed and steered around interference typically found in dense urban environments, such as tall buildings or internet congestion due to high user traffic. Thus, as illustrated generally at 4308 by the dashed line, an interfering structure or phenomena, such as a building, may prevent signals from being easily transmitted from nodes positioned at locations 4304A. Thus, when transmitting from node 4304B to node 4304C, system controllers would utilize nodes 4304D rather than nodes 4304A to route signals to steer around the interference structure 4308.

Figure 44:
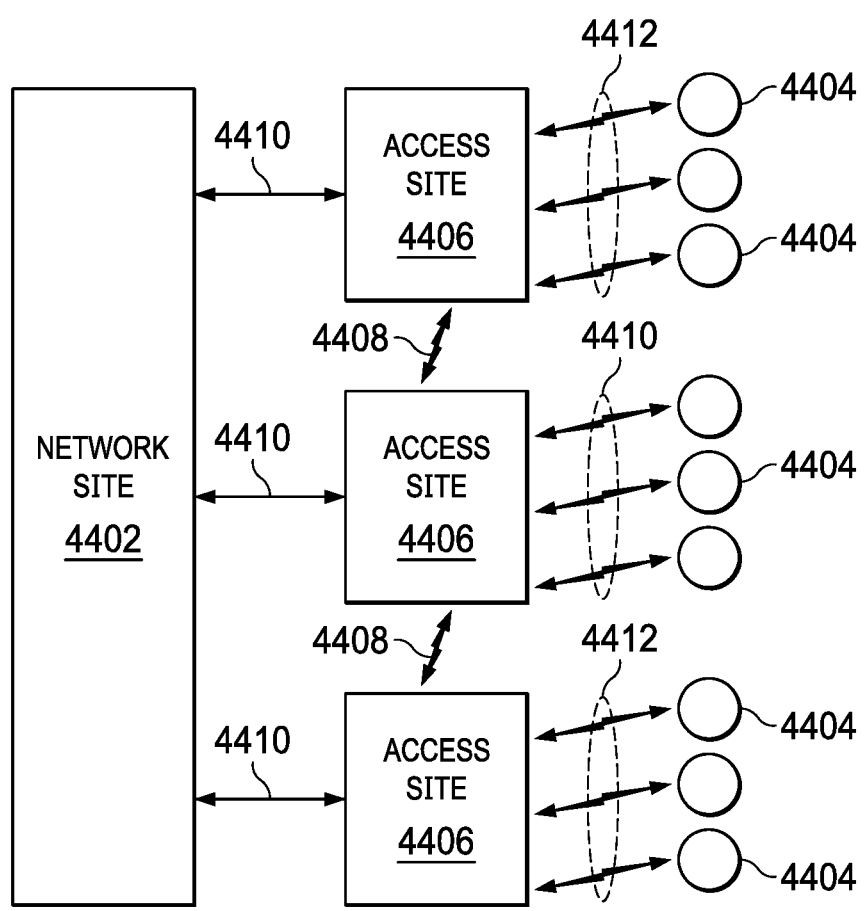
FIG. 44 illustrates a mesh network of access sites connected to multiple users.

Thus, as shown in FIG. 44 a mesh network would enable an interconnection between a network site 4402 and a number of residential or enterprise users 4404. In this case, each of the access sites 4406 comprises nodes within an associated mesh network. The access sites 4406 wirelessly communicate with each other over communication links 4408 and communicate with the network sites over communication links 4410 which may be wireline or wireless. The access sites 4406 communicate with the residential or enterprise users 4404 over a 60 GHz or 3.5-5 GHz wireless link 4412.

The communications over the wireless communications link 4412 between the access sites 4406 and in the users 4404 may be implemented using MAC layer protocols and TCP-IP protocols. Normally, MAC layer protocols and TCP-IP protocols are used for packet data transmissions over wireline networks. However, modified, high performance MAC layer protocols (TDMA-TDD MAC) and TCP-IP protocols may be used for communicating over a wireless communications link such as that utilize between the access sites 4406 and users 4404 that overcome the shortcomings of TCP-IP over a wireless link. This can provide up to a 6× improvement in network efficiency and make the TCP-IP protocol more predictable on a wireless link as compared to the existing Wi-Fi/WiGig standard. One example of a modified MAC layer protocol and TCP-IP protocol that may be utilized for wireless communications has been implemented by Facebook. Facebook is implemented using IPv6-only nodes and an SDN-like cloud compute controller and a new modular routing protocol for fast root convergence and failure detection. The Facebook system has re-architected the MAC layer protocol to solve the shortcomings of TCP-IP over a wireless communications link. The modified MAC layer protocol called TDMA-TDD MAC improves wireless network efficiency by 6×. By using concepts derived from LTE-TDD in a 60 GHz WiGi protocol network efficiency may be improved. These same MAC layer implementations may be used for controlling communication in the mesh network wireless communications.

The Facebook system implements a base station having 96 antennas that can support up to 24 different data streams simultaneously over the available bandwidth. The system has demonstrated a 71 bps/Hz data rate which will soon be increased to 100+ bps/Hz. The system comprises a massive MIMO system providing spatial multiplexing that achieves 1.05 Gbps bidirectional data throughput (2.1 Gb per second total throughput or distribution node) in the point to point transmission mode for nodes up to 250 m away. This enables up to 8.4 Gbps of total traffic per installation point assuming four sectors.

Figure 45:
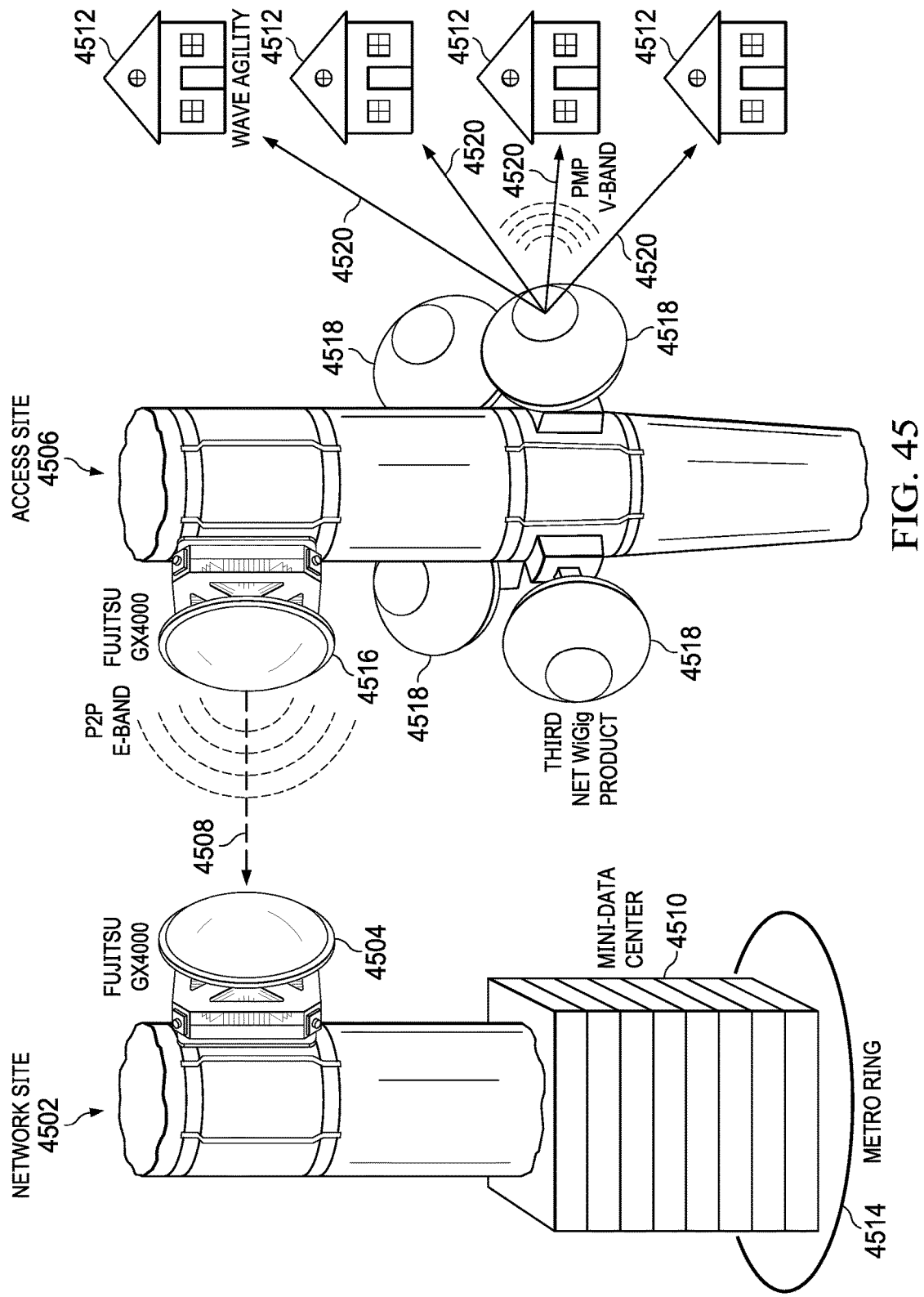
FIG. 45 illustrates the wireless connections between an optimally located access site and an associated network site and resident are enterprise users.

Referring now to FIG. 45, there is illustrated a configuration of the the access and network sites that are used for providing the self-organized network for providing access to a number of user locations. The network site 4502 comprises an antenna 4504 communicating with the access site 4506 over a point-to-point E-Band link 4508. The antenna array 4504 may in one embodiment utilize Fujitsu GX 4000 antennas. The point-to-point E-band link 4508 comprises a 70 GHz backhaul link for interconnecting the network site 4502 with the access site 4506. The network site 4502 also includes a mini data center 4510 for storing data that may be accessed by users 4512. Data may be uploaded to or downloaded from the many data centers 4510 over an associated fiber ring 4514 interconnecting the network site 4502 to other network sites.

The access site 4506 also includes an antenna 4516 for providing the point-to-multipoint E-band and link 4508 with the network site 4502. The access site antenna 4516 may also comprise in one embodiment a Fujitsu GX 4000 antenna. The access site 4506 additionally includes a phased array of antennas 4518 for providing a point-to-multipoint V-band connection 4520. The phased array antennas 4516 provide point-to-multipoint transmissions to a plurality of residential or enterprise users 4512. Placement of each of the access site 4506 and network site 4502 are achieved using the Optima System that optimally locates access and network sites that is closest to the end-user but minimizes backhaul cost. At the access sites, specially constructed mini-towers provide a high-capacity, last drop access solution that lowers cost and guarantees flexibility. Placement of the access sites 4506 in this manner using the Optima System maximizes operation of the network. The Optima system determines the optimal longitude and latitude for the access site and additionally includes the Z value (height) of the antennas 4518 and 4516 in order to best locate the antennas on an access site poll. While the illustration of FIG. 45 illustrates a single access site 4506, it will be appreciated that the mesh network system will comprise a plurality of access sites 4506 each comprising a specially structured mini-tower.

The access sites 4506 and network sites 4502 may be configured to enable enhanced fixed broadband (eFBB), ultra-reliable low latency communications (uRLLC) with massive MIMO transmissions. The massive MIMO transmissions are provided from antenna arrays at access sites 4506 and network sites 4502 that provide for multiple input/multiple output transmissions. The antenna arrays from the access sites 4506 and the network sites 4502 provide for multipoint-to-multipoint and point-to-point transmissions. Enhanced fixed broadband is a fixed broadband that is enhanced with new advances (i.e., New Radio (NR) technology that uses new 3GPP advances in spectral mask that are more localized) as well as higher order modulation and new spectrum with carrier aggregation. Ultra-reliable low latency communications comprises a service category designed to meet delay-sensitive services such as the tactile Internet, vehicular to vehicular communication, autonomous driving and remote control. uRLLC has a time-to-transmit latency time (the time required to transmit a packet) of not greater than 0.5 ms. The performance level of a uRLLC system should provide a block error rate of at least $10^{-5}$.

Figure 46:
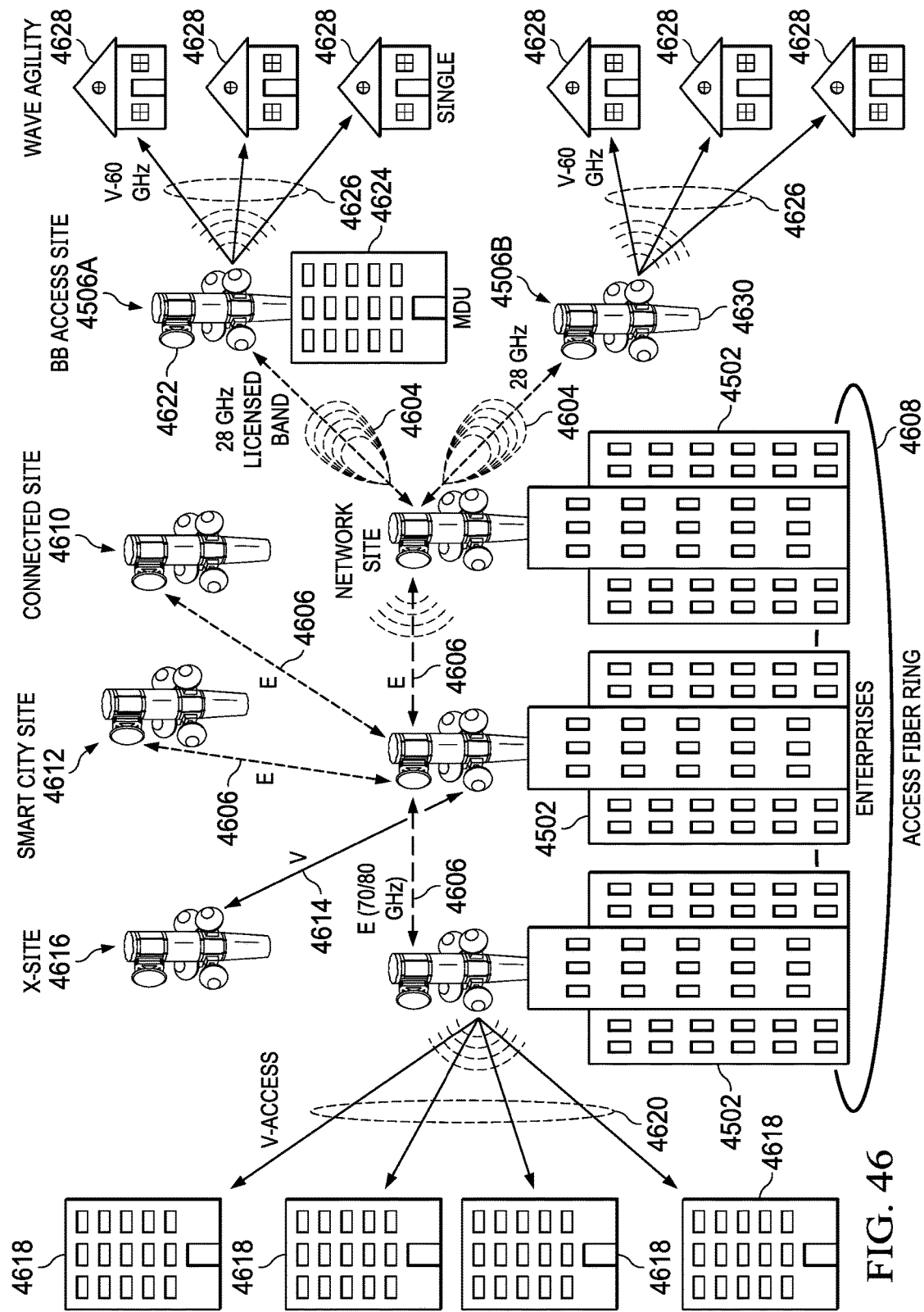
FIG. 46 illustrates a network of a plurality of optimally located access sites and network sites using both licensed and unlicensed data bands.

Referring now to FIG. 46, there is provided a broader level network illustration of a plurality of optimally located access sites 4506 and network sites 4502 using both licensed and unlicensed data bands comprising a private MulteFire network. In this case, the network sites 4502 comprise mini-towers with associated antennas located on MDUs (multiple dwelling units). Each of the mini-towers 4602 can either communicate via both the 28 GHz licensed band point-to-point link 4604 to access sites 4506, to other network sites 4502 via point-to-point e-band connections 4606 or 3.5-5 GHz band. The network site 4502 communicates with the access sites 4506 via the 28 GHz licensed band point-to-point links 4604. The network sites 4502 can communicate with other network sites 4502 by either a fiber link 4608 or with other network sites 4502 through a 70-80 GHz e-band point-to-point link 4606. In addition to communicating with other network sites 4502 through e-band point-to-point links 4606, a network site may utilize the e-Band and point to point links 4606 to communicate with connected sites 4610 and smart city sites 4612.

Smart city sites 4612 comprise data collection sensors for supplying information used to manage assets and resources efficiently within an urban area. The data collected is processed and analyzed to perform a variety of functions including monitoring and managing traffic and transportation systems, power plants, water supply networks, waste management, law enforcement, information systems, schools, hospitals and other community services. The connected sites 4610 comprise other network data transmission or collection sites that may be utilized by network site 4604. The network sites 4502 may also connect via a point-to-point V-band connection link 4614 to X-sites 4616. An X-site comprises other sites that may have surveillance cameras or sensors for different applications such as detection of gas for emergencies, ect. Finally, the network sites 4502 may connect to other MDUs 4618 using a point-to-multipoint V-band access link 4620.

Access site 4506A comprises a BB (broadband) access site from a mini-tower 4622 located on an MDU 4624. A BB access sites are for connecting the end user to the access point (base station). These sites are differentiated from aggregation sites and their associated backhaul (from an aggregation point towards the core of the network rather than towards the end users). The access site 4506 provides point to multipoint 60 GHz V-band or 3.5-5 GHz band links 4626 to multiple user locations 4628. Access site 4506B comprises a mini-tower 4630 providing point-to-multipoint 60 GHz V-band or 3.5-5 GHzband links 4626 to multiple users 4628.

Figure 47:
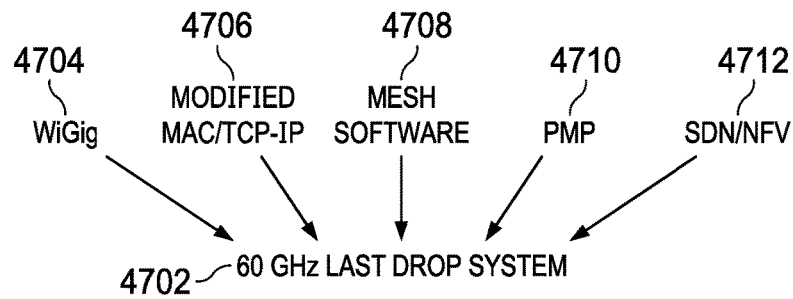
FIG. 47 illustrates the software components of a 60 GHz last drop system.

Referring now to FIG. 47, the private system 4702 described herein builds upon existing technologies in a unique combination along with new techniques in order to provide the unique last drop system. The WiGig protocol 4704 implemented within the Peraso chipset provides for wireless packet data transmissions. The modified MAC/TCP-IP protocol 4706 that has been developed by Facebook is utilized for providing improved wireless packet data transmissions. Communications between the access sites and network sites of the mesh network are controlled utilizing mesh software 4708. The mesh software 4708 is responsible for automatically detecting when a link goes down between nodes within the mesh network and reconfiguring and reestablishing a connection using a new link path. Connections between access nodes of the mesh network and users are provided using point to multipoint transmission techniques 4710 from the access nodes to the users. The control of the mesh network node connections are carried out using SDN/NFV software control techniques 4712 as described herein.

Figure 48:
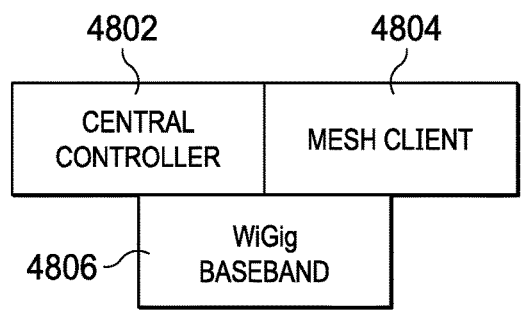
FIG. 48 illustrates the manner in which a central controller and mesh client operate on top of a WiGig baseband layer.

FIG. 48 illustrates the functional blocks of a mesh network used for providing the last drop services to users. The mesh network structure utilizes a central controller 4802 and a mesh client 4804 that operate on top of a WiGig baseband layer 4806. The central controller 4802 provides for the establishment of links between mesh network nodes and controls the reestablishment of failed links when necessary. The mesh client 4804 is located at each mesh network node and provides the interactions with the central controller 4806 in order to control link establishment at the nodes. Each of the central controller 4802 and mesh clients 4804 within the network nodes utilize the WiGig baseband communication control protocol 4806 in order to carry instructions between the central controller 4802 and mesh clients 4804. The combined use of the central controller 4802 and mesh clients 4804 with the WiGig protocol 4806 enables the use of a multi-hop topology for providing links that travel from one point to another through multiple mesh network nodes. The combination additionally provides for quality of signal support for the links between mesh nodes and failover management for failed mesh node links to provide a high reliability system. The platform for initiating these control layers include a phased antenna array associated with the mesh network nodes, WiGig SoC (system-on-a-chip) located on each mesh network node. Mesh software controls the node interactions using the phased antenna array and WiGig SoC.

Figure 49:
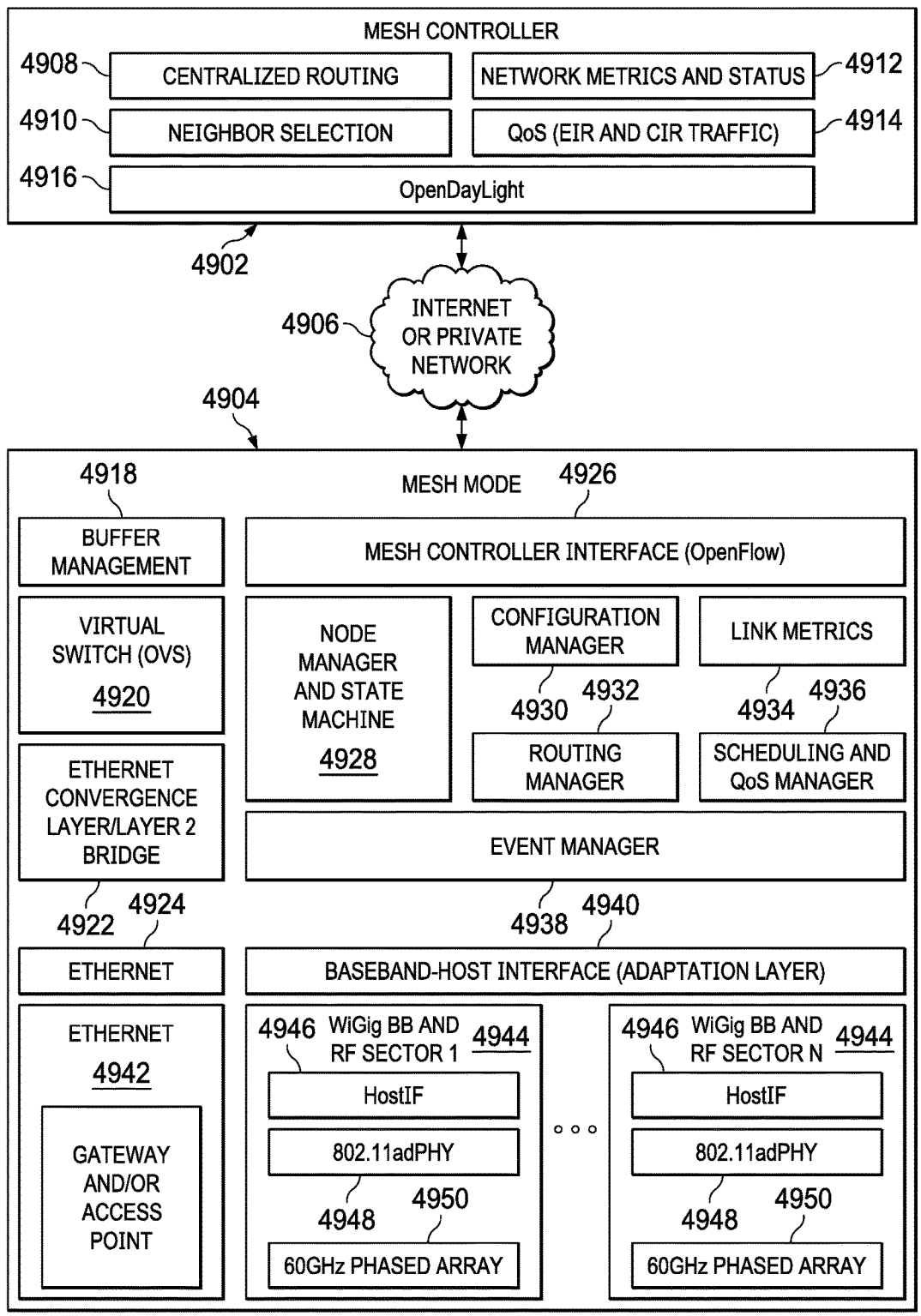
FIG. 49 illustrates the various mesh software functions for the mesh controller and mesh node.

The mesh software as illustrated in FIG. 49, includes a number of functionalities within the mesh controller 4902 and the mesh node 4904. The system uses big data analytics for targeted decision-making, network awareness, advanced processing with multi-core radios, dynamic porting, open source standards and network slicing. The mesh controller 4902 software and mesh node 4904 software may be updated via the Internet or a private network 4906. The mesh controller 4902 provides centralized routing functionalities 4908. The centralized routing functionalities enable for centralized control of the routing of data packets over communication links that have been established within the system. The neighbor selection functionalities 4910 provide for the selection of neighboring nodes that will be used for reestablishing failed communication links when a primary communication link fails. The network metrics and status functionalities 4912 tracks network status parameters and maintains these to assist in rerouting decisions of other mesh controller 4902 functionalities. The quality of service (QOS) functionalities 4914 monitor EIR (excess information rate) and CIR (committed information rate) traffic in order to assist in maintaining quality of service of signals being transmitted over the wireless connection between nodes of the mesh network for high reliability. The OpenDayLight functionalities 4916 provide for network management and data switching within the mesh network. OpenDaylight is a collaborative open source project hosted by the Linux foundation. OpenDaylight promotes software defined networking (SDN) and network function virtualization (NFV).

The mesh node 4904 functionalities provide for maintenance of the network of mesh nodes and providing for communications therebetween. The buffer management functionalities 4918 provide for buffering of data that is being transmitted between nodes of the mesh network. The open virtual switch (OVS) functionalities 4920 provide for switching between nodes of the mesh network. OVS is an open source implementation of a distributed virtual multi-layer switch. OVS provides a switching stack for hardware virtualization environments while some hoarding multiple protocols and standards used within computer networks. The ethernet convergence layer/layer 2 bridge 4922 provides for the aggregation of multiple networks into a single network. Ethernet functionalities 4924 provide for ethernet communications between network components over the mesh network nodes. The mesh controller interface 4926 uses OpenFlow to enable communication between the various nodes of the mesh network. The node manager and state machine 4928 monitors the nodes of the mesh network and manages and tracks their state for data packet transmission. The configuration manager 4930 is responsible for configuring the mesh node network when breakdowns in nodes occur requiring reconfigurations of links between nodes. The routing manager 4932 is responsible for generating routing information for packet data that is transmitted over active links within the mesh network. The link metric functionalities 4934 monitor and track the status of links between nodes of the mesh network. The scheduling and quality of service manager 4936 monitors the scheduling of packets between nodes and manages quality of service of links between nodes. The event manager 4938 is part of the mesh node that collects and manages all events in mesh control, node and state machine, configuration management, routing management, scheduling and QoS management, link status and metrics, ect. The baseband host interface 4940 provides for an interface with the application layer by the nodes of the mesh network.

The gateway and/or access point 4942 provides the access point address controls to the ethernet. A number of WiGig BB and RF sectors 4944 provide for interactions with the WiGig and RF network functionalities and provides for a host interface 4946, 802.11 ad physical interface 4948 and 60 GHz phased array interface 4950.

Using these software functions within the mesh controller 4902 and mesh nodes 4904 the mesh software implemented within processor/server at the various nodes can perform a number of operations within the mesh network. The software enables the performance of network discovery and autonomous neighbor selection. This enables nodes to identify the mesh network and automatically determine neighboring nodes that are located in close proximity to the node. The system may also perform topology management using in-band signaling with the mesh network controller 4902. The functions allow for the configuration of the node processor/server for management of node and sector state machines within the mesh network. The mesh software may also be used for detecting link failures and switching the communication links to an alternative path when an existing link has failed. The mesh software may also be used for sector and node recovery when particular sectors or nodes within the mesh network are lost. The mesh software performs link metric collection through for example the link metrics functionalities 4934 to enable the decisions and handling of things such as link failure to be appropriately decision based. The virtual switches 4920 implement L2 transport. The mesh software can also provide simple network management protocol (SNMP) using MIBs (management information bases). SNMP is an Internet standard protocol for collecting and organizing information about managed IP devices on IP networks in for modifying that information to change device behavior. SNMP is widely used in network management for network monitoring. SNMP exposes management data in the forms of variables on the manage systems organized in a management information base which describe the system status and configuration. These variables can then be remotely queried by managing applications. Finally, the mesh software provides for ease of configurability via the use of text file configuration parameters.

Figure 50:
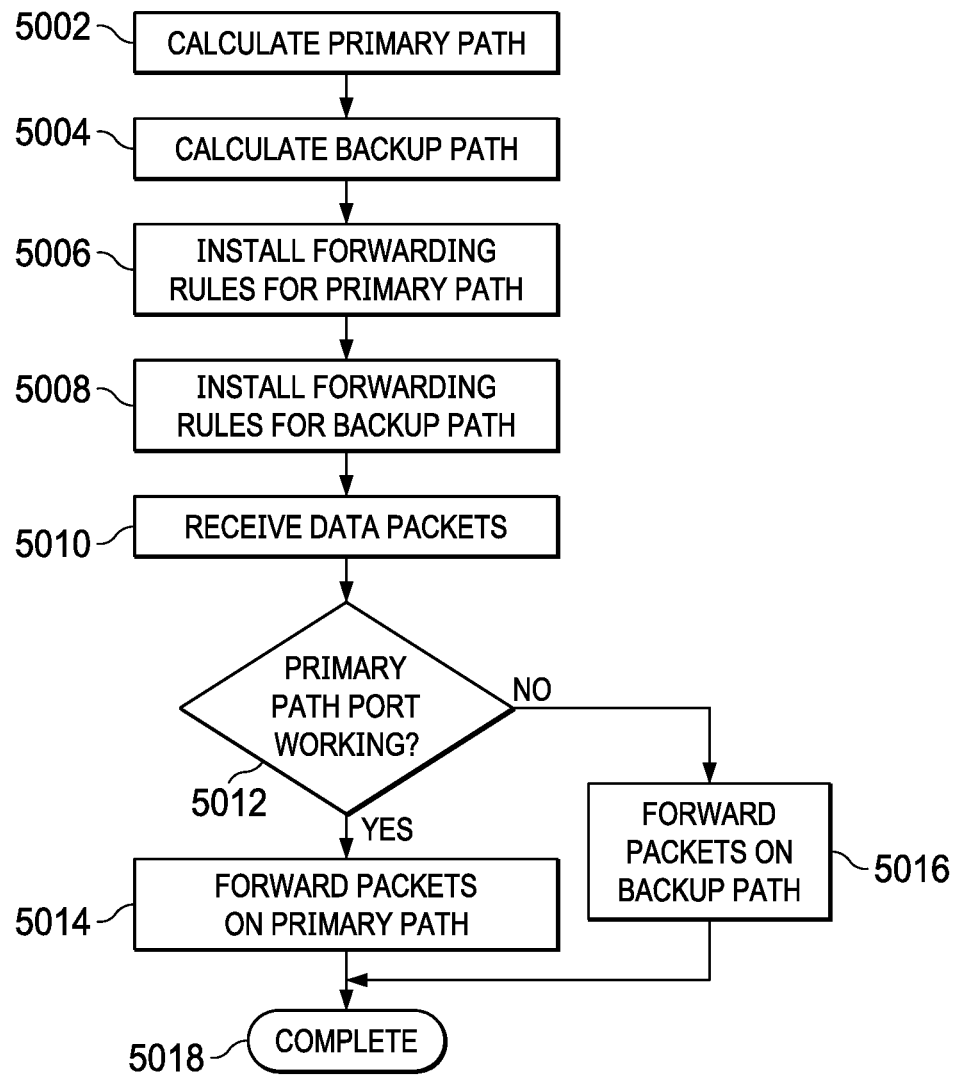
FIG. 50 illustrates the mesh software components.

Referring now to FIG. 50 there is illustrated the process for implementing SDN-based local link repair when a primary communication link goes down in the mesh network between two nodes. The process uses SDN to calculate a primary and at least one secondary path for each node of the mesh network. SDN-based local repair is implemented using fast failover groups 1808 (FIG. 18). A primary and a secondary action are put into the same group. Consequently, the controller calculates for each node in the mesh network a primary path at step 5002 for a communications link. Additionally, the controller calculates at least one backup path from the node at step 5004. Based upon the path calculations, the controller installs forwarding rules for the primary path at step 5006 into the fast failover group 1808 and will additionally install forwarding rules at step 5008 for the backup path into the fast failover group.

Once data packets arrive at a mesh network node at step 5010 which should be forwarded to a neighboring mesh node using links, the data packets will be forwarded according to the established primary path. Once the primary link is detected to be down at inquiry step 5012, the data packets are automatically forwarded using the next active link, i.e. towards a different neighbor where there is an active backup link. Thus, a determination is made at inquiry step 5012 if the primary path is working. If so, control passes on to step 5014, and the data packet is forwarded on the primary path. If inquiry step 5012 determines that the primary path is not working, the packet is forwarded on the backup path at step 5016. The process is completed at step 5018. This process allows the mesh network node to perform a local failover instead of the SDN controller performing a centralized failover. This significantly reduces the reaction time to failures in the mesh forwarding structure.

Figure 51:
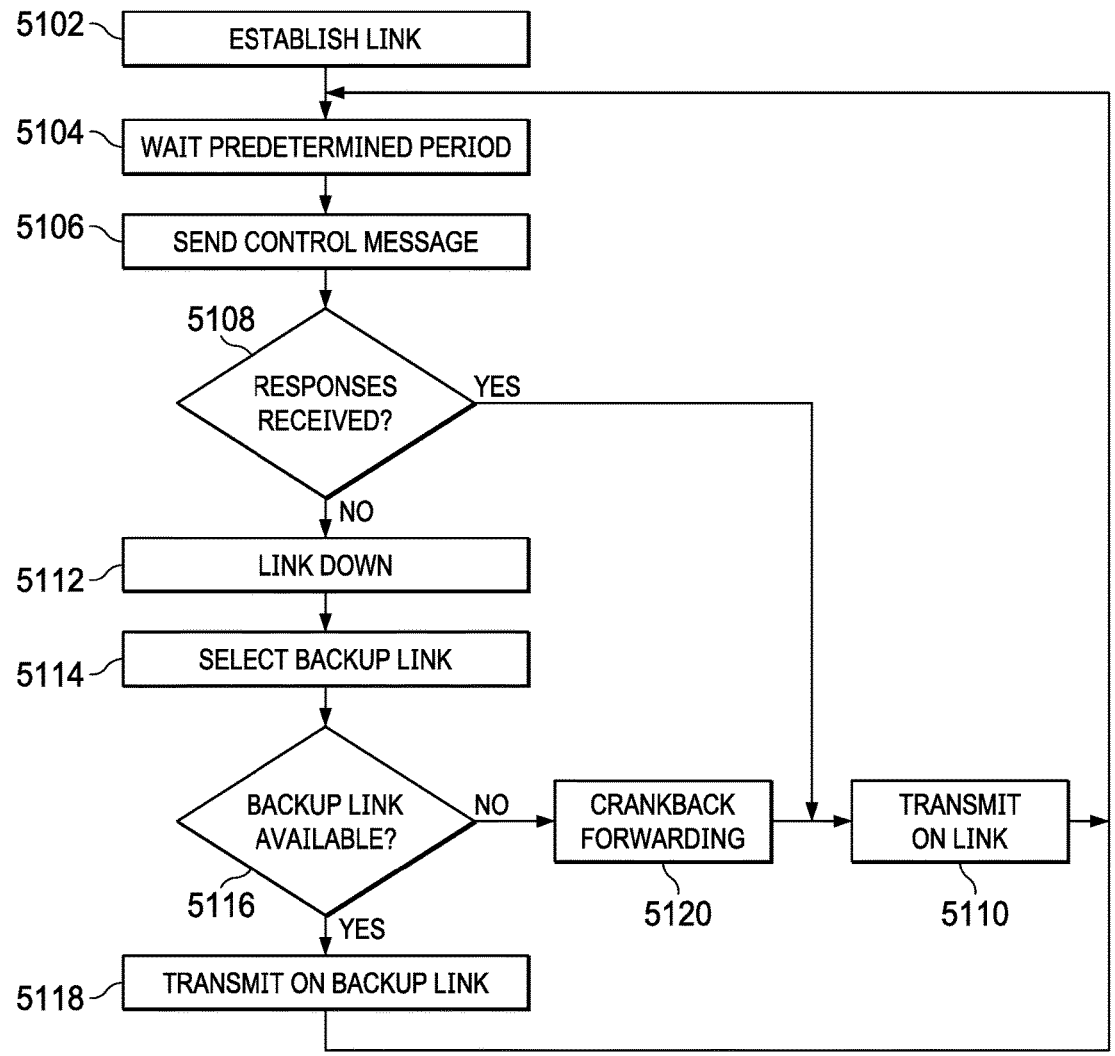
FIG. 51 illustrates a flow diagram describing the process for detecting link state and transmitting on primary and backup links within a mesh network.

Referring now to FIG. 51, there is illustrated the process for detecting link state and transmitting on primary and backup links within the mesh network. In order to detect the link state, bidirectional forwarding detection (BFD) is a commonly used technology. BFD determines the state of the link by establishing a connection at step 5102 using a three-way handshake routine. BFD next waits a predetermined period of time at step 5104 and transmits a periodic control message at step 5106. Inquiry step 5108 determines if a response to the control message has been received. The timeout period is determined by the control messages between the BFD messages. If a response to the control message is received, transmissions are carried out on the link at step 5110 and control passes back to step 5104 to await an additional predetermined period. If no response to the control message is received within a specified time interval, the link is considered down at step 5112. In this manner, link failures may be rapidly detected and reacted to. Consequently, mesh nodes send periodic BFD messages to each neighboring node over the links to detect link states. Once BFD detects a link down event at inquiry step 5108, the link state is set to down at step 5112. This triggers the OpenFlow datapath to start transmitting to a different neighbor small cell. This is achieved by selecting a backup link at step 5114.

A weakness with fast failover is that it can only perform local failover. If no alternative local path is available, e.g. all neighbors are not reachable anymore, crankback routing must be performed. This requires that the packet be sent backwards toward the source to a small cell node which has an alternative active path towards the destination. Thus, crankback forwarding can potentially have large impacts on the latency. Such latency can be reduced significantly by introducing stateful forwarding in the data plane using OpenState. OpenState is a research effort focused in the development of a stateful data plane API for Software-Defined Networking. OpenState is more particularly described in the OpenState v1.0 specification. If packets arrive at a mesh node which does not have a next hop towards the destination node because the link is down, the node tags the packet and the packet is sent back towards the source. When the message reaches the mesh node having a backup path, the state of the forwarding rules change in such a way that the coming packet traverse the backup path already at the node. Therefore, once a backup link is selected at step 5114, inquiry step 5116 determines if the backup link is operating and available. If so, transmissions are carried out on the backup link at step 5118 and control passes back to step 5104. If the backup link is not available as determined at inquiry step 5116, the crankback forwarding process is carried out at step 5120 and transmissions carried out on allocated available link.

Figure 52:
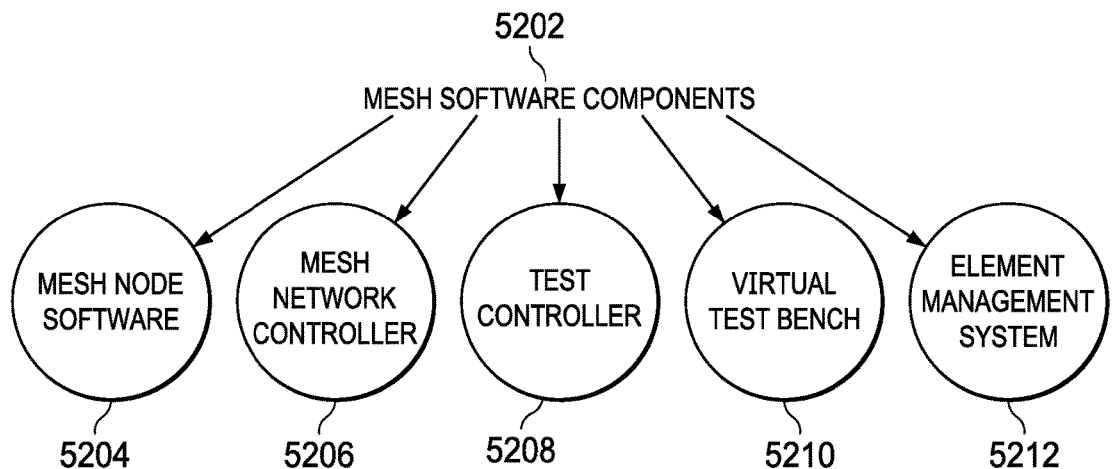
FIG. 52 illustrates a diagram of the various mesh software components used within the system.

Referring now to FIG. 52, there is illustrated a diagram of the various mesh software components 5202 used within the system. The mesh node software 5204 comprises the software associated with each of the mesh nodes within the mesh network. The mesh node software 5204 provides for control and data plane features above the MAC layer and physical layer. The mesh node software further provides for portable ANSI C applications on the mesh node and PO SIX compatible base software services. The mesh network controller software 5206 provides for a centralized controller that manages mesh connectivity. The mesh network controller software 5206 uses open flow based protocols, proprietary in-band signaling of topology management, configuration and events and a JAVA module. The test controller 5208 is used for executing test scripts and for controlling the test environment. The test controller 5208 provides an automated event driven test bench using GUI-based C++ applications. The virtual test bench 5210 enables scalable testing of the mesh software without the target hardware. The virtual test bench 5210 uses Linux hosting of virtual machines with dynamic interconnections. Thus, the combination of mesh software and the element management system 5212 enables remote management and monitoring of the mesh network for field testing and deployments. The element management system 5212 is a web based, SNMP management system. The mesh software 5202 uses open networking to provide the agility of a cloud provider with a software platform that enables rapid creation of new services. Thus, the combination of mesh software 5204, mesh network controller 5206, test controller 5208, virtual test bench 5210 and element management system provides a high capacity solution that lowers costs and provides flexibility and scalability of the system.

Figure 53A:
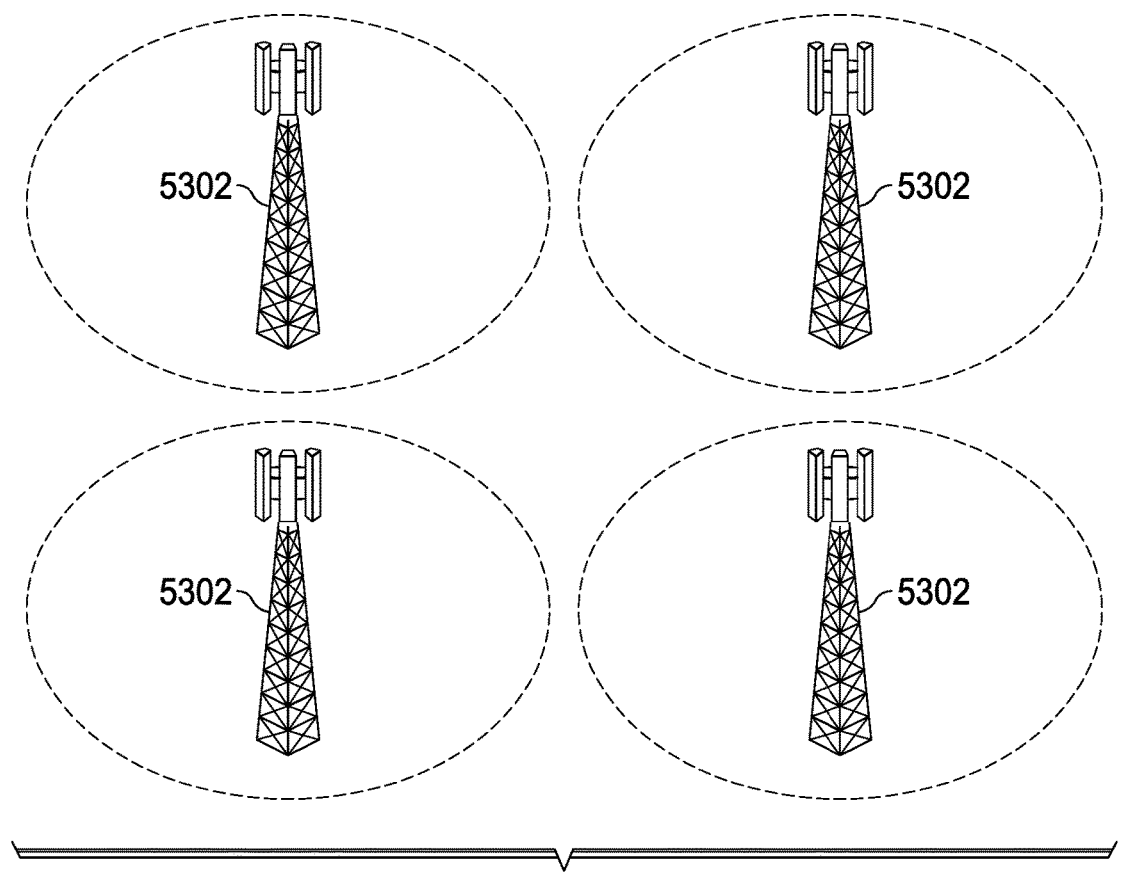
FIG. 53A illustrates a distributed antenna system.
Figure 53B:
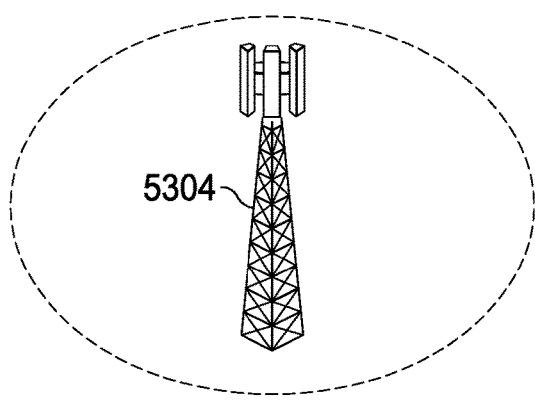
FIG. 53B illustrates a single transmitting antenna.

Private networks may be implemented within a defined area using a variety of implementation techniques and hardware structures. One example, for implementing a private MulteFire network as described hereinabove uses an in building distributed antenna system (DAS) or Wi-Fi network. Wi-Fi comprises the IEEE 802.11 standard that is well-known for implementation in private wireless networks as are frequently currently implemented. A distributed antenna system (DAS) is a network of spatially separated antenna nodes connected to a common source via a transport medium that provides a wireless service within a geographic area or structure. A DAS antenna elevation is generally located at or below the clutter level, and node installations are compact. A distributed antenna system may be deployed both indoors or outdoors. As shown in FIGS. 53A and 53B, a distributed antenna system includes multiple antennas 5302 rather than a single antenna 5304. The transmitted power is separated among the several antennas 5302 so as to provide the same coverage over the area as the single antenna 5304, but with reduced total power and improved reliability. A single antenna 5304 radiating at a high power is replaced by the group of low-power antennas 5302 to cover the same area. The idea waste less power in overcoming penetration and shadowing losses, and a line of sight channel leads to reduced faith caps and reduce delay spread. A distributed antenna system is implemented using passive splitters and feeders or active-repeater amplifiers can be included to overcome feeder losses. If a given area is covered by many distributed antenna elements 5302 rather than a single antenna 5304, the total radiated power is reduced by approximately a factor $N^{1-n/2}$ and the power per antenna is reduced by a factor $N^{n/2}$ where a simple power-law path-loss model with path-loss exponent n is assumed.

Figure 54:
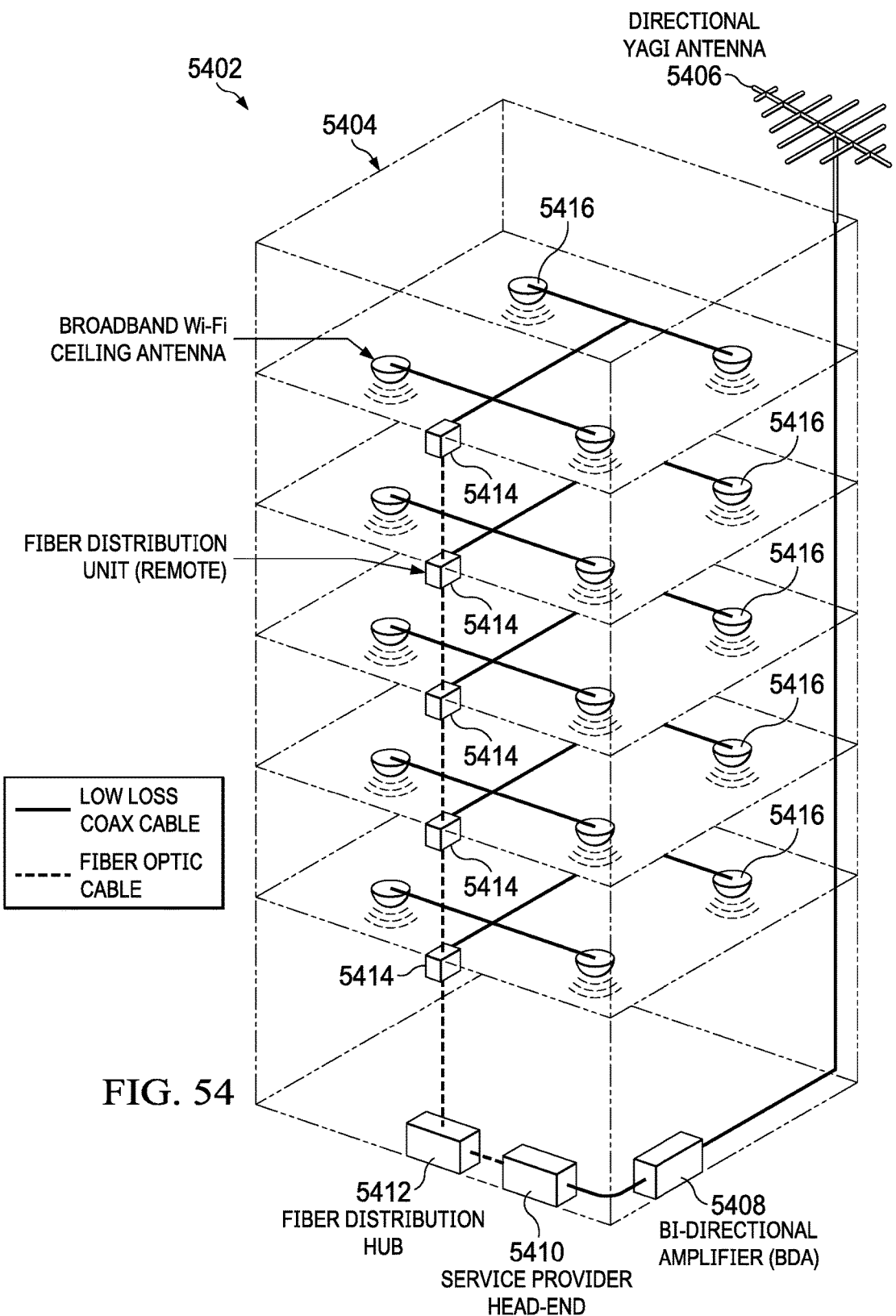
FIG. 54 illustrates an in-building distributed antenna system and Wi-Fi network.

Referring now to FIG. 54, there is illustrated the implementation of a private network 5402 within a building 5404 that utilizes a combination of a distributed antenna system (DAS) and Wi-Fi system. Signals are transmitted and received to/from the building 5404 using a directional Yagi antenna 5506. The signals travel down to a bidirectional amplifier (BDA) 5408 for signal amplification of transmitted and received signals. A service provider head-end 5410 communicates content to the private network within the building 5404 that has been received from the service provider through the antenna 5506. The fiber distribution hub 5412 distributes signals received from the service provider head 5410 to fiber distribution units 5414 located on each floor of the building 5404. The fiber distribution units 5414 distributes signals to several broadband Wi-Fi ceiling antennas 5416 located on each floor of the building 5404.

Figure 55:
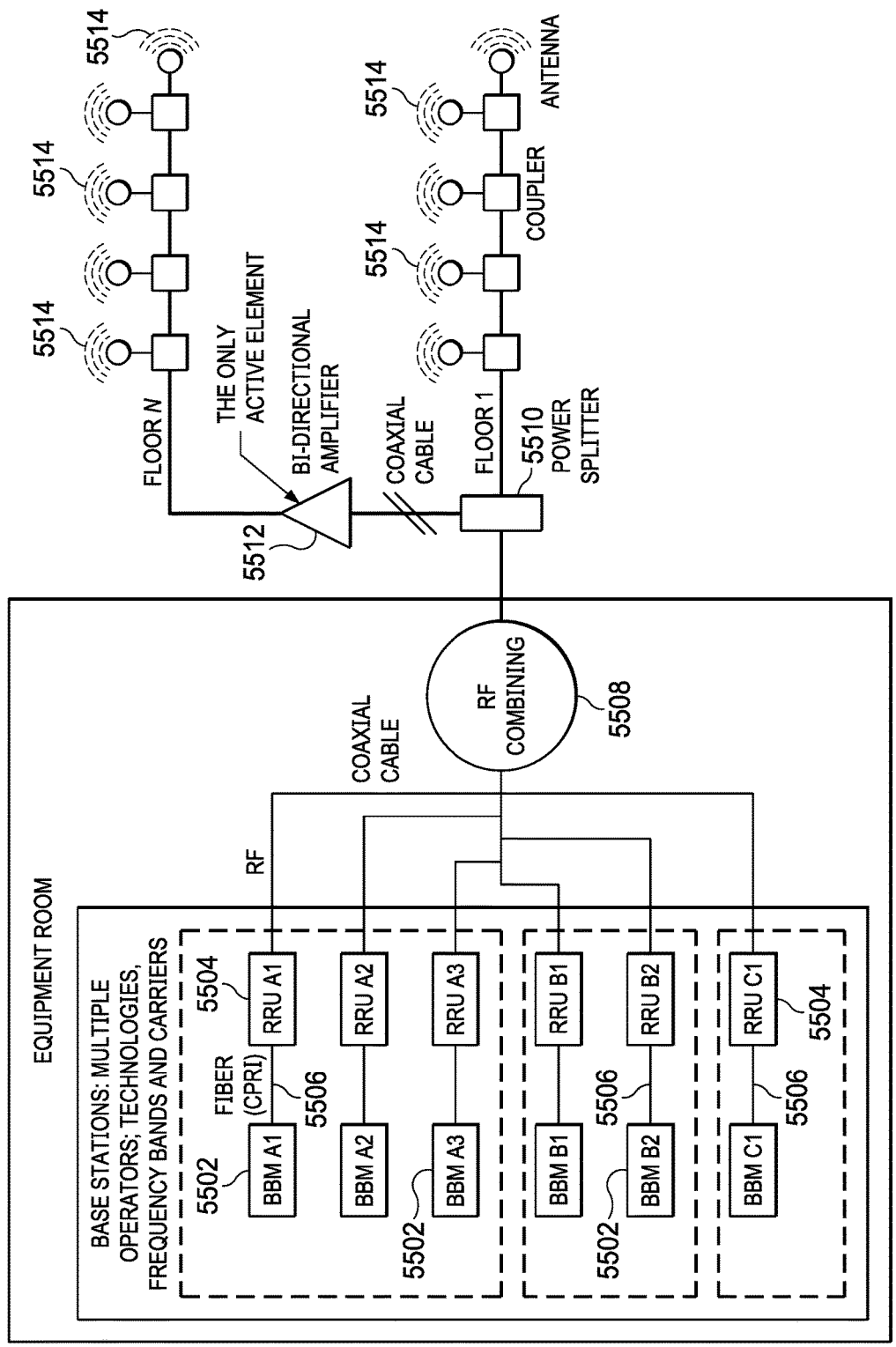
FIG. 55 illustrates a passive distributed antenna system.

FIG. 55 illustrates a passive distributed antenna system (DAS) that may transmit and receive signals over a 10K to 200K square foot area using RF combining and a bi-directional amplifier. The antenna equipment comprises a server implementing a blackberry messenger (BBM) application 5502 connected to a remote radio unit (RRU) 5504 via a fiber connection 5506. Signals from multiple RRUs 5504 are combined together using RF combining circuitry 5508 which are transmitted to various floors of a building through a power splitter 5510 and bidirectional amplifier 5512. The power splitter 5510 split signals for transmission between the different floors. The bidirectional amplifier 5512 amplifies signals being transmitted to and received from floors. The signals are transmitted on various floors using antennas 5514 such as Wi-Fi antennas.

Figure 56:
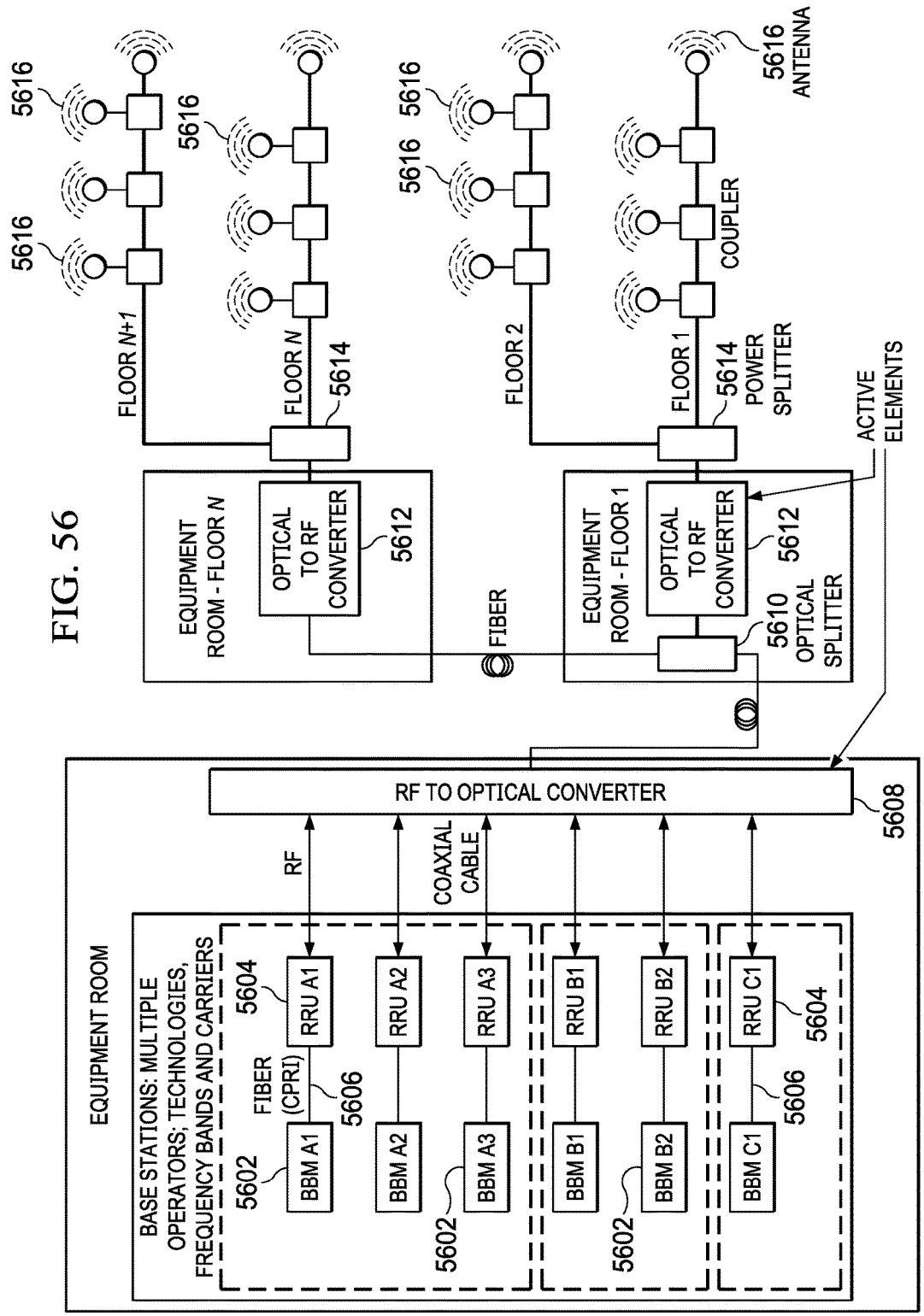
FIG. 56 illustrates an active distributed antenna system.

Referring now to FIG. 56, there is illustrated an active DAS. The antenna equipment comprises a server implementing a blackberry messenger (BBM) application 5602 connected to a remote radio unit (RRU) 5604 via a fiber connection 5606. Signals from multiple RRUs 5604 are provided in RF format to an RF to optical converter 5608 for conversion. Optical signals from the converter 5608 are transmitted to optical splitters 5610. The optical splitter 5610 splits the optical signals between the various floors that receive signals. The optical signals from the splitter 5610 are then provided to optical to RF converters 5612 located on different floor. The optical to RF converters converts the optical signals to an RF signal that is provided to another power splitter 5614 that splits power between two or more floors for RF signal transmissions. The signals are transmitted on various floors using antennas 5616 such as Wi-Fi antennas. The active DAS may transmit over a 100K to 1000K square foot area using the RF and optical converters.

Figure 57:
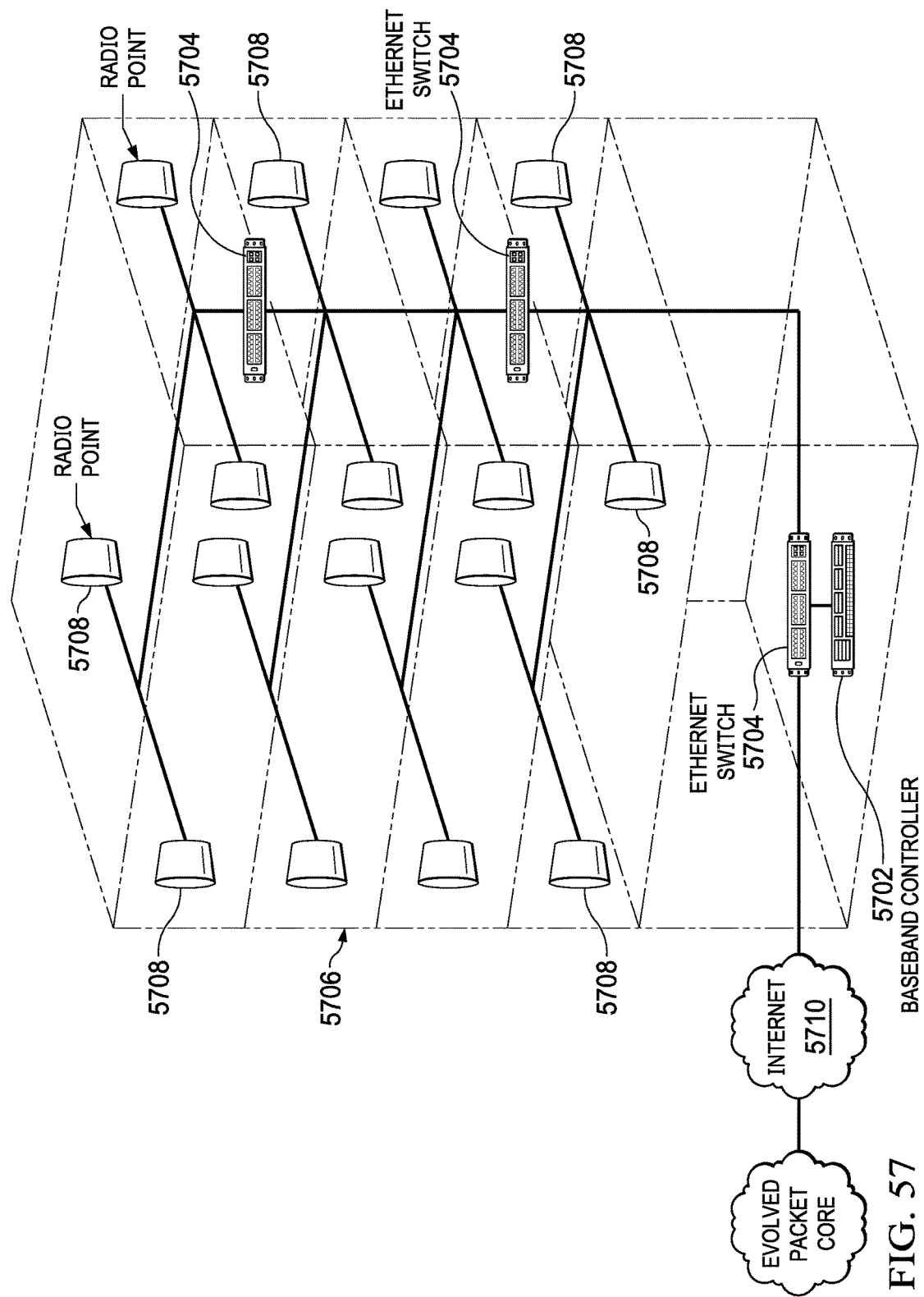
FIG. 57 illustrates a small cell indoor network.

FIG. 57 illustrates a 3.5 GHz small cell indoor network. In this configuration, a baseband controller 5702 controls a plurality of ethernet switches 5704 located within a building 5706. Each of ethernet switches 5704 connect to various radio access points 5708 located throughout the floors of the building. The baseband controller 5702 receives signals transmitted to the building 5706 and provides access to the Internet 5710.

Figure 58:
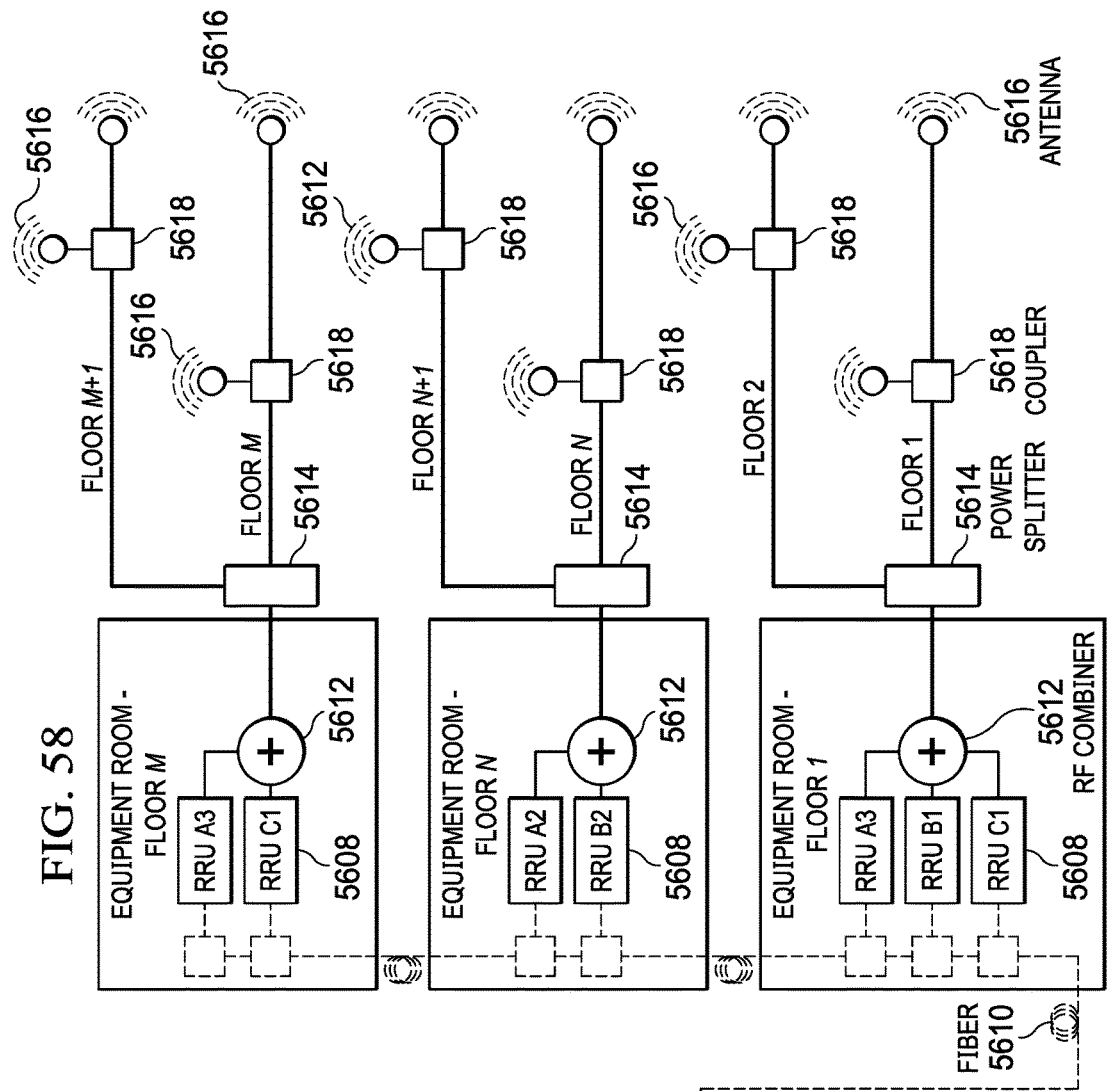
FIG. 58 illustrates an active distributed antenna system having a neutral host with C-RAN.

FIG. 58 illustrates an active DAS having a neutral host with C-RAN. The antenna equipment comprises a server implementing a blackberry messenger (BBM) application 5802 connected to a baseband (IQ/CPRI)/optical multiplexor 5804 via a fiber connection 5806. The optical multiplexor 5804 is connected to multiple remote radio units 5608 B via an optical fiber connection 5610. The RRUs 5608 are grouped together within equipment rooms on various floors of a building. Signals from multiple RRUs 5604 are combined within an RF combiner 5612 and are transmitted to a power splitter 5614 that splits the RF signals between multiple floors. The signals are then transmitted from various RF antennas 5616 through couplers 5618 on each floor.

The above described private MulteFire networks may be implemented in any number of business locations. Locations include enterprise buildings, hotels, hospitals, venues, shopping malls, stadiums, universities, airports, convention centers, transit systems, factories, shipyards, port authorities and various other business locations. Use of these private networks will provide greater flexibility to private network providers that enable the network to be uniquely configured to their users' needs.

It will be appreciated by those skilled in the art having the benefit of this disclosure that this private network with SDR-based massive MIMO, MulteFire and network slicing provides an improved manner for establishing private networks that may be uniquely configured to user needs within the private network. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A private wireless network for providing connections between a public wireless network and wireless devices, comprising:
    a first interface to the public wireless network;
    at least one second interface to the wireless devices;
    a wireless communications network interconnecting the first interface and the second interface implementing a MulteFire wireless communications standard including a first plurality of control layers, the wireless communications network further comprising a plurality of nodes within a mesh network;
    a plurality of transceivers associated with each of the plurality of nodes within the mesh network, each of the transceivers implementing a software defined radio that may be configured within a plurality of transceiving configurations;
    at least one server for implementing at least a portion of the wireless communications network within the at least one server; and
        wherein the at least one server is configured to select a first slice portion of the first plurality of control layers of the wireless communications network and a first slice portion of at least a portion of the plurality of transceivers in a first transceiving configuration to support operation of a first application or service and to select a second slice portion of the first plurality of control layers of the wireless communications network and a second slice portion of at least the portion of the plurality of transceivers in a second transceiving configuration to support operation of a second application or service.

2. The private wireless network of claim 1, wherein the wireless communications network implements the MulteFire wireless communications in both licensed and unlicensed frequency bands.

3. The private wireless network of claim 1, wherein a portion of the plurality of transceivers implement a coordinated multipoint massive MIMO system, further wherein the coordinated multipoint massive MIMO system is implemented in a first configuration responsive to selection of the first slice portion and a second configuration responsive to selection of the second slice portion.

4. The private wireless network of claim 1, wherein the wireless communications network comprises a software defined network.

5. The private wireless network of claim 1, wherein the wireless communications network comprises a software optimized network.

6. The private wireless network of claim 1, wherein the plurality of transceivers transmit in a CBRS band.

7. The private wireless network of claim 1, wherein the selected first slice enables a first configuration of uplinks and downlinks, usage policy and a radio access network comprised of a first portion of the plurality of transceivers and the selected second slice enables a second configuration of uplinks and downlinks, usage policy and a radio access network comprised of a second portion of the plurality of transceivers responsive to capacity demands, performance requirements and latency requirements.

8. The private wireless network of claim 1, wherein the wireless communications network further includes a passive distributed antenna system for connecting the wireless devices to the private wireless network, further wherein the passive distributed antenna system includes a bidirectional amplifier.

9. The private wireless network of claim 1, wherein the wireless communications network further includes an active distributed antenna system for connecting the wireless devices to the private wireless network, further wherein the active distributed antenna system includes RF/Optical converters.

10. A method for providing connections between a public wireless network and wireless devices using a private wireless network, comprising:
    providing a first interface to the public wireless network;
    providing at least one second interface to the wireless devices;
    interconnecting the first interface and the second interface through a wireless communications network comprising a plurality of nodes within a mesh network;
    implementing a MulteFire wireless communications standard including a first plurality of control layers through the wireless communications network;
    implementing a software defined radio at each of the plurality of nodes of the mesh network that may be configured within a plurality of transceiving configurations;
    implementing at least a portion of the wireless communications network within at least one server;

selecting a first application or service for operation within the private wireless network;

configuring the at least one server to select a first slice portion of the first plurality of control layers of the wireless communications network and a first slice portion of at least a portion of a plurality of transceivers in a first transceiving configuration to support operation of the first application or service;

selecting a second application or service for operation within the private wireless network; and configuring the at least one server to select a second slice portion of the first plurality of control layers of the wireless communications network and a second slice portion of at least the portion of the plurality of transceivers in a second transceiving configuration to support operation of the second application or service.

11. The method of claim 10, wherein the step of implementing further comprises implementing the MulteFire wireless communications standard in both licensed and unlicensed frequency bands.

12. The method of claim 10 further including:
implementing a coordinated multipoint massive MIMO system within a portion of the plurality of transceivers in a first configuration responsive to selection of the first slice portion; and
implementing the coordinated multipoint massive MIMO system within the portion of the plurality of transceivers in a second configuration responsive to selection of the second slice portion.

13. The method of claim 10, wherein the wireless communications network comprises a software defined network.

14. The method of claim 10, wherein the wireless communications network comprises a software optimized network.

15. The method of claim 10 further including transmitting in a CBRS band from the plurality of transceivers.

16. The method of claim 10, wherein configuring the at least one server to select the first slice portion further comprises configuring the at least one server to enable a first configuration of uplinks and downlinks, usage policy and a radio access network comprised of a first portion of the plurality of transceivers, further wherein configuring the at least one server to select the second slice portion further comprises configuring the at least one server to enable a second configuration of uplinks and downlinks, usage policy and a radio access network comprised of a second portion of the plurality of transceivers responsive to capacity demands, performance requirements and latency requirements.

17. The method of claim 10 further comprising connecting the wireless devices to the private wireless network using a passive distributed antenna system including a bidirectional amplifier.

18. The method of claim 10 further comprising connecting the wireless devices to the private wireless network using an active distributed antenna system including RF/Optical converters.

19. A private wireless network for providing connections between a public wireless network and wireless devices, comprising:
a first interface to the public wireless network;
at least one second interface to the wireless devices;
a wireless communications network interconnecting the first interface and the second interface implementing a MulteFire wireless communications standard using both licensed and unlicensed frequency bands including a first plurality of control layers, the wireless communications network further comprising a plurality of nodes within a mesh network, wherein the wireless communications network comprises a software defined network and a software optimized network;
a plurality of transceivers associated with each of the plurality of nodes within the mesh network, each of the transceivers implementing a software defined radio that may be configured within a plurality of transceiving configurations;
at least one server for implementing at least a portion of the wireless communications network within the at least one server; and
wherein the at least one server is configured to select a first slice portion of the first plurality of control layers of the wireless communications network and a first slice portion of at least a portion of the plurality of transceivers in a first transceiving configuration to support operation of a first application or service and to select a second slice portion of the first plurality of control layers of the wireless communications network and a second slice portion of at least the portion of the plurality of transceivers in a second transceiving configuration to support operation of a second application or service.

20. The private wireless network of claim 19, wherein a portion of the plurality of transceivers implement a coordinated multipoint massive MIMO system, further wherein the coordinated multipoint massive MIMO system is implemented in a first configuration responsive to selection of the first slice portion and a second configuration responsive to selection of the second slice portion.

21. The private wireless network of claim 19, wherein the plurality of transceivers transmit in a CBRS band.

22. The private wireless network of claim 19, wherein the selected first slice portion enables a first configuration of uplinks and downlinks, usage policy and a radio access network comprised of a first portion of the plurality of transceivers and the selected second slice enables a second configuration of uplinks and downlinks, usage policy and a radio access network comprised of a second portion of the plurality of transceivers responsive to capacity demands, performance requirements and latency requirements.

23. The private wireless network of claim 19, wherein the wireless communications network further includes a passive distributed antenna system for connecting the wireless devices to the private wireless network, further wherein the passive distributed antenna system includes a bidirectional amplifier.

24. The private wireless network of claim 19, wherein the wireless communications network further includes an active distributed antenna system for connecting the wireless devices to the private wireless network, further wherein the active distributed antenna system includes RF/Optical converters.

* * * * *